United States Patent
Ooi et al.

(10) Patent No.: US 6,610,422 B1
(45) Date of Patent: Aug. 26, 2003

(54) COATED STEEL SHEET AND METHOD FOR MANUFACTURING THE SAME

(75) Inventors: Toshihiko Ooi, Tokyo (JP); Takafumi Yamaji, Kawasaki (JP); Keiji Yoshida, Yokohama (JP); Yuichiro Tanaka, Fukuyama (JP); Junichi Inagaki, Fukuyama (JP); Masaaki Yamashita, Fukuyama (JP); Yasuhiro Majima, Yokohama (JP); Nobuyuki Ishida, Yokohama (JP); Yuichi Fukushima, Kawasaki (JP); Norio Inoue, Kawasaki (JP); Shinji Hori, Yokohama (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 10/255,374

(22) Filed: Sep. 26, 2002

Related U.S. Application Data

(63) Continuation of application No. PCT/JP02/00690, filed on Jan. 30, 2002.

(30) Foreign Application Priority Data

| Jan. 31, 2001 | (JP) | 2001-024861 |
| Jan. 31, 2001 | (JP) | 2001-024869 |
| Feb. 1, 2001 | (JP) | 2001-026182 |
| Mar. 22, 2001 | (JP) | 2001-082423 |
| Mar. 22, 2001 | (JP) | 2001-082445 |
| Jan. 18, 2002 | (JP) | 2002-009960 |

(51) Int. Cl.$^7$ ............................. B32B 15/04; B05D 1/18

(52) U.S. Cl. ............ 428/653; 148/530; 148/531; 148/533; 427/398.1; 427/398.4; 427/398.5; 427/402; 427/405; 427/406; 427/409; 427/419.1; 427/419.2; 427/433; 427/436; 428/621; 428/622; 428/623; 428/626; 428/628; 428/629; 428/632; 428/659; 428/457; 428/472.1; 428/472.2; 428/933; 428/939

(58) Field of Search ................... 428/653, 621, 428/622, 623, 626, 628, 629, 632, 659, 457, 472.1, 472.2, 933, 939, 530, 531, 533; 427/398.1, 398.4, 398.5, 402, 405, 406, 419.1, 419.2, 433, 436, 409

(56) References Cited

U.S. PATENT DOCUMENTS

| 3,343,930 A | 9/1967 | Borzillo et al. |
| 3,393,089 A | 7/1968 | Borzillo et al. |
| 4,287,008 A | 9/1981 | Torok et al. |
| 4,350,539 A | 9/1982 | Torok et al. |

FOREIGN PATENT DOCUMENTS

| JP | 46-7161 B | 2/1971 |
| JP | 61-28748 B | 7/1986 |
| JP | 9-111433 A | 4/1997 |
| JP | 11-343556 A | 12/1999 |

*Primary Examiner*—Robert R. Koehler
(74) *Attorney, Agent, or Firm*—Frishauf, Holtz, Goodman & Chick, P.C.

(57) ABSTRACT

The method for manufacturing coated steel sheet has the steps of: immersing a steel sheet in a hot-dip coating bath to form an Al—Zn base coating layer containing 20 to 95 mass % Al on the steel sheet, forming a passivated layer on the coating layer; and applying thermal history to the coating layer. The thermal history is applied immediately after the steel sheet left the hot-dip coating bath or in a temperature range of from T(° C.) between 130° C. and 300° C. to 100° C.

32 Claims, 4 Drawing Sheets

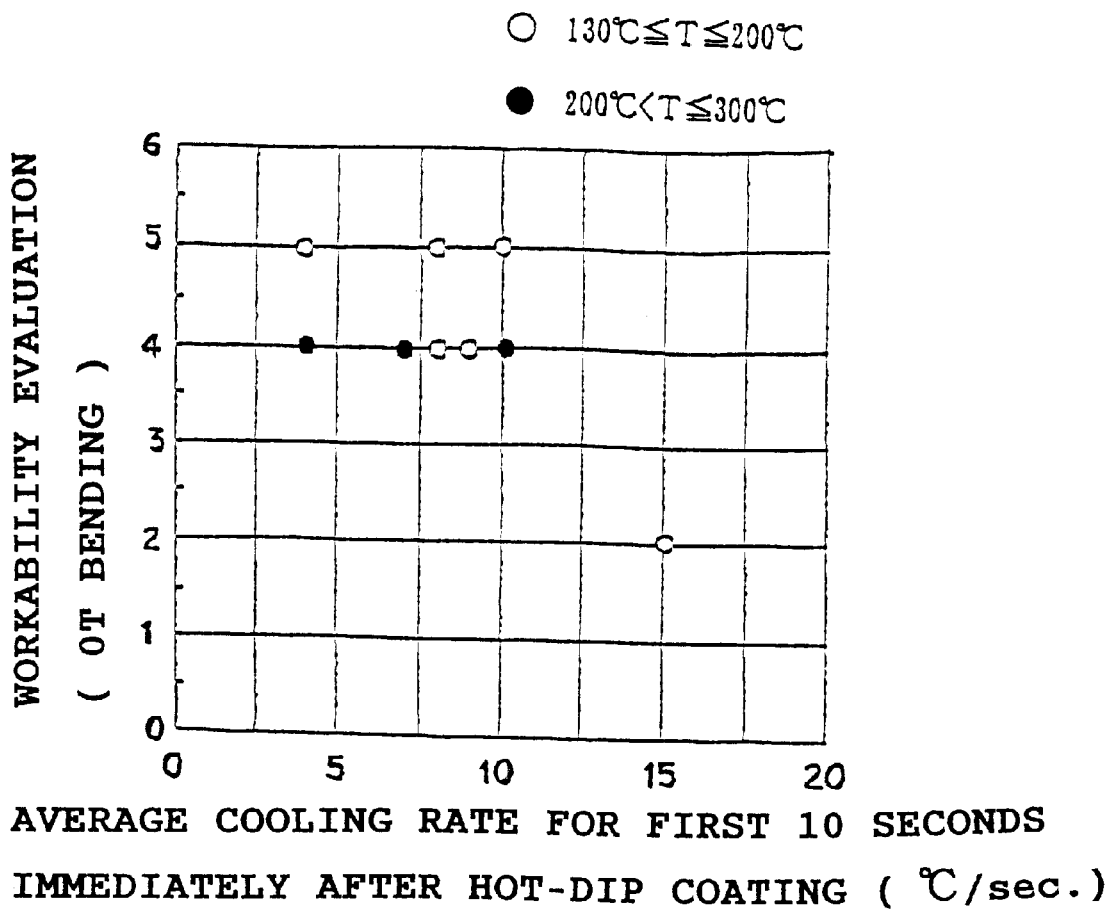

○ 130°C ≦ T ≦ 200°C
● 200°C < T ≦ 300°C

COATED STEEL SHEET AND METHOD FOR MANUFACTURING THE SAME

This application is a continuation application of International Application PCT/JP02/00690 filed Jan. 30, 2002.

1. Field of the Invention

The present invention relates to a passivated and/or painted steel sheet using a coated steel sheet having a hot-dip Al—Zn base coating layer containing 20 to 95 mass % Al, and a method for manufacturing the same.

2. Description of the Related Arts

Steel sheets coated by a hot-dip Al—Zn base coating layer containing 20 to 90 mass % Al give superior corrosion resistance, as described in JP-B-46-7161, (the term "JP-B" referred herein signifies the "Examined Japanese patent publication"), to hot-dip galvanized steel sheets. Owing to the advantageous property, the coated steel sheets increase in demand in recent years centering on the building materials.

For manufacturing that type of coated steel sheet, a hot-rolled steel sheet is pickled and descaled, or further is cold-rolled to prepare a substrate steel sheet. Thus prepared substrate steel sheet is introduced to a continuous hot-dip coating apparatus, where the following-given treatment is applied thereto.

First, the substrate steel sheet enters an annealing furnace which is kept to a reducing atmosphere, where the steel sheet is heated to a specified temperature to undergo annealing treatment. During the course of annealing, rolling oil or the like attached to the surface of the substrate steel sheet is removed, and oxide film formed thereon is reduced and removed. After that, the substrate steel sheet passes through a snout immersed at the bottom thereof in a coating bath, and enters a hot-dip galvanizing bath containing a specified amount of aluminum. The substrate steel sheet which is immersed in the coating bath is then pulled up therefrom via a sink roll, and the coating weight on the substrate steel sheet is adjusted by injecting a pressurized gas from gas-wiping nozzles, arranged above the coating bath, against the surface of the coated steel sheet. Then, the coated steel sheet is cooled in a cooling unit to obtain the hot-dip Al—Zn base coated steel sheet having a specified coating layer thereon.

For assuring specified quality and material properties of coating layer, the continuous hot-dip coating apparatus is precisely controlled within a predetermined control range, in terms of heat treatment condition and atmospheric condition of the annealing furnace, and operating conditions such as composition of coating bath liquor and cooling rate after coated.

The coating layer of thus prepared coated steel sheet has a portion of dendrites of Al which contains mainly Zn to a supersaturation level and a balance portion of gaps between dendrites, which dendrites layer in the direction of coating layer thickness. Owing to the characteristic film structure, the hot-dip Al—Zn base coated steel sheet gives excellent corrosion resistance.

The coating bath normally contains Si to about 1.5 mass %. The Si functions to suppress the growth of alloy phase at interface between the coating layer and the substrate steel sheet, thus the hot-dip Al—Zn base coated steel sheet has around 1 to 2 ιm of the alloy phase thickness. Since thinner alloy phase gives more increased portion of the characteristic film structure which provides excellent corrosion resistance, the suppression of growth of the alloy phase contributes to the improved corrosion resistance. The alloy phase is harder than the coating layer and functions as the origin of crack generation during working, so the suppression of growth of alloy phase reduces the crack generation and improves the workability. Since the cracked portion has low resistance to corrosion because of the exposure of substrate steel sheet, the reduction in crack generation also improves the corrosion resistance at worked portion.

The coating bath generally contains inevitable impurities, Fe eluted from steel sheet and from equipment in the bath, and Si added to the bath for suppressing the growth of alloy phase. Other elements than those given above may be added to the coating bath. Those elements exist in the alloy phase and in the coating layer in a form of alloy or single elements.

Practical applications of the hot-dip Al—Zn base coated steel sheets in as-coated state are very rare. These steel sheets are normally treated before use further by passivation or painting on the surface thereof to prepare surface-treated steel sheets.

When a hot-dip Al—Zn base coated steel sheet is worked by bending or the like, it may generate cracks on the coating layer at the worked portion depending on the degree of the working. On this type of coated steel sheet, the alloy phase having about 1 ιm to about 2 ιm thickness, existing at the interface between the coating layer and the substrate steel sheet, becomes the origin of the cracks, and the dendrite gaps in the coating layer provide the crack propagation route. Accordingly, compared with a hot-dip galvanized steel sheet having the same coating layer thickness and being subjected to the same degree of working, the hot-dip Al—Zn base coated steel sheet likely gives relatively large crack opening. As a result, there occurs a problem of visible crack generation to degrade the appearance of the steel sheet, depending on the degree of working. Although the hot-dip Al—Zn base coated steel sheet has superior corrosion resistance to the hot-dip galvanized steel sheet having the same coating layer thickness therewith, as described above, the hot-dip Al—Zn base coated steel sheet has a drawback in significant reduction of corrosion resistance at the crack-generated portion, where the substrate steel sheet exposes, compared with the portion of no crack generation.

Countermeasures to these problems have been proposed. For example, JP-B-61-28748 discloses a method for improving the ductility of a coated steel sheet by applying a specific heat treatment to a hot-dip Al—Zn base coated steel sheet. Solely that kind of heat treatment in related art, however, fails to sufficiently improve the ductility of the coating layer.

As described above, the hot-dip Al—Zn base coated steel sheets are normally used as the passivation-treated steel sheets which are prepared by applying passivation treatment to the surface thereof or as the coated steel sheets which are prepared by applying coating thereon. From the point of preventing the crack generation at a portion of work such as bending, sole improvement in the ductility of the coating layer to some extent, as disclosed in related art, not necessarily improves directly the performance of the products, or the performance of workability and the corrosion resistance of the worked portion on the surface-treated steel sheet after subjected to passivation treatment or coating, to a practically applicable level.

SUMMARY OF THE INVENTION

It is an object of the present invention to provide a coated steel sheet having excellent workability and corrosion resistance at worked portion, and to provide a method for manufacturing same.

To attain the object, the present invention provides a method for manufacturing a coated steel sheet, comprising the steps of: forming an Al—Zn base coating layer containing 20 to 95 mass % Al on a steel sheet by immersing thereof in a hot-dip coating bath; and forming a passivated layer on the coating layer. The method for manufacturing the coated steel sheet includes the step of applying a thermal history to the coating layer.

The step of applying thermal history has the steps of: applying a first thermal history of less than 11° C./sec of average cooling rate during the first 10 seconds after the steel sheet left the hot-dip coating bath; and applying a second thermal history of 0.5×(T−100)(° C./hr) or less of average cooling rate thereto in a temperature range of from T(° C.) between 130° C. and 300° C. to 100° C.

The step of applying the second thermal history is preferably in the following:

(1) The average cooling rate of the coating layer in a temperature range of from T(° C.) between 130° C. and 300° C. to 100° C., after solidification of a hot-dip coated metal, is 0.5×(T−100)(° C./hr) or less.

(2) After solidification of the hot-dip coated metal, the heating is applied to the coating layer to a temperature of T(° C.) between 130° C. and 300° C., followed by applying average cooling rates of 0.5×(T−100)(° C./hr) or less thereto in the temperature range of from T(° C.) to 100° C.

The step of applying the second thermal history preferably applies a thermal history of average cooling rates of 0.5×(T−100)(° C./hr) or less to the coating layer in a temperature range of from T(° C.) between 130° C. and 200° C. to 100° C.

The step of applying the second thermal history is preferably conducted in at least one stage selected from the group consisting of (1) through (4) given below.

(1) before the passivation;
(2) during drying period of the passivation;
(3) after the passivation;
(4) during cooling period after solidification of a hot-dip coated metal.

The step of forming the passivated layer is preferably conducted by applying chromate treatment to the coating layer to form a passivated layer containing chromium of 0.1 mg/m² or more and less than 100 mg/m² as metallic chromium. For forming the passivated layer by the chromate treatment, the following-given two methods are preferred.

(1) A chromating solution containing a water organic resin, chromic aid and/or a chromic acid compound which is prepared by reducing a part of chromic aid is applied onto the coating layer. Then, the applied solution is dried at a sheet temperature of from 80° C. to 300° C. to form the passivated layer. A mass ratio of the organic resin (A) to the chromium (B) as metallic chromium in the passivated layer, (A)/(B), is 1 or more and less than 200. The organic resin in the passivated layer is preferably a thermosetting organic resin.

(2) Chromate treatment is applied to the coating layer. Then a treatment solution containing a water organic resin is applied onto the chromated surface, which is then dried at sheet temperatures of from 80° C. to 300° C. to form the passivated layer containing organic resin. It is preferable that a mass ratio of the organic resin (A) to the chromium (B) as metallic chromium in the passivated layer, (A)/(B), is 1 or more and less than 200. The organic resin in the passivated layer is preferably a thermosetting organic resin.

As for the method for manufacturing the coated steel sheet, it is preferable that the passivated layer is made of at least one layer that does not contain chromium, and that the coating weight thereof is 0.1 g/m² or more and less than 5 g/m². The passivated layer contains an organic resin and at least one compound selected from the group consisting of phosphoric acid, phosphate, silica, silane coupling agent, Ca, Ca-base compound, Mn, Mn-base compound, Mg, Mg-base compound, Ni, Ni-base compound, Co, Co-base compound, Fe, and Fe-base compound.

The method for manufacturing the coated steel sheet preferably further comprises the step of applying at least one paint film layer onto the passivated layer. The step of applying at least one paint film layer onto the passivated layer comprises the steps of: applying a primer onto the passivated layer and baking the primer onto the passivated layer to form a primer layer having thicknesses of 2 μm or more; and applying a top coat onto the primer layer and baking the top coat onto the primer layer to form a top coat layer having a thickness of from 5 to 30 μm.

The primer contains main component resins of a modified polyester resin (C) and a curing agent (D), which modified polyester resin (C) is prepared by a reaction between a polyester resin (A) having number average molecular weights of from 14,000 to 26,000 and having glass transition temperatures of from 0° C. to 30° C., and an epoxy resin (B), and the modified polyester resin (C) has k-values, given in the following equation, of from 0.7 to 2.5, $$k=[Wb \times (Ma+2 \times Mb)]/[(Wa+Wb) \times 2 \times Mb]$$

where, Wa is the solid matter weight ratio of the polyester resin (A) to [the polyester resin (A)+the epoxy resin (B)], Wb is the solid matter weight ratio of the epoxy resin (B) to [the polyester resin (A)+the epoxy resin (B)], Ma is the number average molecular weight of the polyester resin (A), and Mb is the number average molecular weight of the epoxy resin (B).

The top coat contains main component resins of a polyester resin (E) and a curing agent, which polyester resin (E) has number average molecular weights of from 5,000 to 20,000.

The curing agent (D) existing in the primer is preferably at least one compound selected from the group consisting of amino resin and isocyanate compound.

In the case that the method for manufacturing the coated steel sheet comprises the step of applying painting, it is preferable that the step of applying the second thermal history is conducted in at least one stage selected from the group consisting of (1) through (8) described below:

(1) before the passivation;
(2) during drying period of the passivation;
(3) after the passivation and before the painting of the top coat;
(4) during drying period of the primer;
(5) after the painting of the primer and before the painting of the top coat;
(6) during drying period of the top coat;
(7) after the painting of the top coat;
(8) during cooling period after solidification of the hot-dip coated metal.

According to the method for manufacturing the coated steel sheet, the step of forming the coating layer is preferably the one to form an Al—Zn base coating layer containing 20 to 95 mass % Al and 0.01 to 10 mass % of at least one element selected from the group consisting of Mg, V, and Mn.

The present invention further provides a coated steel sheet having an Al—Zn base coating layer containing 20 to 95 mass % Al and a passivated layer formed on the coating layer.

The coating layer is the one subjected to a first thermal history of less than 11° C./sec of average cooling rate during the first 10 seconds after the steel sheet left the hot-dip coating bath, and to a second thermal history of 0.5×(T−100)(° C./hr) or less of average cooling rate in a temperature range of from T(° C.) between 130° C. and 300° C. to 100° C.

The second thermal history is preferably in the following.

(1) The average cooling rate in a temperature range of from T(° C.) between 130° C. and 300° C. to 100° C., after solidification of the hot-dip coated metal, is 0.5×(T−100)(° C./hr) or less.

(2) After solidification of the hot-dip coated metal, the heating is applied to a temperature T(° C.) between 130° C. and 300° C., followed by applying average cooling rate of 0.5×(T−100)(° C./hr) or less in a temperature range of from T(° C.) to 100° C.

The step of applying the second thermal history preferably applies a thermal history of average cooling rates of 0.5×(T−100)(° C./hr) or less in a temperature range of from T(° C.) between 130° C. and 200° C. to 100° C.

The passivated layer is preferably formed by chromate treatment to contain chromium of 0.1 mg/m$^2$ or more and less than 100 mg/m$^2$ as metallic chromium. For forming the passivated layer by the chromate treatment, the following-given two methods are preferred.

(1) A chromating solution containing a water organic resin, chromic aid and/or a chromic acid compound which is prepared by reducing a part of chromic aid is applied onto the coating layer. Then, the coating layer is dried at sheet temperatures of from 80° C. to 300° C. to form the passivated layer. The mass ratio of the organic resin (A) to the chromium (B) as metallic chromium in the passivated layer, (A)/(B), is 1 or more and less than 200. The organic resin in the passivated layer is preferably a thermosetting organic resin.

(2) Chromate treatment is applied to the coating layer. Then a treatment solution containing a water organic resin is applied onto the chromated surface, which is then dried at a sheet temperature of from 80° C. to 300° C. to form the passivated layer containing organic resin. It is preferable that the mass ratio of the organic resin (A) to the chromium (B) as metallic chromium in the passivated layer, (A)/(B), is 1 or more and less than 200.

The organic resin in the passivated layer is preferably a thermosetting organic resin.

In the coated steel sheet, it is preferable that the passivated layer is made of at least one layer that does not contain chromium, and that the coating weight thereof is 0.1 g/m$^2$ or more and less than 5 g/m$^2$. The passivated layer contains an organic resin and at least one compound selected from the group consisting of phosphoric acid, phosphate, silica, silane coupling agent, Ca, Ca-base compound, Mn, Mn-base compound, Mg, Mg-base compound, Ni, Ni-base compound, Co, Co-base compound, Fe, and Fe-base compound.

The coated steel sheet preferably has at least one painting film layer on the passivated layer. The painting film layer contains a primer layer having thicknesses of 2 ιm or more formed by applying a primer onto the passivated layer, and a top coat layer having thicknesses of from 5 to 30 ιm formed by applying a top coat onto the primer layer.

The primer contains main component resins of a modified polyester resin (C) and a curing agent (D), which modified polyester resin (C) is prepared by a reaction between a polyester resin (A) having number average molecular weights of from 14,000 to 26,000 and having glass transition temperatures of from 0° C. to 30° C., and an epoxy resin (B), and the modified polyester resin (C) has k-values, given in the following equation, of from 0.7 to 2.5, $$k=[Wb\times(Ma+2\times Mb)]/[(Wa+Wb)\times 2\times Mb]$$

where, Wa is the solid matter weight ratio of the polyester resin (A) to [the polyester resin (A)+the epoxy resin (B)], Wb is the solid matter weight ratio of the epoxy resin (B) to the [the polyester resin (A)+the epoxy resin (B)], Ma is the number average molecular weight of the polyester resin (A), and Mb is the number average molecular weight of the epoxy resin (B).

The top coat contains main component resins of a polyester resin (E) and a curing agent, which polyester resin (E) has number average molecular weights of from 5,000 to 20,000.

The curing agent (D) existing in the primer is preferably at least one compound selected from the group consisting of amino resin and isocyanate compound.

In the coated steel sheet, the coating layer is preferably an Al—Zn base coating layer containing 20 to 95 mass % Al and 0.01 to 10 mass % of at least one element selected from the group consisting of Mg, V, and Mn.

BRIEF DESCRIPTION OF THE DRAWINGS

FIG. 1 is a graph showing the influence of the average cooling rate of coating layer on the workability of surface-treated steel sheet in the Embodiment 1.

EMBODIMENT FOR CARRYING OUT THE INVENTION

Embodiment 1

Figure 2A:
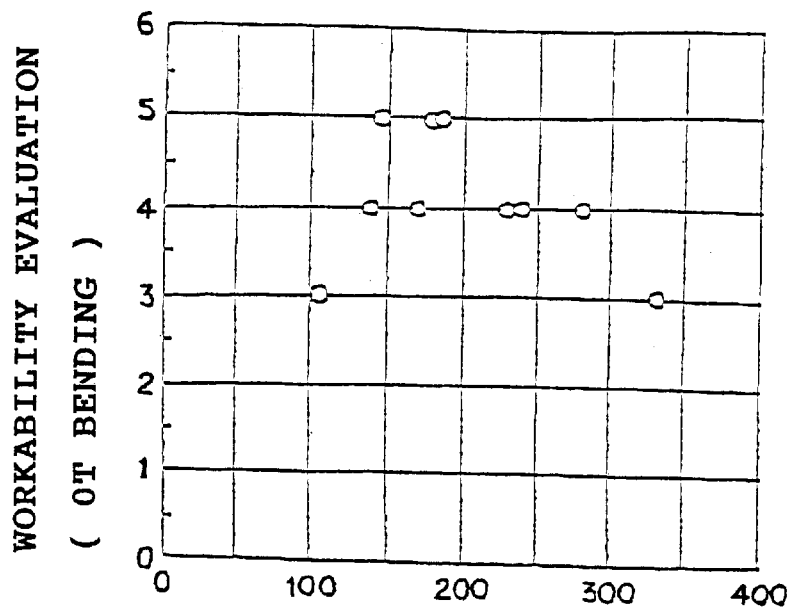
FIG. 2(a) is a graph showing the influence of the heating temperature of coating layer on the workability of surface-treated steel sheet in the Embodiment 1.

The surface-treated steel sheet (passivated steel sheet and/or painted steel sheet) according to the Embodiment 1 uses a substrate steel sheet coated by a hot-dip Al—Zn base coating layer containing 20 to 95 mass % Al. From the point of corrosion resistance and other characteristics, a preferred range of Al content in the coating layer is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available. That type of hot-dip Al—Zn base coated steel sheet is, however, difficult to attain high corrosion resistance at worked portion thereof solely by the coating composition, and the high corrosion resistance at worked portion can be attained by applying thermal history, which will be described later, and also by combining a passivated layer as upper layer.

Although the coating weight on the hot-dip Al—Zn base coated steel sheet has not specifically limited, generally it is adequate to be in an approximate range of from 30 to 200 g/m² per a side of the steel sheet.

It is necessary that the coating layer on the hot-dip Al—Zn base coated steel sheet is the one that is prepared by applying thermal history of at least (a) and (b), described below, thereto.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip coated metal solidified, and cooling thereof at an average cooling rate of C(° C./hr), defined by eq. (1), or less in a temperature range of from T(° C.) to 100° C., and/or a thermal history of an average cooling rate of C(° C./hr), defined by eq. (1), or less in a temperature range of from T(° C.) between 130° C. and 300° C. to 100° C. after solidification of the hot-dip coated metal.

$$C=(T-100)/2 \qquad (1)$$

In the thermal history of (b), more preferable temperature range of T(° C.) is from 130° C. to 200° C.

Eq. (1) is an experimental equation derived by the inventors of the present invention through detail experimental investigations on the heating conditions and the succeeding cooling conditions of the coating layer, and on the effect of the cooling conditions after solidification of the coated metal of the coating layer.

By applying the above-described heat histories (a) and (b) to the coating layer, the workability (crack resistance, and other characteristics) of the coating layer is significantly improved, notwithstanding that the coating layer is a hot-dip Al—Zn base coating layer. Presumable reason of the significant improvement in the workability of coating layer through the heat histories of (a) and (b) is the following. First, the thermal history (a) is applied to the coating layer immediately after the coated steel sheet left the hot-dip coating bath. That is, the coating layer is subjected to the thermal history (a) of sufficiently low average cooling rate during a period of the first 10 seconds after leaving the hot-dip coating bath, which brings the solidification of the hot-dip coating layer closer to an equilibrium state than ordinary cooling process does. Accordingly, the diffusion in half-melting state accelerates the phase separation between Al and Zn, thus softening the coating layer. Secondly, the coating layer after subjected to the thermal history (a) further undergoes the thermal history (b). The thermal history (b) is the one to give slow cooling to the coating layer under a specified condition after heated the coating layer to temperatures of 130° C. to 300° C. (preferably 130° C. to 200° C.), and/or the one to give slow cooling to the coating layer under a specified condition from a temperature range of 130° C. to 300° C. (preferably 130° C. to 200° C.) after solidifying the coating layer. The thermal history (b) releases the strain accumulated in the coating layer during solidification period, and induces solid diffusion in the coating layer, thus the phase separation between Al and Zn in the coating layer, began in the thermal history (a), is further effectively accelerated. As a result, the coating layer becomes significantly soft, and the workability thereof significantly improves.

Therefore, the softening of coating layer and the significant improvement in workability thereof owe to a combined effect of above-described two kinds of thermal history, (a) and (b). Only one thermal history, (a) or (b), is difficult to form the soft coating layer and to obtain the improved coating layer workability.

The detail of the heat histories (a) and (b) is described in the following.

Regarding the thermal history (a), the average cooling rate of the coating layer is less than 11° C./sec during the first 10 seconds after the steel sheet left the hot-dip coating bath, which brings the solidification of the hot-dip coated layer closer to an equilibrium state than ordinary cooling process does, as described above. Accordingly, the diffusion in half-melting state accelerates the phase separation between Al and Zn, thus softening the coating layer. If the average cooling rate is 11° C./sec or more during the first 10 seconds after the steel sheet left the hot-dip coating bath, the solidification speed becomes excessively high, so the solidification of the hot-dip coated layer proceeds in a non-equilibrium state, and, the period in half-melting state is short so that the phase separation between Al and Zn cannot fully proceed. As a result, the softening of coating layer expected by the combination with the thermal history (b) cannot sufficiently be attained at that high speed of cooling.

FIG. 1 shows the influence of the average cooling rate of coating layer on the workability of surface-treated steel sheet during the period of first 10 seconds after the steel sheet left the hot-dip coating bath. Each of the test samples applied was a surface-treated steel sheet prepared by applying thermal history (b) to the coating layer on a steel sheet, and further by forming a passivated layer, satisfying the condition of the present invention, thereon. The evaluation of the workability was given conforming to the method of workability evaluation applied in the embodiments described later.

As seen in FIG. 1, for the evaluation of 0T bending workability, the average cooling rates of 11° C./sec or more to the coating layer during the first 10 seconds after the steel sheet left the hot-dip coating bath obtained 2 or lower evaluation level. To the contrary, the average cooling rate of less than 11° C./sec obtained 4 or higher evaluation level, which suggests a drastic improvement is attained in the latter case.

To give the thermal history (a) to the coating layer, it is necessary to provide the continuous hot-dip coating apparatus with a temperature control unit between the hot-dip coating bath level and the roll to which the steel sheet contacts first after leaving the bath, and to control the cooling rate of the coating layer by the temperature control unit. A preferable temperature control unit is the one having a means for heating or soaking and having, at need, a means for cooling. The cooling means aims to cool the coated steel sheet, which steel sheet is under the control of cooling rate of the coating layer by the means for heating or soaking, before contacting the steel sheet with the first roll (top roll, or the like) to prevent the generation of pickup on the roll surface. Applicable means for heating or soaking in the temperature control unit includes an induction heater and a gas-heating furnace. Applicable means for cooling includes a gas-blowing unit. The means for heating or soaking and the means for cooling of the temperature control unit are not specifically limited if only they can apply the thermal history (a) to the coating layer.

As for the thermal history (b), the coating layer after treated by the thermal history (a), (or the coating layer after solidified the hot-dip coated metal), is heated to a temperature T(° C.) between 130° C. and 300° C., preferably between 130° C. and 200° C., followed by cooling thereof at an average cooling rate of C(° C./hr), defined by eq. (1)

given above, or less in a temperature range of from T(° C.) to 100° C., or, applying C(° C./hr), defined by eq. (1), or less of average cooling rate in a temperature range of from T(° C.) between 130° C. and 300° C. to 100° C. after the hot-dip coated metal solidified. As a result, the strain accumulated in the coating layer is relaxed, as described before, and solid diffusion is induced in the coating layer, thus further effectively accelerating the phase separation, began in the thermal history (a), between Al and Zn in the coating layer. Consequently, owing to the combination effect of the thermal history (b) and the thermal history (a), the coating layer becomes significantly soft, and the workability thereof significantly improves.

If the heating temperature T of the coating layer in the thermal history (b) is lower than 130° C., the above-described effect cannot satisfactorily be attained. If the heating temperature T exceeds 300° C., the growth of alloy phase is enhanced at interface between the substrate steel sheet and the coating layer, which degrades the workability. From that point of view, the upper limit of heating temperature T preferred to improve the workability is 200° C.

Also for the case of cooling the coating layer under a condition that the thermal history (b) is applied thereto starting from a temperature T(° C.) between 130° C. and 300° C., which temperature range is the cooling period after the hot-dip plated plating metal solidified, the temperature T below 130° C. cannot attain above-described satisfactory effect.

FIG. 2(a) shows the influence of heating temperature of coating layer of surface-treated steel sheet on the workability of the coated steel sheet during the heat treatment after solidifying the hot-dip coated metal. All the tested samples were surface-treated steel sheets which were subjected to cooling in a temperature range of from the heating temperature to 100° C. at an average cooling rate of the coating layer within the condition of thermal history (b), and which were coated with a passivated layer that satisfies the condition of the present invention on the coated steel sheet after subjected to the thermal history (a). The evaluation of the workability was given conforming to the method of workability evaluation applied in the embodiments described later.

Figure 2B:
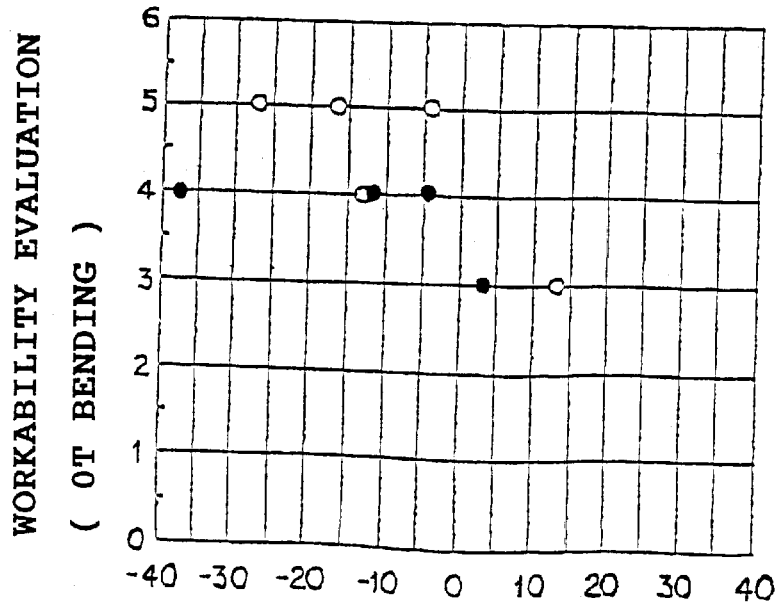
FIG. 2(b) is a graph showing the influence of the average cooling rate of coating layer on the workability of surface-treated steel sheet in the Embodiment 1.

FIG. 2(b) shows the influence of the average cooling rate of coating layer, (or average cooling rate in a temperature range of from the heating temperature to 100° C.) on the workability of the coated steel sheet during the heat treatment after solidifying the hot-dip coated metal. All the tested samples were surface-treated steel sheets which were subjected to heating the coating layer to a heating temperature within the condition of thermal history (b), and which were coated with a passivated layer on the coated steel sheet after subjected to the thermal history (a). The evaluation of the workability was given conforming to the method of workability evaluation applied in the embodiments described later.

As shown in FIG. 2(a) and FIG. 2(b), the range of heating temperature of coating layer from 130° C. to 300° C. attained 4 or higher evaluation level for the 0T bending workability, and the range of from 130° C. to 200° C., which is a preferable range, attained 4 to 5 of evaluation level. On the other hand, the heating temperatures outside the range of from 130° C. to 300° C. attained only 3 level of evaluation. When the difference between the average cooling rate in a temperature range of from the heating temperature to 100° C. and the value of "C" defined by eq. (1) was zero or negative value, (within the range of the present invention), the evaluation level for 0T bending workability was 4 or 5.

When, however, the difference is positive value, (outside the range of the present invention), the workability evaluation level was only 3.

To apply the thermal history (b) to the coating layer, the continuous hot-dip coating apparatus is provided with (inside or outside thereof) a heating or soaking unit for applying heat treatment to or for holding heat in the coating layer, thus conducting the heat treatment or soaking. For example, a heating mechanism (such as induction heater, gas heating furnace, and hot stove) may be installed in the continuous hot-dip coating furnace to conduct continuous in-line heating, or off-line batchwise heating may be applied after coiled. Alternatively, continuous heating using a heating mechanism (such as induction heater, gas heating furnace, and hot stove) may be applied by an off-line continuous treatment apparatus, or an adequate heating or soaking may be applied after coiled the coated steel sheet which was continuously heated within the line or the above-described continuous treatment apparatus. Furthermore, a soaking unit that can soak and can slowly cool the coating layer may be applied during the cooling stage after solidified the hot-dip coated metal.

The type, shape, scale, or other characteristics of the heating or soaking unit is not specifically limited if only the unit can apply the thermal history (b) to the coating layer.

By applying a specified passivated layer to the coating layer which was subjected to the thermal history (a) and the thermal history (b), the obtained surface-treated steel sheet provides extremely high workability and corrosion resistance at the worked portion.

The passivated layer formed on the coating layer preferably contains chromated chromium of 0.1 mg/m$^2$ or more and less than 100 mg/m$^2$ as metallic chromium. Formation of that kind of passivated layer on the above-described specific coating layer that hardly induces cracks significantly improves the corrosion resistance at worked portion. The passivated layer may be structured by a plurality of layers if only the above-described chromium exists in the total layer. In other words, the above-described chromium may exist in only one layer of the plurality of layers, or may exist in more than one layer thereof.

If the chromium content in the passivated layer is less than 0.1 mg/m$^2$ as metallic chromium, the corrosion resistance at worked portion cannot fully be improved. If the chromium is 100 mg/m$^2$ or more, the effect of improving the corrosion resistance at worked portion saturates, and the increased amount of chromium degrades the environmental compatibility caused by the reduction in the fixing rate of chromium.

A more preferable passivated layer is the one prepared by applying a chromating solution, containing a water organic resin and chromic acid and/or chromic acid compound which is prepared by reducing a part of chromic aid, onto the coating layer, then by drying the applied solution at sheet temperatures of from 80° C. to 300° C., which passivated layer has a mass ratio of the organic resin (A) to the chromium (B) as metallic chromium in the passivated layer, (A)/(B), of 1 or more and less than 200.

By including chromium and the organic resin, the passivated layer provides further strong corrosion resistance at worked portion.

In that type of passivated layer, if the mass ratio of the organic resin (A) to the chromium (B) as metallic chromium, (A)/(B), is less than 1, the effect of organic resin to improve the corrosion resistance at worked portion cannot fully be attained. On the other hand, if the mass ratio (A)/(B) is 200 or more, the effect of chromium to improve the corrosion resistance at worked portion cannot fully be attained.

On forming the passivated layer, if the drying temperature of the applied chromating solution is lower than 80° C. of the sheet temperature, the low temperature cannot form adequate passivated layer. If, on the other hand, the sheet temperature exceeds 300° C., the coating layer is exposed to further heat, which results in enhanced alloying reaction and may degrades the workability.

Furthermore, the passivated layer preferably has a structure of a chromate layer and a specific upper layer formed on the chromate layer. The upper layer is the one prepared by applying a treatment solution containing a water organic resin onto the choromate film and by drying the solution at temperatures of from 80 to 300° C. Better corrosion resistance at worked portion is attained by structuring the passivated layer with the chromate layer and the above-described upper layer formed on the chromate layer.

During forming the upper layer film, if the drying temperature of the applied solution is lower than 80° C. of the sheet temperature, the low temperature cannot form an adequate passivated layer, and, if the sheet temperature exceeds 300° C., the coating layer is exposed to further heat, which results in enhanced alloying reaction and may degrades the workability.

The total chromium amount in the passivated layer (chromate layer+upper layer) is 0.1 mg/m² or more and less than 100 mg/m² as metallic chromium. The reason to specify the range is given before. The upper layer may or may not contain chromium. Existence of chromium in the upper layer, however, improves the corrosion resistance. A preferable thickness of the upper layer is in a range of from about 0.1 ιm to about 5 ιm. Less than 0.1 ιm of thickness cannot give sufficient improvement effect of corrosion resistance at worked portion, and, more than 0.1 ιm of thickness may induce pickup on a roll during the roll-forming of the surface-treated steel sheet.

The passivated layer preferably has the mass ratio, (A)/(B), of 1 or more and less than 200, where (A) signifies the total amount of organic resin in the film, and (B) signifies the total amount of chromium (B) as metallic chromium in the layer. If the mass ratio (A)/(B) is less than 1, the effect of organic resin to improve the corrosion resistance at worked portion cannot fully be attained. On the other hand, if the mass ratio (A)/(B) is 200 or more, the effect of chromium to improve the corrosion resistance at worked portion cannot fully be attained.

The following is the description of the method for manufacturing the surface-treated steel sheet according to the Embodiment 1.

The manufacturing method according to the Embodiment 1 is a method for manufacturing the surface-treated steel sheet using a continuous hot-dip coating apparatus or the like, which steel sheet uses a hot-dip Al—Zn base coated steel sheet having a coating layer containing 20 to 95 mass % Al, as the substrate steel sheet, and forms a passivated layer on the substrate coated steel sheet. The method has the steps of applying thermal history of at least (a) and (b) described below and of forming a specific passivated layer on the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip plated plating metal solidified, and cooling thereof at an average cooling rate of C(° C./hr), defined by eq. (1), or less in a temperature range of from T(° C.) to 100° C., and/or a thermal history of average cooling rate of C(° C./hr), defined by eq. (1), or less in a temperature range of from T(° C.) between 130° C. and 300° C. to 100° C. after solidification of the hot-dip coated metal.

$$C=(T-100)/2 \tag{1}$$

As of the thermal history (a) and the thermal history (b) applied to the coating layer, the thermal history (a) is given by controlling the cooling condition of the coating layer immediately after plated.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a hot stove. Applicable means for cooling includes a gas-blowing unit.

Application of the thermal history (b) is conducted by giving a specific heat treatment to the coated steel sheet after solidifying the hot-dip plated plating metal, or by controlling the cooling rate of the coating layer after solidifying the hot-dip plated plating metal by soaking or the like. According to the manufacturing method of the present invention, a specific passivated layer is formed on the coating layer of the coated steel sheet. The heat treatment to apply the thermal history (b) to the coating layer may be given in any one stage of ① before forming the passivated layer, ② during drying period of the passivated layer, and ③ after forming the passivated layer (after applying the treatment solution and succeeding drying period to form the film). Alternatively, the heat treatment to apply the thermal history (b) may be given in more than one stage among the three described above.

Consequently, the application of thermal history (b) to the coating layer may be given in at least one stage among the four (1) through (4) given below.

(1) Before the passivation;

(2) During drying period of the passivation;

(3) After the passivation;

(4) During cooling period after solidification of the hot-dip coated metal.

As of the above-described stages for applying heat treatment, the stage ① has an advantage of being able to optimize independently the individual conditions of the heat treatment step and the passivation treatment step, and the stages of ② and ③ are suitable for carrying out all the treatments in the continuous hot-dip coating apparatus. The stage ② is particularly superior in economy to other stages because the heat treatment utilizes the heat of the drying period in the passivation treatment.

The heat treatment or soaking for applying the thermal history (b) to the coating layer is conducted using a heating or soaking unit located inside or outside the continuous hot-dip coating apparatus. For example, a heating mechanism (such as induction heater and hot stove) may be installed in the continuous hot-dip coating apparatus to conduct continuous in-line heating, or off-line batchwise heating may be applied after coiled the coated steel sheet. Alternatively, continuous heating using a heating mechanism (such as induction heater and hot stove) may be applied by an off-line continuous treatment apparatus, or adequate heating or soaking may be applied after coiled the coated steel sheet which was continuously heated within the line or in the above-described continuous treatment apparatus. Furthermore, a soaking unit that can soak and can slowly cool the coating layer may be applied during the cooling period after the hot-dip coated metal solidified. There is, however, no specific limit on the type, shape, scale, or other characteristics of the heating or soaking unit if only the unit can apply the thermal history (b) to the coating layer.

The reason for specifying preferred coating layer composition and coating weight on the manufactured hot-dip Al—Zn base coated steel sheet, and for specifying the thermal history (a) and the thermal history (b), and the obtained functions and effects are as described before.

According to the manufacturing method of the Embodiment 1, one or more treatment including at least chromate treatment is applied to the coating layer on the coated steel sheet to form a passivated layer containing chromium of 0.1 mg/m² or more and less than 100 mg/m² as metallic chromium. The sequential order of the step of forming the passivated layer and the step of applying the thermal history (b) is as described before.

The above-described chromate treatment contains the steps of applying a chromating solution onto the coated steel sheet, and, normally, of drying the applied solution at temperatures of from 80° C. to 300° C. without washing the applied film with water.

As described before, the passivated layer may be structured by a plurality of layers. In that case, plurality of treatments is sequentially conducted. For the case of the plurality of layers, the above-described chromium may exist in a total layer. In other words, the above-described chromium may exist in only one layer of the plurality of layers, or may exist in more than one layer thereof.

A preferred composition and treatment condition of the passivated layer are as described before. That is, particularly preferred passivated layer is the one prepared by applying a chromating solution containing a water organic resin, chromic aid and/or a chromic acid compound which is prepared by reducing a part of chromic aid, then by drying the applied solution at sheet temperatures of from 80° C. to 300° C. The mass ratio of the organic resin (A) to the chromium (B) as metallic chromium in the passivated layer, (A)/(B), is 1 or more and less than 200.

As described above, a specified upper layer may be formed after the chromate treatment. In that case, the passivated layer is a composite layer of the chromate layer and the upper layer. The total amount of chromium in the passivated layer (chromate layer+upper layer) is 0.1 mg/m² or more and less than 100 mg/m² as metallic chromium. The upper layer may or may not contain chromium. Nevertheless, presence of chromium in the upper layer further increases the corrosion resistance. Thickness of the upper layer is preferably in a range of from about 0.1 ιm to about 0.5 ιm. The mass ratio (A)/(B), or the total amount of organic resin (A) in the layer to the total amount of chromium (B) as metallic chromium in the layer, is preferably 1 or more and less than 200. The upper layer is prepared by applying a treatment solution containing, for example, a water organic resin, and by drying thereof at sheet temperatures of from 80° C. to 300° C. The reason of specifying the individual variables and the functions and effects are as described before.

EXAMPLE 1-1

Cold-rolled steel sheets (0.5 mm in thickness) which were prepared by a known method were introduced to a continuous hot-dip coating apparatus to conduct hot-dip coating using respective coating baths: 55%Al-1.5%Si—Zn bath (for Nos. 1 through 11 in Table 1); 40%Al-1.0%Si—Zn bath (for No. 12 in Table 1); and 70%Al-1.8%Si—Zn bath (for No. 13 in Table 1). The line speed was fixed to 160 m/min, and the dispersion in coating weight on one side of the steel sheet among treated sheets was controlled to a range of from 75 to 90 g/m².

During the process for manufacturing the coated steel sheets, the thermal history (I) and the thermal history (II), shown in Table 1, were applied to the coating layer, and the passivation treatment was given to the coating layer. The passivation treatment was conducted by applying a treatment solution of a mixture of acrylic resin emulsion and chromic acid (at a mass ratio of resin solid matter to chromium of 100 to 1) onto the coated steel sheet at a chromium coating weight of 20 mg/m² as metallic chromium, then by drying the coating layer at 120° C. For No. 11 in Table 1, however, the drying temperature was 140° C. because the thermal history specified by the present invention was given in the drying period of passivation treatment.

With thus manufactured surface-treated steel sheets, the workability and the corrosion resistance at worked portion were evaluated using the methods described below. The results are given in Table 1.

(1) Workability

The surface-treated steel sheet was bent to 0T state. The crack generated at the front end of the 0T bend portion was observed to give five-grade evaluation, which grades are described below.

5: Observation with a 20×magnifier identified no crack.

4: Visual observation did not identify crack; observation with a 20×magnifier, however, identified crack.

3: Visual observation identified crack.

2: Visual observation identified widely opened crack.

1: Crack accompanied with separation of film occurred.

(2) Corrosion Resistance at Worked Portion

After giving 3T bending to the surface-treated steel sheet, the sheet was put in a wet tester at 50° C. and 98% RH. After 1,000 hours of test period, the state of rust generation at the bend portion was observed to give five-grade evaluation, which grades are described below.

5: No abnormality appeared.

4: Slight degree of white rust and black rust appeared in a part of the surface area.

3: Slight degree of white rust and black rust appeared over the whole surface area.

2: Significant white rust and black rust appeared over the whole surface area.

1: Red rust appeared.

TABLE 1

| | | Thermal history (I) *1 Average cooling rate (° C./sec) | Thermal history (II) *2 | | | Workability (T0) | Corrosion resistance at worked portion (3T) | Classification |
| --- | --- | --- | --- | --- | --- | --- | --- | --- |
| No. | Coating layer composition | | Heating temperature (° C.) *3 | Average cooling rate (° C./hr) *4 | Stage of heat treatment *5 | | | |
| 1 | 55% Al—1.5% Si | <u>15</u> | 180 | 19 | (2) | 2 | 1 | Comparative example |
| 2 | 55% Al—1.5% Si | 8 | <u>330</u> | 50 | (2) | 3 | 3 | Comparative example |

TABLE 1-continued

| | | Thermal history (I) *1 | Thermal history (II) *2 | | | | Corrosion resistance at worked portion (3T) | |
|---|---|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Workability (TO) | | Classification |
| 3 | 55% Al—1.5% Si | 8 | <u>105</u> | 20 | (2) | 3 | 3 | Comparative example |
| 4 | 55% Al—1.5% Si | 8 | 265 | <u>85</u> | (2) | 3 | 3 | Comparative example |
| 5 | 55% Al—1.5% Si | 8 | 165 | <u>45</u> | (2) | 3 | 3 | Comparative example |
| 6 | 55% Al—1.5% Si | 10 | 280 | 52 | (2) | 4 | 4 | Example |
| 7 | 55% Al—1.5% Si | 10 | 180 | 23 | (2) | 5 | 4 | Example |
| 8 | 55% Al—1.5% Si | 4 | 145 | 18 | (2) | 5 | 4 | Example |
| 9 | 55% Al—1.5% Si | 4 | 240 | 58 | (2) | 4 | 4 | Example |
| 10 | 55% Al—1.5% Si | 8 | 185 | 15 | (1) | 5 | 5 | Example |
| 11 | 55% Al—1.5% Si | 8 | 170 | 22 | (3) | 4 | 4 | Example |
| 12 | 40% Al—1.0% Si | 9 | 140 | 15 | (2) | 4 | 4 | Example |
| 13 | 70% Al—1.8% Si | 7 | 230 | 60 | (2) | 4 | 4 | Example |

*1 Average cooling rate of coating layer during the first 10 seconds after the steel sheet left from hot-dip coating bath.
*2 Thermal history applied by the heat treatment conducted after the hot-dip coated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment, (3): During drying stage of passivation treatment.
※: Numeral with underline is outside the range of the present invention.

EXAMPLE 1-2

Cold-rolled steel sheet (0.5 mm in thickness) which was prepared by a known method was introduced to a continuous hot-dip coating apparatus to conduct hot-dip coating using a 55%Al-1.5%Si—Zn coating bath. The line speed was fixed to 160 m/min, and the dispersion in coating weight on one side of the steel sheet was controlled to a range of from 75 to 90 g/m².

During the process for manufacturing the coated steel sheet, the thermal history (I) and the thermal history (II), shown in Table 2, were applied to the coating layer, and the passivation treatment was given to the coating layer. The passivation treatment was conducted by providing a chromium coating weight of 20 mg/m² on the coated steel sheet, followed by drying the chromate layer at 80° C., further by applying a treatment solution containing polyurethane emulsion resin onto the chromate layer, which was then dried at 120° C.

With thus manufactured surface-treated steel sheet, the workability and the corrosion resistance at worked portion were evaluated using the methods of Example 1-1. The results are given in Table 2.

Embodiment 2

The coated steel sheet according to the Embodiment 2 is prepared by using a substrate steel sheet of hot-dip Al—Zn base coated steel sheet having a coating layer containing 20 to 95 mass % Al, and by successively forming, from lower position to upper position, a passivated layer, a primer layer, and a top coat layer. The detail of the conformation of the coating layers and of the substrate coated steel sheet is described below.

(1) Hot-dip Al—Zn Base Coated Steel Sheet

Hot-dip Al—Zn base coated steel sheet having a coating layer containing 20 to 95 mass % Al shows excellent corrosion resistance. From the point of corrosion resistance, a preferred range of the aluminum is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available. That type of hot-dip Al—Zn base coated steel sheet is, however, difficult to attain high corrosion resistance at worked portions thereof solely by the coating composition, and the high worked portion corrosion resistance can be attained by applying thermal history, which

TABLE 2

| | | Thermal history (I) *1 | Thermal history (II) *2 | | | | Corrosion resistance at worked portion (3T) | |
|---|---|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Workability (TO) | | Classification |
| 1 | 55% Al—1.5% Si | 10 | 250 | 55 | (2) | 4 | 4 | Example |
| 2 | 55% Al—1.5% Si | 10 | 170 | 27 | (2) | 5 | 4 | Example |

*1 Average cooling rate of coating layer during the first 10 seconds after the steel sheet left from hot-dip coating bath.
*2 Thermal history applied by the heat treatment conducted after the hot-dip coated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment, (3): During drying stage of passivation treatment.

will be described later, and also by combining the coating layer with the upper layer of passivated layer and painting film layer.

Although the coating weight on the hot-dip Al—Zn base coated steel sheet has not specifically limited, generally it is adequate to be in an approximate range of from 30 to 200 g/m² per a side of the steel sheet.

It is necessary that the coating layer on the hot-dip Al—Zn base coated steel sheet is the one that is prepared by applying thermal history of at least (a) and (b) described below. (a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip coated metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after the hot-dip coated metal solidified.

$$C=(T-100)/2 \tag{1}$$

In the thermal history of (b), more preferable temperature range of T(° C.) is from 130° C. to 200° C.

By applying the above-described heat histories (a) and (b) to the coating layer, the workability (crack resistance and other characteristics) of the coating layer is significantly improved notwithstanding that the coating layer is a hot-dip Al—Zn base coated layer. Presumable reason of the significant improvement in the workability of coating layer through the heat histories (a) and (b) is the following. First, the thermal history (a) is applied to the coating layer immediately after the coated steel sheet left the hot-dip coating bath. That is, the coating layer is subjected to the thermal history (a) of sufficiently low average cooling rate during a period of the first 10 seconds after leaving the hot-dip coating bath, which brings the solidification of the hot-dip coated layer closer to an equilibrium state than ordinary cooling process does. Accordingly, the diffusion in half-melting state accelerates the phase separation between Al and Zn, thus softening the coating layer. Secondly, the coating layer after subjected to the thermal history (a) further undergoes the thermal history (b). The thermal history (b) is the one to give slow-cooling to the coating layer under a specified condition after heated the coating layer to temperatures of 130° C. to 300° C. (preferably 130° C. to 200° C.), and/or the one to give slow cooling to the coating layer under a specified condition from a temperature range of 130° C. to 300° C. (preferably 130° C. to 200° C.) after solidifying the coating layer. The thermal history (b) releases the strain accumulated in the coating layer during solidification, and induces solid diffusion in the coating layer, thus the phase separation between Al and Zn in the coating layer, began in the thermal history (a), is further effectively accelerated. As a result, the coating layer becomes significantly soft, and the workability thereof significantly improves.

Therefore, the softening of coating layer and the significant improvement in workability thereof owe to a combined effect of above-described two kinds of thermal history, (a) and (b). Only one thermal history, (a) or (b), is difficult to form the soft coating layer and to obtain the improved coating layer workability.

The detail of the heat histories (a) and (b) is described in the following.

Regarding the thermal history (a), the average cooling rate of the coating layer is less than 11° C./sec during the first 10 seconds after the steel sheet left the hot-dip coating bath, which brings the solidification of the hot-dip coated layer closer to an equilibrium state than ordinary cooling process does, as described above. Accordingly, the diffusion in half-melting state accelerates the phase separation between Al and Zn, thus softening the coating layer. If the average cooling rate is 11° C./sec or more during the first 10 seconds after the steel sheet left the hot-dip coating bath, the solidification speed becomes excessively high, so the solidification of the hot-dip coated layer proceeds in a non-equilibrium state, and, the period in half-melting state is short so that the phase separation between Al and Zn cannot fully proceed. As a result, the softening of coating layer expected by the combination with the thermal history (b) cannot sufficiently be attained at that high speed of cooling.

Figure 3:
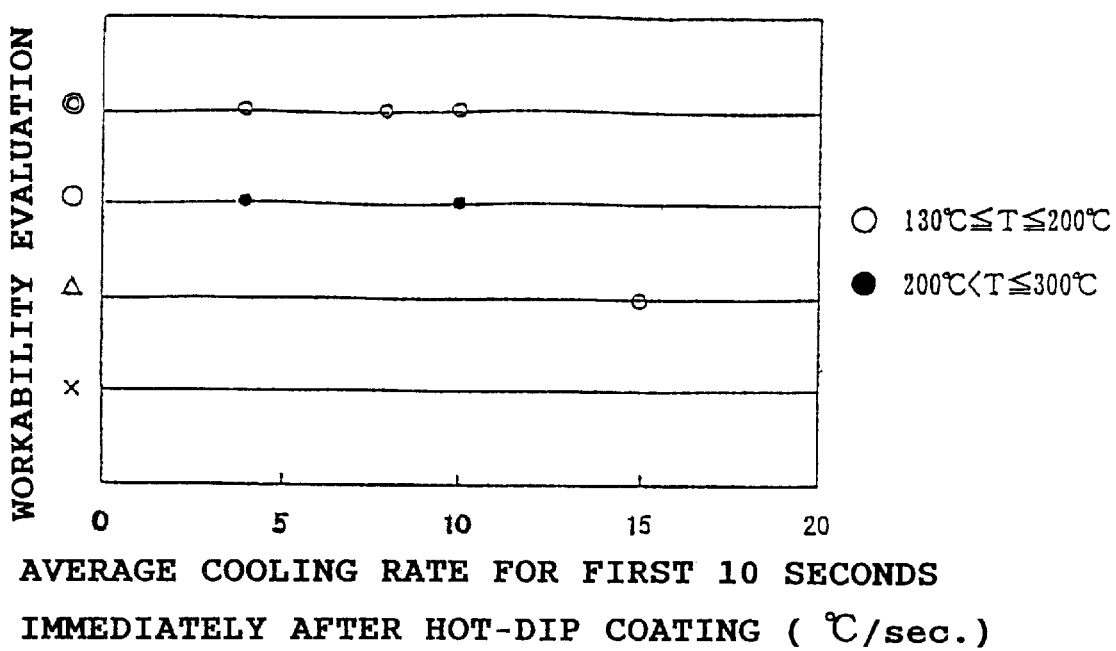
FIG. 3 is a graph showing the influence of the average cooling rate of coating layer on the workability of surface-treated steel sheet in the Embodiment 2.

FIG. 3 shows the influence of the average cooling rate of coating layer on the workability of a coated steel sheet during a period of the first 10 seconds after the steel sheet left the hot-dip coating bath. Each of the test samples applied was a coated steel sheet prepared by applying thermal history (b) to the coating layer on a steel sheet, and further by forming a passivated layer, a primer layer, and a top coat layer, satisfying the condition of the present invention, onto the coated steel sheet which has the coating layer subjected to the thermal history (b). The evaluation of the workability was given conforming to the method of workability evaluation applied in the embodiments described later.

As seen in FIG. 3, the average cooling rates of 11° C./sec or more to the coating layer during the first 10 seconds after the steel sheet left the hot-dip coating bath obtained "x" evaluation level for the working of 180° bending. To the contrary, the average cooling rate of less than 11° C./sec obtained "○" or higher evaluation level of workability, which suggests a drastic improvement is attained in the latter case.

To give the thermal history (a) to the coating layer, it is necessary to provide the continuous hot-dip coating apparatus with a temperature control unit between the hot-dip coating bath level and the roll to which the steel sheet contacts first after leaving the bath, and to control the cooling rate of the coating layer by the temperature control unit. A preferable temperature control unit is the one having a means for heating or soaking and having, at need, a means for cooling. The cooling means aims to cool the coated steel sheet, which steel sheet is under the control of cooling rate of the coating layer by the means for heating or soaking, before contacting the steel sheet with the first roll (top roll, or the like) to prevent the generation of pickup on the roll surface. Applicable means for heating or soaking in the temperature control unit includes an induction heater and a hot stove. Applicable means for cooling includes a gas-blowing unit. The means for heating or soaking and the means for cooling of the temperature control unit are not specifically limited if only they can apply the thermal history (a) to the coating layer.

As for the thermal history (b), the coating layer after treated by the thermal history (a), (or the coating layer after solidified the hot-dip coated metal), is heated to a temperature T(° C.) between 130° C. and 300° C., preferably between 130° C. and 200° C., followed by cooling thereof at an average cooling rate of C(° C./hr), defined by eq. (1) given above, or less in a temperature range of from T(° C.) to 100° C., or, applying C(° C./hr), defined by eq. (1), or less of average cooling rate in a temperature range of from T(° C.) between 130° C. and 300° C. to 100° C. after the hot-dip coated metal solidified. As a result, the strain accumulated in the coating layer is released, as described before, and solid diffusion is induced in the coating layer, thus further effectively accelerating the phase separation, began in the thermal history (a), between Al and Zn in the coating layer. Consequently, owing to the combination effect of the thermal history (b) and the thermal history (a), the coating layer becomes significantly soft, and the workability thereof significantly improves.

If the heating temperature T of the coating layer in the thermal history (b) is lower than 130° C., the above-described effect cannot satisfactorily be attained. If the heating temperature T exceeds 300° C., the growth of alloy phase is enhanced at interface between the substrate steel sheet and the coating layer, which degrades the workability. From that point of view, the upper limit of heating temperature T preferred to improve the workability is 200° C.

Also for the case of cooling the coating layer under a condition that the thermal history (b) is applied thereto starting from a temperature T(° C.) between 130° C. and 300° C., which temperature range is the cooling period after the hot-dip coated metal solidified, the temperature T below 130° C. cannot attain above-described satisfactory effect.

Figure 4A:
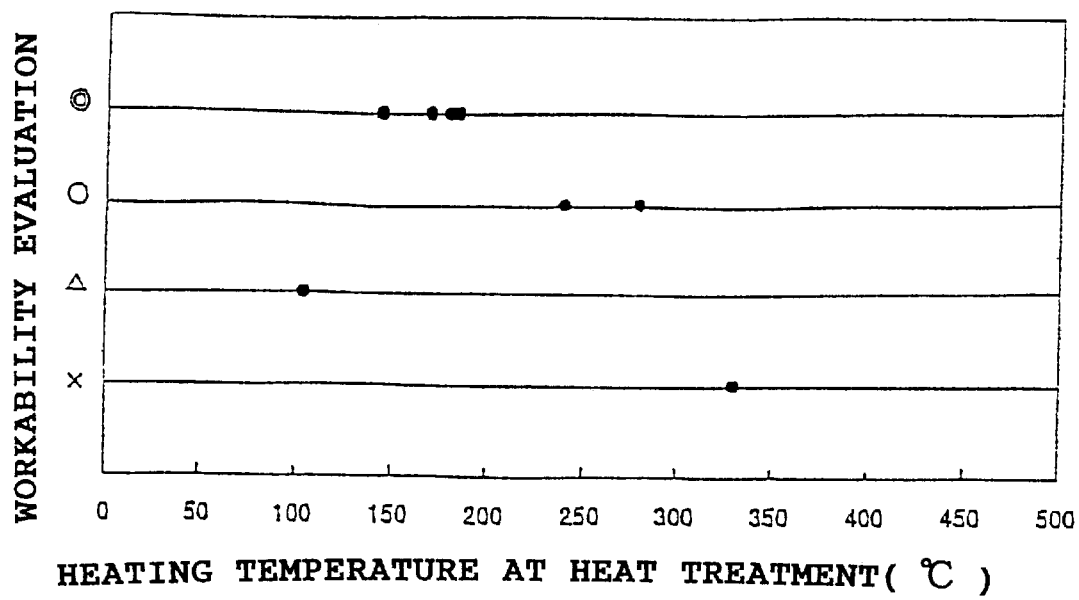
FIG. 4(a) is a graph showing the influence of the heating temperature of coating layer on the workability of surface-treated steel sheet in the Embodiment 2.

FIG. 4(a) shows the influence of heating temperature of coating layer of a surface-treated steel sheet on the workability of the coated steel sheet during the heat treatment after solidifying the hot-dip coated metal on the steel sheet. All the tested samples were coated steel sheets, each of which was prepared by forming a passivated layer, a primer layer, and a top coat layer, which satisfy the conditions of the present invention, on a coated steel sheet having a coating layer subjected to the thermal history (a) and subjected to an average cooling rate within the condition of the thermal history (b) in a coating layer temperature range of from the heating temperature to 100° C. The evaluation of the workability was given conforming to the method of workability evaluation applied in the embodiments described later.

Figure 4B:
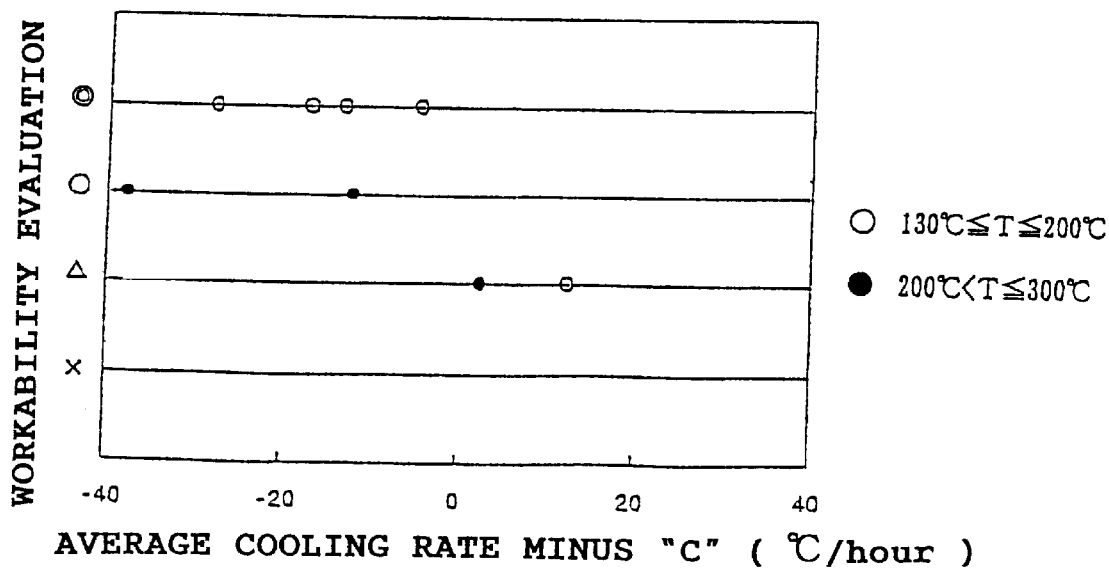
FIG. 4(b) is a graph showing the influence of the average cooling rate of coating layer on the workability of surface-treated steel sheet in the Embodiment 2.

FIG. 4(b) shows the influence of the average cooling rate of coating layer, (or average cooling rate in a temperature range of from the heating temperature to 100° C.), on the workability of the coated steel sheet during the heat treatment after solidifying the hot-dip coated metal. All the tested samples were coated steel sheets, each of which was prepared by forming a passivated layer, an primer layer, and a top coat layer, which satisfy the conditions of the present invention, on a coated steel sheet having a coating layer subjected to the thermal history (a) and heated to a temperature within the range of the thermal history (b). The evaluation of the workability was given conforming to the method of workability evaluation applied in the embodiments described later.

As shown in FIG. 4(a) and FIG. 4(b), the range of heating temperature of coating layer from 130° C. to 300° C. attained "○" or higher evaluation level for the 180° bending workability, and the range of from 130° C. to 200° C., which is a preferable range, attained "⊚" of evaluation level. On the other hand, the heating temperatures outside the range of from 130° C. to 300° C. attained only "Δ" evaluation level. When the difference between the average cooling rate in a temperature range of from the heating temperature to 100° C. and the value of "C" defined by eq. (1) was zero or negative value, (within the range of the present invention), the evaluation level for 180° bending workability was "○" or higher level within a heating temperature range of coating layer from 130° C. to 300° C., while obtaining "⊚" evaluation for a temperature range of from 130° C. to 200° C., which is a preferred range. When, however, the difference is positive value, (outside the range of the present invention), the workability evaluation level was only "x".

To apply the thermal history (b) to the coating layer, the continuous hot-dip coating apparatus is provided with (inside or outside thereof) a heating or soaking unit for applying heat treatment or for holding heat to the coating layer, thus conducting the heat treatment or soaking. For example, a heating mechanism (such as induction heater, gas heating furnace, and hot stove) may be installed in the continuous hot-dip coating equipment to conduct continuous in-line heating, or off-line batchwise heating may be applied after coiled. Alternatively, continuous heating using a heating mechanism (such as induction heater, gas heating furnace, and hot stove) may be applied by an off-line continuous treatment apparatus, or adequate heating or soaking may be applied after coiled the coated steel sheet which was continuously heated within the line or the above-described continuous treatment apparatus. Furthermore, a soaking unit that can soak and can slowly cool the coating layer may be applied during the cooling stage after solidified the hot-dip coated metal.

The type, shape, scale, or other characteristics of the heating or soaking unit is not specifically limited if only the unit can apply the thermal history (b) to the coating layer.

By forming a specified painting film layer on the coating layer which was subjected to the thermal history (a) and the thermal history (b), the obtained coated steel sheet provides extremely high workability and corrosion resistance at the worked portion.

(2) Passivated Layer

The kind of passivated layer as the primer is not specifically limited, and the passivation treatment may be chromate treatment, zinc phosphate treatment, and treatment with an organic resin as the main component. Generally, when the environmental compatibility is emphasized, the treatment uses a material containing mainly organic resin, and when the corrosion resistance is emphasized, the chromate treatment is used. The zinc phosphate treatment is complex in the process, and, for the case of hot-dip Al—Zn base coated steel sheet having a coating layer containing 20 to 70 mass % Al, the reactivity of phosphorus may not be sufficient, so the use of zinc phosphate treatment should be adopted considering the reactivity.

(3) Primer Layer

Thickness of primer layer is selected to a range of from 2 to 5 $\mu$m. If the thickness is less than 2 $\mu$m, satisfactory rust-preventive performance cannot be attained. If the thickness exceeds 15 $\mu$m, anti-flaw performance degrades, and the production cost increases, which are unfavorable.

From the viewpoint of workability and of corrosion resistance at worked portion, the principal resin for primer layer is preferably a polyester-base resin and/or an epoxy-base resin.

The polyester-base resin may be a bisphenol A added polyester resin. The epoxy-base resin may be the one which is modified in part with polyurethane resin, phenol resin, amino resin, or the like.

The polyester-base resin preferably has number average molecular weights of from 1,000 to 30,000, more preferably from 3,000 to 20,000. If the number average molecular weight is less than 1,000, the elongation of paint film layer is insufficient so that satisfactory workability cannot be attained, which may fail to provide sufficient paint film layer performance. On the other hand, if the number average molecular weight exceeds 30,000, the principal resin becomes viscous, which needs an excess amount of diluent, further leads to decrease in the percentage of the resin in the paints. In that case, adequate paint film layer cannot be formed, and the miscibility with other ingredients may decrease.

When a bisphenol A added polyester resin is used as the principal resin, the content of bisphenol A in the bisphenol A added polyester resin is preferably in a range of from 1 to 70 mass %, more preferably from 3 to 60 mass %, and most preferably from 5 to 50 mass %. The lower limit and the upper limit of the content are preferred from the viewpoint of assuring paint film layer strength and of assuring elongation of the paint film layer, respectively.

Examples of applicable polyalcohol to obtain the polyester resin are ethyleneglycol, diethyleneglycol, propyleneglycol, dipropyleneglycol, polypropyleneglycol, neopentyleneglycol, 1,4-butane diol, 1,5-pentane diol, and 1,6-hexane diol. Alternatively, 1,4-cyclohexane dimethanol, polytetramethylene etherglycol, polycaprolactone polyol, glycerin, sorbitol, annitol, trimethylol ethane, trimethylol propane, hexanetriol, pentaerythritol, dipentaerythritol, or the like may be applied as the polyalcohol. These polyalcohols may also be used by combining two or more of them.

Examples of polyvalent base to obtain the polyester resin are phthalic acid, phthalic anhydride, tetrahydrophthalate, tetrahydrophthalic anhydride, hexahydrophthalate, hexahydrophthalic anhydride, himic anhydride, and trimellitic acid. Further examples are trimellitic anhydride, pyromellitic acid, pyromellitic anhydride, isophthalic acid, terephthalic acid, maleic acid, maleicanhydride, fumaric acid, itaconic acid, adipic acid, azelaic acid, sebacic acid, succinic acid, succinic anhydride, and 1,4-cyclohexane dicarboxylate. These polyvalent bases may be applied by combining two or more of them.

Examples of the epoxy resin are epoxy compounds of bisphenols such as bisphenol A, bisphenol B, and bisphenol S, with epihalohydrin or â-methyl epihalohydrin, or copolymers of them.

Furthermore, the epoxy resin may be the above-given epoxy compounds modified by monocarboxylic acid or by dicarboxylic acid, modified by mono-, di-, or polyalcohol, modified by mono- or diamine, and modified by mono-, di-, or polyphenol.

Curing agent for the above-described principal resin may be a polyisocyanate compound and/or an amino resin.

The polyisocyanate compound may be an isocyanate compound prepared by a known method, and, particularly the one as a single-liquid type paint. Preferred polyisocyanate compound includes the one which is blocked by phenol, cresol, secondary aromatic amine, tertiary alcohol, lactam, or oxime. By the use of blocked polyisocyanate compound, storage as single-liquid type is available, which makes the use as paint easy.

More preferred polyisocyanate compound includes non-yellowing hexamethylenediisocyanate (hereinafter referred to simply as "HDI"), a derivative thereof, tolylenediisocyanate (herein after referred to simply as "TDI"), a derivative thereof, 4,4'-diphenylmethanediisocyanate (hereinafter referred to simply as "MDI"), a derivative thereof, xylylenediisocyanate (hereinafter referred to simply as "XDI"), a derivative thereof, isophoronediisocyanate (hereinafter referred to simply as "IPDI"), a derivative thereof, trimethylhexamethylenediisocyanate (hereinafter referred to simply as "TMDI"), a derivative thereof, hydrogenated TDI, a derivative thereof, hydrogenated MDI, a derivative thereof, hydrogenated XDI, and a derivative thereof.

When a polyisocyanate compound is used as the curing agent, the mixing molar ratio of the isocyanate group in the polyisocyanate compound to the hydroxyl group in the principal resin, [NCO/OH], is preferably in a range of from 0.8 to 1.2, more preferably from 0.90 to 1.10. If the molar ratio [NCO/OH] is less than 0.8, the curing of paint film layer is insufficient, and the hardness and strength of the paint film layer become insufficient. If the molar ratio [NCO/OH] exceeds 1.2, a side reaction occurs between excess amount of isocyanate groups or between isocyanate group and urethane, which degrades the workability of the paint film layer.

Applicable amino resin as the curing agent includes: a resin prepared by the reaction between formaldehyde and urea, benzoguanamine, melamine, and the like; and a compound prepared by alkyletherification of the resin by an alcohol such as methanol and butanol.

Specifically, the amino resin may be a methylated urea resin, a n-butylated benzoguanamine resin, and an iso-butylated melamine resin.

When an amino resin is used as the curing agent, the mixing ratio of the amino resin to the principal resin, (weight ratio of solid matter), is preferably in a range of from 95:5 to 60:40, more preferably from 85:15 to 75:25.

The mixing percentage of the curing agent is preferably in a range of from 9 to 50 mass % to the solid matter in the resin. If the mixing percentage of the curing agent is less than 9 mass %, the obtained paint film layer has not sufficient hardness. If the mixing percentage exceeds 50 mass %, the workability becomes insufficient.

The resin composition for primer layer may contain additives including: curing catalyst such as p-toluene sulfonate, tin octoate, and dibutyltin laurate; pigment such as calcium carbonate, kaolin, clay, titanium oxide, iron oxide red, mica, carbon black, and aluminum powder; anti-rust pigment such as chromate and aluminum tripolyphosphate; anti-foam agent; and anti-flow agent, at need.

From the point of corrosion resistance, chromate is most preferred as the anti-rust pigment. The chromate may be strontium chromate, potassium chromate, zinc chromate, calcium chromate, and barium chromate. As of these, strontium chromate is most preferred.

The content of chromate in the solid matter of paint film layer is preferably in a range of from 1 to 50 mass %, more preferably from 10 to 45 mass %. If the content of chromate is less than 1 mass %, satisfactory rust-preventive effect cannot be attained. If the content of chromate exceeds 50 mass %, the adhesiveness with top coat layer degrades.

(4) Top Coat Layer

The thickness of top coat layer is between 5 and 30 ɪm. If the thickness of top coat layer is less than 5 ɪm, sufficient workability and corrosion resistance at worked portion cannot be obtained. If the thickness exceeds 30 ɪm, the workability degrades and the production cost increases, which is not favorable.

The glass transition temperature of the top coat layer is between 30° C. and 90° C. If the glass transition temperature of the top coat layer is below 30° C., the anti-flaw performance degrades. If the glass transition temperature is above 90° C., the workability of the top coat layer degrades, so the workability as total coated steel sheet becomes poor even if the workability of coated steel sheet itself is improved, as described before.

Applicable principal resin in the top coat layer includes a polyester-base resin, an acrylic-base resin, and a polyvinylidene fluoride-base resin (a mixed resin of polyvinylidene fluoride resin with acrylic resin). The polyester-base resin may be a polyester resin, a silicon-modified polyester resin, an acrylic-modified polyester resin, or the like.

As of these principal resins, polyester-base resin and polyvinylidene fluoride-base resin are preferred from the point of workability, and polyester-base resin is most preferred from the point of cost.

The polyester resin is not specifically limited if only the resin has at least two hydroxyl groups in a single molecule and has number average molecular weights of from 1,000 to 20,000. Specifically, however, the polyester resin having the number average molecular weights of from 2,000 to 20,000 is more preferable.

If the number average molecular weight of the polyester resin is less than 2,000, the workability may significantly degrade. On the other hand, if the number average molecular weight exceeds 20,000, the weather resistance degrades, and the viscosity increases to consume excess amount of diluent, which decreases the percentage of resin in the paint so that adequate paint film layer cannot be obtained, and furthermore, miscibility with other ingredients may degrade. The "number average molecular weight of the polyester resin" referred herein means the "molecular weight counted as polystyrene, determined by GPC".

The hydroxyl group in the polyester resin may be positioned either at a terminal or at a side chain of the molecule.

The polyester resin is a copolymer prepared by heating and reacting a polybasic compound with a polyalcohol.

Applicable polybasic compound includes phthalic anhydride, isophthalic acid, terephthalic acid, trimellitic anhydride, maleic acid, adipic acid, and fumaric acid.

Applicable polyalcohol includes ethyleneglycol, diethyleneglycol, polyethyleneglycol, propyleneglycol, dipropyleneglycol, polyproplyleneglycol, 1,4-butanediol, 1,6-hexanediol, neopentylglycol, triethleneglycol, glycerin, pentaerythritol, trimethylolpropane, and trimethylolethane.

When the polyvinylidene fluoride-base resin is added as a component of top coat layer, the resin is used as a mixture of resins containing acrylic resin therein.

The polyvinylidene fluoride-base resin preferably has weight average molecular weights of from 300,000 to 700,000, and has the melting points of from 150° C. to 180° C. An example of the applicable polyvinylidene fluoride-base resin is Kainer 500 (weight average molecular weight of 350,000, melting point of 160° C. to 165° C.), (trade mark, manufactured by Japan Pennwalt Chemical Co., Ltd.)

The acrylic resin mixed with the polyvinylidene fluoride resin preferably has number average molecular weights of from 1,000 to 2,000. The acrylic resin may be prepared by polymerizing (or copolymerizing) at least one kind of monomer given below, (at least one kind of acrylic monomer shall be included), using a known method.

① Ethylenic monomer having hydroxyl group: for example, hydroxymethyl(meth)acrylate, hydroxyethyl (meth)acrylate, hydroxypropyl(meth)acrylate, and hydroxybutyl(meth)acrylate.

② Ethylenic monomer having carboxylic group: for example, (meth)acrylic acid, crotonic acid, itaconic acid, fumaric acid, and maleic acid.

③ Ethylenic monomer which is copolymerizable with a monomer in the above-given and monomers: for example, methyl(meth)acrylate, ethyl(meth)acrylate, propyl(meth) acrylate, butylacrylate, n-propylacrylate, n-butylacrylate, isobutylacrylate, 2-ethylhexylacrylate, n-octylacrylate, and (meth)acrylic alkyl ester.

④ Styrene and styrene derivative such as â-methylstyrene, o-methylstyrene, m-methylstyrene, and p-methylstyrene.

Among these monomers, a monomer having functional group such as hydroxyl group and carboxyl group is able to conduct a crosslinking reaction with other reactive component.

The acrylic resin used in the present invention is not required to have self-crosslinking function. If the crosslinking function is given to the acrylic resin, what is called the crosslinking monomer, which has two or more radical polymerizable unsaturated bonds, is given to a single molecule. Examples of the radical polymerizable monomer are polymerizable unsaturated compounds such as etnyleneglycoldiacrylate, ethyleneglycoldimethacrylate, triethyleneglycoldimethacrilate, tetraethyleneglycoldimetacrylate, 1,3-butyleneglycoldimethacrylate, trimethylolpropanetriacrylate, trimethylolpropanetrimethacrylate, 1,4-butanedioldiacrylate, neopentylglycoldiacrylate, 1,6-hexanedioldiacrylate, pentaerythritoldiacrylate, pentaerythritoltrimethacrylate, pentaerythritoltetramethacrylate, glyceroldimethacrylate, glyceroldiacrylate, diallylterephthalate, diallylphthalate, glycidylacrylate, and glycidylmethacrylate. The crosslinking monomer may be added to the acrylic resin up to 20 mass %.

The mixing ratio of the polyvinylidene fluoride resin to the acrylic resin, (weight ratio of solid matter in the resin), (polyvinylidene resin:acrylic resin), is preferably in a range of from 90:10 to 50:50. If the ratio of polyvinylidene fluoride resin to acrylic resin exceeds 90:10, the thixotropic property becomes strong, which leads to difficulty in applying the resin by roll coater, and results in non-uniform finish of paint film layer, or poor appearance of paint film layer. If the ratio becomes less than 50:50, the degradation of adhesiveness of paint film layer with time becomes significant, and the weather resistance significantly degrades, which is not favorable.

The mixing percentage of the acrylic resin and the polyvinylidene fluoride resin is preferably adjusted to 40 mass % or more as solid matter in the paint film layer. If the mixing percentage is less than 40 mass %, the target paint film layer performance cannot be attained.

When the polyester-base rein and the acrylic-base resin are used as the principal resins, a curing agent can be mixed together. Applicable curing agent includes a polyisocyanate compound and/or an amino resin.

The polyisocyanate compound may be an isocyanate compound prepared by a known method. Specifically, the polyisocyanate compound can be used as a single-liquid type coating. Preferred polyisocyanate compound includes the one that is blocked by a blocking agent such as phenol, cresol, secondary aromatic amine, tertiary alcohol, lactam, and oxime. By using the blocked polyisocyanate compound, storage of the single-liquid type product becomes possible, and the handling as the painting material becomes easy.

More preferable polyisocyanate compound includes HDI, a derivative thereof, TDI, a derivative thereof, MDI, a derivative thereof, XDI, a derivative thereof, IPDI, a derivative thereof, TMDE, a derivative thereof, hydrogenated TDI, a derivative thereof, hydrogenated MDI, a derivative thereof, hydrogenated XDI, and a derivative thereof.

When a polyisocyanate compound is used as the curing agent, the mixing molar ratio of the isocyanate group in the polyisocyanate compound to the hydroxyl group in the main component resin, [NCO/OH], is preferably in a range of from 0.8 to 1.2, more preferably from 0.90 to 1.10. If the molar ratio [NCO/OH] is less than 0.8, the curing of paint film layer is insufficient, and the hardness and strength of the paint film layer become insufficient. If the molar ratio [NCO/OH] exceeds 1.2, a side reaction occurs between excess amount of isocyanate groups or between isocyanate group and urethane, which degrades the workability of the paint film layer.

Applicable amino resin as the curing agent includes: a resin prepared by the reaction between formaldehyde and urea, benzoguanamine, melamine, and the like; and a compound prepared by alkyletherification of the resin by an alcohol such as methanol and butanol.

Specifically, the amino resin may be a methylated urea resin, a n-butylated benzoguanamine resin, and an iso-butylated melamine resin.

When an amino resin is used as the curing agent, the mixing ratio of the amino resin to the principal resin, (weight ratio of solid matter), is preferably in a range of from 95:5 to 60:40, more preferably from 85:15 to 75:25.

The mixing percentage of the curing agent is preferably in a range of from 9 to 50 mass % to the solid matter in the resin. If the mixing percentage of the curing agent is less than 9 mass %, the obtained paint film layer has not sufficient hardness. If the mixing percentage exceeds 50 mass %, the workability becomes insufficient.

The resin composition for primer layer may contain additives including: curing catalyst such as p-toluene sulfonate, tin octoate, and dibutyltin laurate; pigment such as calcium carbonate, kaolin, clay, titanium oxide, iron oxide red, mica, carbon black, and aluminum powder; anti-rust pigment such as chromate and aluminum tripolyphosphate; anti-foam agent; and anti-flow agent, at need.

The method for manufacturing coating steel sheet according to the Embodiment 2 is described in the following.

The manufacturing method according to the Embodiment 2 is a method for manufacturing a coated steel sheet using a substrate steel sheet of hot-dip Al—Zn base coated steel sheet having a coating layer containing 20 to 95 mass % Al, prepared by a continuous hot-dip coating apparatus or the like. The method has the steps of applying thermal history of at least (a) and (b) described below, of successively forming a passivated layer, a primer layer, and a top coat layer on the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip coated metal solidified, and cooling thereof at an average cooling rate of C(° C./hr), defined by eq. (1), or less in a temperature range of from T(° C.) to 100° C., and/or a thermal history of an average cooling rate of C(° C./hr), defined by eq. (1), or less in a temperature range of from T(° C.) between 130° C. and 300° C. to 100° C. after the hot-dip coated metal solidified.

$$C=(T-100)/2 \quad (1)$$

As of the thermal history (a) and the thermal history (b) applied to the coating layer, the thermal history (a) is given by controlling the cooling condition of the coating layer immediately after the plating.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a gas-heating furnace. Applicable means for cooling includes a gas-blowing unit.

Application of the thermal history (b) is conducted by giving a specific heat treatment to the coated steel sheet after solidifying the hot-dip coated metal, or by controlling the cooling rate of the coating layer after solidifying the hot-dip coated metal by soaking or the like. According to the manufacturing method of the present invention, a specific passivated layer, an primer layer, and a top coat layer are successively formed, in this order, on the coating layer of the coated steel sheet. The heat treatment to apply the thermal history (b) to the coating layer may be given in any one stage of ① before the passivation treatment, ② during drying period of the passivation treatment, ③ after the passivation treatment (after applying the treatment solution and succeeding drying period) and before the painting of the primer, ④ during drying period of the primer, ⑤ after the painting of primer (after applying and drying the coat) and before the painting of top coat, ⑥ during drying period of the top coat, and after the painting of the top coat (after applying and drying the paint). Alternatively, the heat treatment to apply the thermal history (b) may be given to more than one stage among the seven described above.

Consequently, the application of thermal history (b) to the coating layer may be given in at least one stage among the eight (1) through (8) given below:

(1) before the passivation;

(2) during drying period of the passivation;

(3) after the passivation and before painting the primer.

(4) during drying period of the primer;

(5) after the painting of primer and before the painting of top coat;

(6) during drying period of the top coat;

(7) after the painting of top coat;

(8) During cooling period after solidification of hot-dip coated metal.

As of the above-described stages for applying heat treatment, the stages ②, ④, and ⑥ conduct heat treatment utilizing the heat in drying the passivation layer, the primer layer, and the top coat layer, respectively, so they are particularly superior in economy.

The heat treatment or soaking for applying the thermal history (b) to the coating layer is conducted using a heating or soaking unit located inside or outside the continuous hot-dip coating apparatus. For example, a heating mechanism (such as induction heater, gas heating furnace, and hot stove) may be installed in the continuous hot-dip coating apparatus to conduct continuous in-line heating, or off-line batchwise heating may be applied after coiled the coated steel sheet. Alternatively, continuous heating using a heating mechanism (such as induction heater, gas heating furnace, and hot stove) may be applied by an off-line continuous treatment apparatus, or adequate heating or soaking may be applied after coiled the coated steel sheet which was continuously heated within the line or in the above-described continuous treatment apparatus. Furthermore, a soaking unit that can soak and can slowly cool the coating layer may be applied during the cooling period after the hot-dip coated metal solidified. There is, however, no specific limit on the type, shape, scale, or other characteristics of the heating or soaking unit if only the unit can apply the thermal history (b) to the coating layer.

The reason for limiting the preferred coating layer composition and coating weight on the manufactured hot-dip Al—Zn base coated steel sheet, and for specifying the thermal history (a) and the thermal history (b), and the obtained functions and effects are as described before.

As described before, the kind of passivation treatment applied as the surface preparation to the coated steel sheet is not specifically limited, and the treatment may be chromate treatment, zinc phosphate treatment, and a treatment with organic resin as the main component. Since the drying in the passivation treatment is generally conducted by heating and drying the paint film layer in a hot stove, an induction heater, or the like, the thermal history (b) may be given to the coating layer using the heating drying step, as described before.

An primer, preferably the one containing above-described resin as the principal resin while further containing, at need, a curing agent, is applied onto the passivated layer, which primer is then baked. Furthermore, a top coat, preferably the one containing above-described resin as the principal resin while further containing, at need, a curing agent, is applied onto the primer, which top coat is then baked. Thus, the primer layer and the top coat layer are formed. The constitution of the primer and the top coat is as described before.

The method for applying respective coatings for forming paint film layers (primer layer and top coat layer) is not specifically limited. A preferred method thereof is roll coater coating, curtain flow coating, or the like. After painting, the paint film layer is formed by baking using hot-air heating, infrared heating, induction heating, or the like.

The baking treatment to heat and cure the paint film layer for the primer is adequately done at baking temperatures (maximum ultimate sheet temperatures) of from 150° C. to 270° C., preferably from 180° C. to 250° C. If the baking temperature is lower than 150° C., the curing reaction of the paint film layer becomes insufficient, and the corrosion resistance of the coated steel sheet likely degrades. If the baking temperature exceeds 270° C., the reaction becomes excessive, which may degrade the adhesiveness with top coat layer.

For the top coat layer, the baking temperature (maximum ultimate sheet temperature) is in a range of from 150° C. to 260° C., preferably from 180° C. to 260° C. If the baking temperature is lower than 150° C., the polymerization of resin becomes insufficient, and the corrosion resistance and anti-flaw performance of the coated steel sheet likely degrade. If the baking temperature exceeds 280° C., the reaction becomes excessive, which may degrade the workability of the coated steel sheet.

The baking period for the primer and the top coat is not specifically limited. Generally, however, their baking period is preferably in an approximate range of from 20 to 120 seconds.

As described before, the coating layer may undergo the thermal history (b) utilizing the baking treatment of the coating layer.

EXAMPLE 2

Cold-rolled steel sheets (0.35 mm in thickness) which were prepared by a known method were introduced to a continuous hot-dip coating apparatus to conduct hot-dip coating using respective coating baths: 55%Al-1.5%Si—Zn coating bath (for Example Nos. 1 through 6 and Nos. 9 through 18; and for Comparative Example Nos. 1 through 13); 40%Al-1.0%Si—Zn coating bath (for Example No. 7); and 70%Al-1.8%Si—Zn coating bath (for Example No. 18). The line speed was fixed to 160 m/min, and the dispersion in coating weight on one side of the steel sheet among treated sheets was controlled to a range of from 75 to 90 g/m$^2$. As Comparative Example No. 14, a hot-dip 5%Al—Zn base coated steel sheet (with 130 g/m$^2$ Of coating weight per a side thereof) was also prepared.

During the course of manufacturing these coated steel sheets, the thermal history (I) and the thermal history (II) given in Tables 3, 5, and 7 were applied, respectively, and the conditions of primer layer and the top coat layer were varied to prepare respective coated steel sheets, which are described below. The applied primer is shown in Table 9, and that of top coat is shown in Table 10.

EXAMPLE NO. 1

Example No. 1 is a coated steel sheet prepared by applying normal chromate treatment (with the coating weight of 40 mg/m$^2$ as metallic chromium) onto a hot-dip 55%Al—Zn base coated steel sheet having a coating layer treated by a thermal history which satisfies the condition of the present invention, followed by applying primer and further by applying top coat, which primer and top coat are described below.

The primer material was prepared by mixing 125 weight parts of block-urethane-modified epoxy resin (trade name "Epokey 830", manufactured by Mitsui Chemicals, Inc.) as the principal resin, 75 weight parts of strontium chromate as the anti-rust agent, 25 weight parts t of titanium oxide as the pigment, and 25 weight parts of clay, as the weight parts of solid matter. Thus prepared mixture was agitated in a sand-mill for one hour to obtain a coating composition. The coating composition was applied onto the chromated steel sheet to 4 ιm of dry-film thickness using a bar coater. The applied paint film layer was baked under a condition of 220° C. of ultimate sheet temperature and 38 seconds of baking time.

The top coat material was prepared by mixing 100 weight parts of polyester resin (trade name "Almatex P645", manufactured by Mitsui Chemicals, Inc.) as the principal resin, 25 weight parts of methylated melamine (trade name "CYMEL 303", manufactured by Mitsui Chemicals, Inc.) as the curing agent, 0.2 weight parts of p-toluene sulfonate as the curing catalyst, and 100 weight parts of titanium oxide as the pigment, as the weight parts of solid matter. Thus prepared mixture was agitated in a sand-mill for one hour to obtain a coating composition. The coating composition was applied onto the primered steel sheet to 13 ιm of dry-film thickness using a bar coater. The applied paint film layer was baked under a condition of 230° C. of ultimate sheet temperature and 53 seconds of baking time.

Onto the rear side of the coated steel sheet, a polyester-base rear side coating was applied using a bar coater to a dry-film thickness of 6 ιm, which film was then baked under a condition of 220° C. of ultimate sheet temperature and 38 seconds of baking time.

EXAMPLE NOS. 2 THROUGH 10

Example Nos. 2 through 14 were prepared under the same conditions with those in Example No. 1, except that the condition of thermal history applied to the coating layer was varied from that of Example No. 1.

Example Nos. 5 and 6 were prepared under the same conditions with those in Example No. 1, except that the stage (timing) of applying the specified thermal history to the coating layer was varied from that of Example No. 1.

Example Nos. 7 and 8 were prepared under the same conditions with those in Example No. 1, except that the composition of coating layer was varied from that of Example No. 1.

Example Nos. 9 and 10 were prepared under the same conditions with those in Example No. 1, except that the thickness of primer layer was varied from that of Example No. 1.

EXAMPLE NOS. 11, 12

Example Nos. 11 and 12 were prepared under the same conditions with those in Example No. 1, except that the kind of primer was different from that of Example No. 1.

The primer of Example No. 11 was prepared by mixing 100 weight parts of polyester resin (trade name "Almatex HMP27", manufactured by Mitsui Chemicals, Inc.) as the principal resin, 25 weight parts of methylated melamine resin (trade name "CYMEL 303", manufactured by Mitsui Chemicals, Inc.) as the curing agent, and 0.2 weight parts of p-toluene sulfonate as the curing catalyst, while other components and mixing ratio thereof were the same as those in Example No. 1.

The primer of Example No. 12 was prepared by using urethane-modified epoxy resin (trade name "Epokey 802-30CX", manufactured by Mitsui Chemicals, Inc.) as the principal resin, while other components and mixing ratio thereof were the same as those in Example No. 1.

EXAMPLE NOS. 13 AND 14

The thickness of top coat layer was differed from that of Example No. 1, while other conditions were the same with those in Example No. 1.

EXAMPLE NOS. 15 THROUGH 17

The top coat was different from that of Example No. 1, while other conditions were the same with those in Example No. 1.

The top coat of Example No. 15 was prepared by using acrylic resin (trade name "Almatex 745-5M", manufactured by Mitsui Chemicals, Inc.) as the principal resin, while other components and mixing ratio thereof were the same as those in Example No. 1.

The top coat of Example No. 16 was prepared by mixing polyvinylidene fluoride resin (trade name "Kainer 500", manufactured by Japan Pennwalt Chemical Co., Ltd.) and acrylic resin (trade name "Parorite" manufactured by Rohm & Haas) as the principal resin at a ratio of the polyvinylidene fluoride resin to the acrylic resin of 70:30, as the solid matter mass ratio, while other components and mixing ratio thereof were the same as those in Example No. 1.

The top coat of Example No. 17 was prepared by using polyester resin (trade name "Almatex P647BC", manufactured by Mitsui Chemicals, Inc.) as the principal resin, while other components and mixing ratio thereof were the same as those in Example No. 1.

EXAMPLE NO. 18

Compared with Example No. 1, the mixing ratio of the curing agent in the top coat was varied to 40 weight parts to 100 weight parts of the principal resin. The other conditions were the same as those in Example No. 1.

COMPARATIVE EXAMPLE NOS. 1 THROUGH 14

Comparative Example Nos. 1 through 5 dissatisfied the condition of the present invention in terms of the heat treatment condition of coating. Comparative Example Nos. 6 and 7 dissatisfied the condition of the present invention in terms of the thickness of primer layer. Comparative Example Nos. 8 and 9 dissatisfied the condition of the present invention in terms of the thickness of top coat layer. Comparative Example Nos. 10 and 11 dissatisfied the condition of the present invention in terms of the glass transition temperature of the top coat layer. For these Comparative Examples, other conditions than those given above were the same with those in Example No. 1.

Comparative Example No.12 is a comparative example in which the coating layer did not undergo the thermal history specified by the present invention. Comparative Example No. 13 is a comparative example in which the primering was not given. Comparative Example No. 14 is a comparative example in which the substrate coated steel sheet was hot-dip 5%Al—Zn coated steel sheet, (furthermore, no thermal history specified by the present invention was applied). For all of these Comparative Examples, other conditions than those described above were the same as those in Example No. 1.

To each of the coating steel sheets given above, the workability, the adhesiveness at worked portion, the corrosion resistance at worked portion, and the hardness of paint film layer were evaluated using the respective methods described below. In addition, the glass transition temperature of top coat layer was determined for each of them. The results are shown in Tables 3 through 8, along with the constitution of respective coated steel sheets.

① Workability

In a room at 20° C. of temperature, the sample was subjected to the 180° bend working test. The crack generation was checked using a 30×magnifier. The evaluation was given on the basis of minimum number of clamped sheets generating crack, (T).

⊚: No crack was generated at 6T bending.

○: Crack was generated at 6T bending, and no crack was generated at 7T bending.

Δ: Crack was generated at 7T bending, and no crack was generated at 8T bending.

x: Crack was generated at 8T bending.

② Adhesiveness at Worked Portion

After conducting the 180° 5T bending test in a 20° C. room, the bent portion on the sample was subjected to the test of attaching-peeling adhesive tapes. The peeling percentage (area percentage) of the paint film layer at the bent portion was determined to give the evaluation as follows.

⊚: Paint film layer peeling percentage was 0%.
○: Paint film layer peeling percentage was more than 0% and less than 10%.
x: Paint film layer peeling percentage was 10% or more.

③ Corrosion Resistance at Worked Portion

The coated steel sheet was cut to a size of 160×70 mm, to which the 180° 3T bending test was applied in a 20° C. room. Then, the four side edges of thus bent sample were sealed with a tar-epoxy resin. The prepared sample was subjected to 300 cycles of accelerated test of the dry-wet cyclic corrosion test specified by JIS K5621, (hereinafter referred to as the "CCT test"), to determine the blistering rate (area percentage) on the paint film layer. The blistering rate is defined as the total length of blistered portion in the width direction of the paint film layer at a bend portion having a width of 50 mm, excluding the 10 mm distance from both edges of the sample. The blistering rate is expressed by percentage, (for example, two positions of blister with 5 mm in width within the 50 mm range is calculated to 20% blistering rate.)

The CCT test condition according to JIS K5621 is specified as follows. A single cycle of the test consists of [5% salt water spray at 30° C. for 1 hour→wet state of 95%RH at 30° C. for 1.5 hours→dry state of 20%RH at 50° C. for 2 hours→dry state of 20%RH at 30° C. for 2 hours], or total 6 hours, while repeating the cycle to the specified number of cycles.

The evaluation was given on the determined blistering rate, based on the criterion given below.

⊚: Blistering rate was less than 10%.
○: Blistering rate was 10% or more and less than 30%.
Δ: Blistering rate was 30% or more and less than 50%.
x: Blistering rate was 50% or more.

④ Hardness of Paint Film Layer

Based on Article 8.4 of JIS K5400, a pencil with a hardness class H was used to determine if scratch flaw was generated or not on the top coat layer. The evaluation was given on the criterion described below.

○: Flaw was generated.
x: No flaw was generated.

⑤ Determination of Glass Transition Temperature on Paint Film Layer

Using a tester TMA "SS6100" of Seiko Instrument Co., Ltd., the glass transition temperature on the top coat layer was determined under a condition of 10 g load at heating speed of 10° C./min in a temperature range of from 0° C. to 150° C.

As shown in Tables 3 through 8, the coated steel sheets of Examples (or the coated steel sheets according to the present invention) provide favorable characteristics of workability, adhesiveness at worked portion, corrosion resistance at worked portion, and hardness of paint film layer. To the contrary, Comparative Examples are inferior in at least one of these characteristics to the Examples.

TABLE 3

| No. | Coating layer composition | Thermal history (I) *1 Average cooling rate (° C./sec) | Thermal history (II) *2 Heating temperature (° C.) *3 | Thermal history (II) *2 Average cooling rate (° C./hr) *4 | Thermal history (II) *2 Stage of heat treatment *5 | Primer layer Kind *6 | Primer layer Film thickness (μm) | Top coat layer Kind *7 | Top coat layer Film thickness (μm) | Tg point of top coat film (° C.) *8 | Classification |
|---|---|---|---|---|---|---|---|---|---|---|---|
| 1 | 55% Al—1.5% Si | 10 | 180 | 23 | 1 | B | 4 | E | 13 | 60 | Example |
| 2 | 55% Al—1.5% Si | 10 | 280 | 52 | 1 | B | 4 | E | 13 | 60 | Example |
| 3 | 55% Al—1.5% Si | 4 | 145 | 18 | 1 | B | 4 | E | 13 | 60 | Example |
| 4 | 55% Al—1.5% Si | 4 | 240 | 58 | 1 | B | 4 | E | 13 | 60 | Example |
| 5 | 55% Al—1.5% Si | 8 | 185 | 15 | 2 | B | 4 | E | 13 | 60 | Example |
| 6 | 55% Al—1.5% Si | 8 | 170 | 22 | 3 | B | 4 | E | 13 | 60 | Example |
| 7 | 40% Al—1.0% Si | 10 | 180 | 23 | 1 | B | 4 | E | 13 | 60 | Example |
| 8 | 70% Al—1.8% Si | 10 | 180 | 23 | 1 | B | 4 | E | 13 | 60 | Example |
| 9 | 55% Al—1.5% Si | 10 | 180 | 23 | 1 | B | 2 | E | 13 | 60 | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 9.
*7 Symbol designates the top coat layer component given in Table 10.
*8 Glass transition temperature of top coat layer.

TABLE 4

| | Performance | | | | |
|---|---|---|---|---|---|
| No. | Workability | Adhesiveness at worked portion | Corrosion resistance at worked portion | Paint film layer hardness | Classification |
| 1 | ⊚ | ⊚ | ⊚ | ○ | Example |
| 2 | ○ | ⊚ | ⊚ | ○ | Example |
| 3 | ⊚ | ⊚ | ⊚ | ○ | Example |
| 4 | ○ | ⊚ | ⊚ | ○ | Example |
| 5 | ⊚ | ⊚ | ⊚ | ○ | Example |
| 6 | ⊚ | ⊚ | ⊚ | ○ | Example |
| 7 | ⊚ | ⊚ | ○ | ○ | Example |
| 8 | ⊚ | ⊚ | ○ | ○ | Example |
| 9 | ⊚ | ⊚ | ⊚ | ○ | Example |

TABLE 5

| No. | Coating layer composition | Thermal history (I) *1 Average cooling rate (° C./sec) | Thermal history (II) *2 Heating temperature (° C.) *3 | Thermal history (II) *2 Average cooling rate (° C./hr) *4 | Stage of heat treatment *5 | Primer layer Kind *6 | Primer layer Film thickness (μm) | Top coat layer Kind *7 | Top coat layer Film thickness (μm) | Tg point of top coat film (° C.) *8 | Classification |
|---|---|---|---|---|---|---|---|---|---|---|---|
| 10 | 55% Al—1.5% Si | 10 | 180 | 23 | 1 | B | 10 | E | 13 | 60 | Example |
| 11 | 55% Al—1.5% Si | 10 | 180 | 23 | 1 | A | 4 | E | 13 | 60 | Example |
| 12 | 55% Al—1.5% Si | 10 | 180 | 23 | 1 | C | 4 | E | 13 | 60 | Example |
| 13 | 55% Al—1.5% Si | 10 | 180 | 23 | 1 | B | 4 | E | 5 | 60 | Example |
| 14 | 55% Al—1.5% Si | 10 | 180 | 23 | 1 | B | 4 | E | 20 | 60 | Example |
| 15 | 55% Al—1.5% Si | 10 | 180 | 23 | 1 | B | 4 | I | 13 | 60 | Example |
| 16 | 55% Al—1.5% Si | 10 | 180 | 23 | 1 | B | 4 | J | 13 | 55 | Example |
| 17 | 55% Al—1.5% Si | 10 | 180 | 23 | 1 | B | 4 | D | 13 | 30 | Example |
| 18 | 55% Al—1.5% Si | 10 | 180 | 23 | 1 | B | 4 | F | 13 | 80 | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 9.
*7 Symbol designates the top coat layer component given in Table 10.
*8 Glass transition temperature of top coat layer.

TABLE 6

| No. | Performance Workability | Performance Adhesiveness at worked portion | Performance Corrosion resistance at worked portion | Performance Paint film layer hardness | Classification |
|---|---|---|---|---|---|
| 10 | ◎ | ◎ | ◎ | ○ | Example |
| 11 | ◎ | ◎ | ◎ | ○ | Example |
| 12 | ◎ | ◎ | ◎ | ○ | Example |
| 13 | ◎ | ◎ | ◎ | ○ | Example |
| 14 | ◎ | ◎ | ◎ | ○ | Example |
| 15 | ○ | ◎ | ◎ | ○ | Example |
| 16 | ◎ | ◎ | ◎ | ○ | Example |
| 17 | ◎ | ◎ | ◎ | ○ | Example |
| 18 | ○ | ◎ | ◎ | ○ | Example |

TABLE 7

| No. | Coating layer composition | Thermal history (I) *1 Average cooling rate (° C./sec) | Thermal history (II) *2 Heating temperature (° C.) *3 | Thermal history (II) *2 Average cooling rate (° C./hr) *4 | Stage of heat treatment *5 | Primer layer Kind *6 | Primer layer Film thickness (μm) | Top coat layer Kind *7 | Top coat layer Film thickness (μm) | Tg point of top coat film (° C.) *8 | Classification |
|---|---|---|---|---|---|---|---|---|---|---|---|
| 1 | 55% Al—1.5% Si | <u>15</u> | 180 | 19 | 1 | B | 4 | E | 13 | 60 | Comparative example |
| 2 | 55% Al-1.5% Si | 8 | <u>330</u> | 50 | 1 | B | 4 | E | 13 | 60 | Comparative example |
| 3 | 55% Al-1.5% Si | 8 | <u>105</u> | 20 | 1 | B | 4 | E | 13 | 60 | Comparative example |
| 4 | 55% Al-1.5% Si | 8 | 265 | <u>85</u> | 1 | B | 4 | E | 13 | 60 | Comparative example |
| 5 | 55% Al-1.5% Si | 8 | 165 | <u>45</u> | 1 | B | 4 | E | 13 | 60 | Comparative example |
| 6 | 55% Al-1.5% Si | 10 | 180 | 23 | 1 | B | 1 | E | 13 | 60 | Comparative example |
| 7 | 55% Al-1.5% Si | 10 | 180 | 23 | 1 | B | <u>19</u> | E | 13 | 60 | Comparative example |
| 8 | 55% Al-1.5% Si | 10 | 180 | 23 | 1 | B | 4 | E | <u>3</u> | 60 | Comparative example |

TABLE 7-continued

| | | Thermal history (I) *1 | Thermal history (II) *2 | | | Primer layer | | Top coat layer | | Tg point | |
|---|---|---|---|---|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Kind *6 | Film thickness (μm) | Kind *7 | Film thickness (μm) | of top coat film (° C.) *8 | Classification |
| 9 | 55% Al-1.5% Si | 10 | 180 | 23 | 1 | B | 4 | E | <u>35</u> | 60 | Comparative example |
| 10 | 55% Al-1.5% Si | 10 | 180 | 23 | 1 | B | 4 | G | 13 | <u>20</u> | Comparative example |
| 11 | 55% Al-1.5% Si | 10 | 180 | 23 | 1 | B | 4 | H | 13 | 95 | Comparative example |
| 12 | 55% Al-1.5% Si | — | — | — | — | B | 4 | E | 13 | 60 | Comparative example |
| 13 | 55% Al-1.5% Si | 10 | 180 | 23 | 1 | — | — | E | 13 | 60 | Comparative example |
| 14 | 5% Al | — | — | — | — | B | 4 | E | 13 | 60 | Comparative example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 9.
*7 Symbol designates the top coat layer component given in Table 10.
*8 Glass transition temperature of top coat layer.
※ Numeral with underline is outside the range of the present invention.

TABLE 8

| | Performance | | | | |
|---|---|---|---|---|---|
| No. | Workability | Adhesiveness at worked portion | Corrosion resistance at worked portion | Paint film layer hardness | Classification |
| 1 | Δ | ○ | Δ | ○ | Comparative example |
| 2 | X | ○ | X | ○ | Comparative example |
| 3 | Δ | ○ | Δ | ○ | Comparative example |
| 4 | Δ | ○ | Δ | ○ | Comparative example |
| 5 | Δ | ○ | Δ | ○ | Comparative example |
| 6 | ◎ | ○ | Δ | ○ | Comparative example |
| 7 | Δ | ○ | ○ | X | Comparative example |
| 8 | X | ◎ | X | ○ | Comparative example |
| 9 | Δ | X | Δ | ○ | Comparative example |
| 10 | ◎ | ○ | ◎ | X | Comparative example |
| 11 | X | ○ | X | ○ | Comparative example |
| 12 | X | ○ | X | ○ | Comparative example |
| 13 | ◎ | X | X | X | Comparative example |
| 14 | ◎ | ◎ | X | ○ | Comparative example |

TABLE 9

[Primer layer components]

| | Principal resin | | Curing agent | |
|---|---|---|---|---|
| Symbol | Kind | Mixing rate | Kind | Mixing rate |
| A | Polyester resin "Almatex HMP27", manufactured by Mitsui Chemicals, Inc. | 100 | Methylated melamine "CYMEL 303", manufactured by Mitsui Chemicals, Inc. | 25 |
| B | Block-urethane-modified epoxy resin "Epokey 830", manufactured by Mitsui Chemicals, Inc. | 125 | — | 0 |
| C | Urethane-modified epoxy resin "Epokey 802-30CX", manufactured by Mitsui Chemicals, Inc. | 125 | — | 0 |

※1 "mixing rate" signifies the weight parts as solid matter.
※2 Paint film layer component A contains 0.2 weight parts of p-toluene sulfonate.
※3 Each of the paint film layer components A, B, and C contains 75 weight parts of strontium chromate, 25 weight parts of titanium oxide, and 24.5 weight parts of clay.

TABLE 10

[Top coat layer components]

| | Principal resin | | Curing agent | |
|---|---|---|---|---|
| Symbol | Kind | Mixing rate | Kind | Mixing rate |
| D | Polyester resin "Almatex P647BC", manufactured by Mitsui Chemicals, Inc. | 100 | Methylated melamine "CYMEL 303", manufactured by Mitsui Chemicals, Inc. | 25 |
| E | Polyester resin "Almatex P645", manufactured by Mitsui Chemicals, Inc. | 100 | Methylated melamine "CYMEL 303", manufactured by Mitsui Chemicals, Inc. | 25 |
| F | Polyester resin "Almatex P645", manufactured by Mitsui Chemicals, Inc. | 100 | Methylated melamine "CYMEL 303", manufactured by Mitsui Chemicals, Inc. | 40 |
| G | Polyester resin "Almatex P647BC", manufactured by Mitsui Chemicals, Inc. | 100 | Methylated melamine "CYMEL 303", manufactured by Mitsui Chemicals, Inc. | 10 |
| H | Polyester resin "Almatex P645", manufactured by Mitsui Chemicals, Inc. | 100 | Methylated melamine "CYMEL 303", manufactured by Mitsui Chemicals, Inc. | 80 |
| I | Acrylic resin "Almatex 745-5M", manufactured by Mitsui Chemicals, Inc. | 100 | Methylated melamine "CYMEL 303", manufactured by Mitsui Chemicals, Inc. | 25 |
| J | Polyvinylidene fluoride resin + Acrylic resin *1 | 100 | — | — |

*1 "Kainer 500" manufactured by Japan Pennwalt Chemical Co., Ltd. and "Parorite" manufactured by Rohm & Haas were mixed at 70/30 weight parts ratio as solid matter.
※1 "mixing rate" signifies the weight parts as solid matter.
※2 Each of the paint film layer components D through J contains 0.2 weight parts of p-toluene sulfonate and 25 weight parts of titanium oxide.

Embodiment 3

The coated steel sheet according to the Embodiment 3 is prepared by using a substrate steel sheet of hot-dip Al—Zn base coated steel sheet having a coating layer containing 20 to 95 mass % Al, and by successively forming, from lower position to upper position, a passivated layer, a primer layer, and a top coat layer. The detail of the conformation of the layers and of the substrate coated steel sheet is described below.

(1) Hot-dip Al—Zn Base Coated Steel Sheet

Hot-dip Al—Zn base coated steel sheet having a coating layer containing 20 to 95 mass % Al shows excellent corrosion resistance. From the point of corrosion resistance, a preferred range of the aluminum is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available. That type of hot-dip Al—Zn base coated steel sheet is, however, difficult to attain high corrosion resistance at worked portions thereof solely by the coating composition, and the high worked portion corrosion resistance can be attained by applying thermal history, which will be described later, and also by combining the coating layer with the upper layer of passivated layer and paint film layer.

Although the coating weight on the hot-dip Al—Zn base coated steel sheet has not specifically limited, generally it is adequate to be in an approximate range of from 30 to 200 g/m² per a side of the steel sheet.

It is necessary that the coating layer on the hot-dip Al—Zn base coated steel sheet is the one that is prepared by applying thermal history of at least (a) and (b) described below.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after solidification of the hot-dip coated metal, and cooling thereof at an average cooling rate of C(° C./hr), defined by eq. (1), or less in a temperature range of from T(° C.) to 100° C., and/or a thermal history of an average cooling rate of C(° C./hr), defined by eq. (1), or less in a temperature range of from T(° C.) between 130° C. and 300° C. to 100° C. after solidification of the hot-dip coated metal.

$$C = (T - 100)/2 \quad (1)$$

In the thermal history of (b), more preferable temperature range of T(° C.) is from 130° C. to 200° C.

By applying the above-described heat histories (a) and (b) to the coating layer, the workability (crack resistance and other characteristics) of the coating layer is significantly improved notwithstanding that the coating layer is a hot-dip Al—Zn base coating layer.

(2) Passivated Layer

The kind of passivated layer as the undercoat is not specifically limited, and the passivation treatment may be chromate treatment, zinc phosphate treatment, and treatment with an organic resin as the main component. Generally, when the environmental compatibility is emphasized, the treatment uses a material containing mainly organic resin, and when the corrosion resistance is emphasized, the chromate treatment is used. The zinc phosphate treatment is complex in the process, and, for the case of hot-dip Al—Zn base coated steel sheet having a coating layer containing 20 to 70 mass % Al, the reactivity of phosphorus may not be sufficient, so the use of zinc phosphate treatment should be adopted considering the reactivity.

(3) Primer Layer

The primer layer is a paint film layer having 2 ιm or more of dry film thickness, formed by applying a paint which contains main component resins of: a modified polyester resin (C) having k values, defined by the equation given below, of from 0.7 to 2.5, and prepared by a reaction between a polyester resin (A) having number average molecular weights of from 14,000 to 26,000 and glass transition temperatures of from ° C. to 30° C., and an epoxy resin (B); and a curing agent(D).

$$k=[Wb \times (Ma+2 \times Mb)]/[(Wa+Wb) \times 2 \times Mb]$$

where, Wa designates the weight ratio of solid matter of the polyester resin (A) to [the polyester resin (A)+the epoxy resin (B)], Wb designates the weight ratio of solid matter of the epoxy resin (B) to [the polyester resin (A)+the epoxy resin (B)], Ma designates the number average molecular weight of the polyester resin (A), and Mb designates the number average molecular weight of the epoxy resin (B).

The polyester resin (A) to prepare the modified polyester resin (C) consists mainly of an ester of polybasic acid and polyalcohol.

Applicable polybasic acid includes: dibasic acid such as terephthalic acid, isophthalic acid, succinic acid, adipic acid, sebacic acid, fumaric acid, and maleic anhydride; tribasic or higher acid such as trimellitic anhydride and pyromellitic anhydride; and combination of two or more of these polybasic acids.

Mainly applied polyalcohol includes aliphatic or alicyclic dihydric alcohol such as ethyleneglycol, diethyleneglycol, propyleneglycol, dipropyleneglycol, polypropyleneglycol, neopentylglycol, 3-methylpentadiol, neopentyleneglycol, 1,4-butane diol, 1,5-pentane diol, 1,4-hexane diol, 1,6-hexane diol, and 1,4-cyclohexane dimethanol. Furthermore, at need, trihydric or higher polyalcohol such as glycerin, trimethylolethane, trimethylolpropane, trimethylolbutane, hexane triol, pentaerythritol, and dipentaerythritol may be applied along with the polyalcohol given above.

The polyester resin (A) is required to have the number average molecular weight in a range of from 14,000 to 26,00 and the glass transition temperature in a range of from 0° C. to 30° C. More preferred number average molecular weight of the polyester resin (A) is in a range of from 18,000 to 21,000, and more preferred glass transition temperature is in a range of from 5° C. to 25° C. If the number average molecular weight of the polyester resin (A) is less than 14,000, the elongation of the paint film layer becomes insufficient, and the workability degrades. If the number average molecular weight thereof exceeds 26,000, the adhesiveness between the paint film layer and the substrate becomes insufficient, and the anti-flaw performance degrades. Furthermore, excessive number average molecular weight thereof results in high viscosity of the painting composition, thus consuming excess amount of diluent, which is not favorable in view of painting work and environmental compatibility. If the glass transition temperature of the polyester resin (A) exceeds 30° C., the elongation of paint film layer becomes insufficient, and the workability degrades. If the glass transition temperature thereof is lower than 0° C., the toughness of the paint film layer degrades, and satisfactory anti-flaw performance cannot be attained.

The epoxy resin (B) for reacting with the polyester resin (A) is added for improving the adhesiveness with the substrate. Examples of suitable epoxy resin according to the Embodiment 3 are: epoxy compound prepared by a reaction between a bisphenol such as bisphenol A, bisphenol F, and bisphenol S, and epihalohydrin or â-methylepihalohydrin; and a bisphenol type epoxy resin which is a copolymer of above-given epoxy compound.

The epoxy resin (B) is preferably the one having the number average molecular weights of from 500 to 2,000. If the number average molecular weight of the epoxy resin (B) is less than 500, the anti-flaw performance is not sufficient. If the number average molecular weight thereof exceeds 2,000, the compatibility degrades in the reaction with the polyester resin.

There are several methods for modifying the polyester resin (A) by the epoxy resin (B): the method of adding the epoxy resin during the synthesis of polyester resin; and the method of reacting the polyester resin with the epoxy resin under the presence of an amine catalyst. As of these modifying methods, the reaction with epoxy resin under the presence of amine catalyst after synthesized the polyester resin is preferred from the point of attaining necessary adhesiveness without degrading the workability of paint film layer.

The modified epoxy resin (C) is necessary to have the k value defined in eq. (1) in a range of from 0.7 to 2.5. If the k value is less than 0.7, the amount of epoxy resin is less to degrade the adhesiveness, so the sufficient anti-flaw performance cannot be attained. If the k value exceeds 2.5, the amount of epoxy resin becomes excessive, which increases the rigidity of epoxy resin, so the satisfactory workability cannot be attained.

Applicable curing agent (D) includes an amino resin and/or a polyisocyanate compound.

Applicable amino resin as the curing agent includes a resin prepared by alkyl-etherification of a part or all of the product obtained from condensation reaction between urea, benzoguanamine, melamine, or the like and formaldehyde using alcohol such as methanol, ethanol, and butanol.

Specifically, methylated urea resin, n-butylated benzoguanmine resin, methylated melamine resin, n-butylated melamine resin, and iso-butylated melamine resin are applicable.

Applicable polyisocyanate compound includes an isocyanate compound obtained by a commonly used manufacturing method. Specifically, a preferred polyisocyanate compound is the one blocked by a blocking agent such as phenol, cresol, secondary aromatic amine, tertiary alcohol, lactam, and oxyme, which compound can be used as a single-liquid painting. By using the blocked polyisocyanate compound, storage as single-liquid becomes possible, thus easing the handling as the paint.

More preferred polyisocyanate compound includes nonyellowing hexamethylenediisocyanate (hereinafter referred to simply as "HDI"), a derivative thereof, tolylenediisocyanate (herein after referred to simply as "TDI"), a derivative thereof, 4,4'-diphenylmethanediisocyanate (hereinafter referred to simply as "MDI"), a derivative thereof, xylylenediisocyanate (hereinafter referred to simply as "XDI"), a derivative thereof, isophoronediiusocyanate (hereinafter referred to simply as "IPDI"), a derivative thereof, trimethylhexamethylenediisocyanate (hereinafter referred to simply as "TMDI"), a derivative thereof, hydrogenated TDI, a derivative thereof, hydrogenated MDI, a derivative thereof, hydrogenated XDI, and a derivative thereof.

The mixing ratio of the modified polyester resin (C) to the curing agent (D) in the primer layer (paint for primer) is preferably in a range of from 90/10 to 65/35 by solid matter weight basis, (=[the modified polyester resin (C)]/[the curing agent (D)]. If the rate of modified polyester resin (C) exceeds 90/10, sufficient hardening performance cannot be attained. If the rate of modified polyester resin (C) is less than 65/35, aside reaction between surplus curing agents or between the curing agent and the modified polyester resin (C) occurs to degrade the workability and the adhesiveness of paint at worked portion.

Other than the above-described modified polyester resin (C), which is the principal resin, and curing agent(D), the paint for primer may contain various kinds of additives, at need, such as curing catalyst, pigment, defoaming agent, and anti-flow agent.

The curing catalyst is used for enhancing the curing reaction of the resin component (principal resin and curing agent), at need. Typical applicable curing catalyst includes an acid or a neutralized product of the acid. Examples of that kind of curing catalyst are p-toluene sulfonate, dodecylbenzene sulfonate, dinonylnaphthalene sulfonate, dinonylnaphthalene disulfonate, amine-neutralized substance thereof, tin octoete, and dibutyldilaurate.

The pigment may be prepared by blending: anti-rust pigment such as strontium chromate, potassium chromate, zinc chromate, calcium chromate, barium chromate, and aluminum tripolyphosphate; inorganic pigment such as titanium dioxide, carbon black, and iron oxide; and extender such as talc and silica, depending on the use object.

The organic solvent used in the coating may be the one or combination of more than one of the organic solvents such as xylene, toluene, methylethylketone, n-butyl acetate, ethyl acetate, methanol, ethanol, cyclohexanone, petroleum solvent, and mineral spirit, depending on the applied resin.

The mixing ratio of the pigment in the primer layer is preferably in a range of from 0.6 to 1.0 as the solid matter weight ratio of [pigment/resin], more preferably from 0.65 to 0.8. If the ratio is less than 0.6, sufficient anti-flaw performance cannot be attained. If the ratio exceeds 1.0, sufficient workability cannot be attained.

The thickness of primer layer is 2 μm or more. If the thickness is less than 2 μm, sufficient anti-rust performance cannot be attained.

(4) Top Coat Layer

The top coat layer is a paint film layer having dry film thicknesses of from 5 to 30 μm, formed by applying a coating containing polyester resin (E) having number average molecular weights of from 5,000 to 20,000, and a curing agent as the main component resins.

The polyester resin (E) is an ester compound consisting mainly of a polybasic acid and a polyhydric alcohol. The polybasic acids and the polyhydric alcohols given in the description of primer layer can be applied.

The polyester resin (E) as the principal resin is necessary to have 5,000 to 20,000 of number average molecular weight, preferably 5,000 to 15,000 thereof. If the number average molecular weight of the polyester resin (E) is less than 5,000, the elongation becomes insufficient, and the workability degrades. If the number average molecular weight thereof exceeds 20,000, anti-flaw performance and weather resistance degrade, which is not favorable.

Although the curing agent used as a main component resin is not specifically limited, amino resins and/or polyisocyanate compound, which are generally used as the curing agent of polyester resin, may be applied. As for the amino resins and polyisocyanate compound used as the curing agent in the top coat paint, the ones given in the description of primer may be applied.

Other than the above-described modified polyester resin (E), which is the principal resin, and curing agent, the paint for top coat may contain various kinds of additives, at need, such as curing catalyst, pigment, defoaming agent, and anti-flow agent.

The curing catalyst is used to enhance the curing reaction of the resin component (principal resin and curing agent), at need. Typical applicable curing catalyst includes an acid or a neutralized product of the acid. Examples of that kind of curing catalyst are p-toluene sulfonate, dodecylbenzene sulfonate, dinonylnaphthalene sulfonate, dinonylnaphthalene disulfonate, amine-neutralized substance thereof, tin octoete, and dibutyldilaurate.

The pigment may be prepared by blending: inorganic pigment such as titanium dioxide, carbon black, and iron oxide; organic pigment such as cyanine blue and cyanine green; extender such as talc and silica; and metallic powder such as aluminum powder, iron powder, and nickel powder, depending on the use object.

The organic solvent used in the paint may be the one or combination of more than one of the organic solvents such as xylene, toluene, methylethylketone, n-butyl acetate, ethyl acetate, methanol, ethanol, cyclohexanone, petroleum solvent, and mineral spirit, depending on the applied resin.

The thickness of top coat layer is in a range of from 5 to 30 μm. If the thickness is less than 5 μm, sufficient workability and corrosion resistance at worked portion cannot be attained. If the thickness exceeds 30 μm, the workability degrades and the cost increases, which is not favorable.

The manufacturing method for the above-described coated steel sheet according to the Embodiment 3 is described below.

The manufacturing method according to the Embodiment 3 is a method for manufacturing a coated steel sheet using a substrate steel sheet of a hot-dip Al—Zn base coated steel sheet having a coating layer containing 20 to 95 mass % Al, prepared by a continuous hot-dip coating apparatus or the like. The method has the steps of applying thermal history of at least (a) and (b) described below, of successively forming a passivated layer, an primer layer, and a top coat layer on the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after solidification of the hot-dip coated metal, and cooling thereof at an average cooling rate of C(° C./hr), defined by eq. (1), or less in a temperature range of from T(° C.) to 100° C., and/or a thermal history of an average cooling rate of C(° C./hr), defined by eq. (1), or less in a temperature range of from T(° C.) between 130° C. and 300° C. to 100° C. after solidification of the hot-dip coated metal.

$$C = (T-100)/2 \qquad (1)$$

As of the thermal history (a) and the thermal history (b) applied to the coating layer, the thermal history (a) is given by controlling the cooling condition of the coating layer immediately after the plating.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a gas-heating furnace. Applicable means for cooling includes a gas-blowing unit.

Application of the thermal history (b) is conducted by giving a specific heat treatment to the coated steel sheet after solidification of the hot-dip coated metal, or by controlling the cooling rate of the coating layer after solidification of the hot-dip coated metal by soaking or the like. According to the manufacturing method of the present invention, a specific passivated layer, a primer layer, and a top coat layer are successively formed, in this order, on the coating layer of the coated steel sheet. The heat treatment to apply the thermal history (b) to the coating layer may be given in any one stage of ① before the passivation treatment, ② during drying period of the passivation treatment, ③ after the passivation treatment (after applying the treatment solution and succeeding drying period) and before applying the primer, ④ during drying period of the primer, ⑤ after completed the primer (after applying and drying the coat) and before applying top coat, ⑥ during drying period of the top coating, and ⑦ after completed the top coating (after applying and drying the top coat). Alternatively, the heat treatment to apply the thermal history (b) may be given to more than one stage among the seven described above.

Consequently, the application of thermal history (b) to the coating layer may be given in at least one step among the four (1) through (8) given below:

(1) before the passivation;

(2) during drying period of the passivation;

(3) after the passivation and before the painting of the primer;

(4) during drying period of the primer;

(5) after the painting of the primer and before painting of the top coat;

(6) during drying period of the top coat;

(7) after the painting of the top coat;

(8) during cooling period after solidification of the hot-dip coated metal.

As of the above-described stages for applying heat treatment, the stages ②, ④, and ⑥ conduct heat treatment utilizing the heats in drying the passivation layer, the primer layer, and the top coat layer, respectively, so they are particularly superior in economy.

The heat treatment or soaking for applying the thermal history (b) to the coating layer is conducted using a heating or soaking unit located inside or outside the continuous hot-dip coating apparatus.

The reason for limiting the preferred range of coating composition, coating weight, and for specifying the above-described heat histories (a) and (b) for the manufactured hot-dip Al—Zn base coated steel sheet is the same as that described before.

As described before, the kind of passivation treatment applied as the surface preparation to the coated steel sheet is not specifically limited, and the treatment may be chromate treatment, zinc phosphate treatment, and a treatment with organic resin as the main component. Since the drying in the passivation treatment is generally conducted by heating and drying the coating layer in a hot stove, an induction heater, or the like, the thermal history (b) may be given to the coating layer using the heating-drying step, as described before.

A primer is applied onto the passivated layer, which primer is then baked. Furthermore, a top coat is applied onto the primer, which top coat is then baked. Thus, the primer layer and the top coat layer are formed. The constitution of the primer and the top coat is as described before.

The primer and the top coat may be prepared using a disperser such as ball mill, sand mill, and roll mill, and an agitator.

The method for applying respective paints for forming paint film layers (primer layer and top coat layer) is not specifically limited. A preferred method thereof is roll coater coating, curtain flow coating, or the like. After applying the paint, the paint film layer is formed by baking using hot-air heating, infrared heating, induction heating, or the like.

The baking treatment to heat and cure the paint film layer for the primer is done at maximum ultimate sheet temperatures of from 180° C. to 270° C. for about 30 to 120 seconds. If the ultimate sheet temperature is lower than 180° C., the curing reaction of the resin becomes insufficient, and the anti-flaw performance and the corrosion resistance likely degrade. If the ultimate sheet temperature exceeds 270° C., the reaction becomes excessive, which may degrade the adhesiveness with top coat layer.

For the top coat, the maximum ultimate sheet temperature is preferably in a range of from 180° C. to 270° C., and the baking is conducted at the temperature range for about 30 to 120 seconds. If the ultimate sheet temperature is lower than 180° C., the curing reaction of resin becomes insufficient, which induces the degradation in the solubility in solvents and chemicals, and in the anti-flaw performance. If the ultimate sheet temperature exceeds 270° C., the reaction becomes excessive, which may degrade the workability.

As described before, the coating layer may undergo thermal history (b) utilizing the baking treatment of the paint film layers.

EXAMPLE 3

Cold-rolled steel sheets (0.35 mm in thickness) which were prepared by a known method were introduced to a continuous hot-dip coating apparatus to conduct hot-dip coating using respective coating baths: 55%Al-1.5%Si—Zn coating bath; 40%Al-1.0%Si—Zn coating bath; and 70%Al-1.8%Si—Zn coating bath. The line speed was fixed to 160 m/min, and the dispersion in coating weight on one side of the steel sheet among treated sheets was controlled to a range of from 75 to 90 g/m². As Comparative Example, a hot-dip 5%Al—Zn base coated steel sheet (with 130 g/m² of coating weight per a side thereof) was also prepared.

During the course of manufacturing these coated steel sheets, the thermal history (I) and the thermal history (II), given in Tables 11 through 14, were applied, respectively, and the conditions of primer layer and the top coat layer were varied to prepare respective coated steel sheets, which are described below. The applied paints for each of the primer layer and the top coat layer is described in the following.

(1.1) Preparation of Resin Composition for Primer

Polyester Resin Synthesis Example 1

An esterification reaction was conducted in nitrogen-gas stream at 240° C. for 2 hours with a mixture of 215.8 weight parts (1.3 mole) of terephthalic acid, 182.6 weight parts (1.1 mole) of isophthalic acid, 189.8 weight parts (1.3 mole) of adipic acid, 124 weight parts (2.0 mole) of ethyleneglycol, 166.4 weight parts (1.6 mole) of neopentylglycol, 30.4 weight parts of "Epiclon 850" (trade name, manufactured by Dainippon Ink & Chemicals, Inc.), and 0.1 weight parts of tin dioctyl oxide. After that, the reaction mixture was reduced in the pressure to 1 mmHg during 1 hour period. Further the mixture was subjected to the reaction at 260° C. for 1 hour. Then, the mixture was dissolved in Sorbesso 150 to obtain the polyester resin (A1) having the glass transition temperature of 10° C., the average molecular weight of 20,000, with 35% nonvolatile matter.

Polyester Resin Synthesis Example 2

An esterification reaction was conducted in nitrogen-gas stream at 240° C. for 2 hours with a mixture of 215.8 weight parts (1.3 mole) of terephthalic acid, 182.6 weight parts (1.1 mole) of isophthalic acid, 189.8 weight parts (1.3 mole) of adipic acid, 124 weight parts (2.0 mole) of ethyleneglycol, 166.4 weight parts (1.6 mole) of neopentylglycol, 30.4 weight parts of "Epiclon 850" (trade name, manufactured by Dainippon Ink & Chemicals, Inc.), and 0.1 weight parts of tin dioctyl oxide. After that, the reaction mixture was reduced in the pressure to 1 mmHg during 1 hour period. Further the mixture was subjected to the reaction at 260° C. for 20 minutes. Then, the mixture was dissolved in Sorbesso 150 to obtain the polyester resin (A2) having the glass transition temperature of 15° C., the average molecular weight of 16,000, with 35% nonvolatile matter.

(1.2) Preparation of Paint for Primer

As for the paints for primer corresponding to the paint film layer compositions for the primer, given in Table 15, the resin compositions for primer were prepared by mixing the above-described polyester resin (A1) or (A2), (35% nonvolatile matter), with epoxy resin ("Epiclon 4050", manufactured by Dainippon Ink & Chemicals, Inc.) at respective mixing ratios given in Table 5, then by adding 0.5 weight parts of triethylamine to the mixture to conduct reaction in nitrogen-gas stream at 140° C. for 2 hours. Regarding the coating for primer corresponding to the coating composition given in Table 5, the epoxy resin ("Epiclon 4050", manufactured by Dainippon Ink & Chemicals, Inc.) was added to the above-given polyester resin (A1) at a mixing ratio given in Table 5 at normal temperature. For the coating for primer corresponding to the coating composition given in Table 15, the above-given polyester resin (A1) was applied without reacting with epoxy resin.

To each of 100 weight parts of the above-described resin compositions for primer, 34 weight parts of strontium chromate, 2.5 weight parts of aluminum dehydrate tripolyphoshpate, 6 weight parts of titanium oxide, and 0.1 weight parts of "Disparon #1830" (trade name, manufactured by Kusumoto Chemical Co., Ltd.) were added. A pigment was then dispersed in the mixture in a glass beads high speed shaker for 4 hours. Further a curing agent at respective weight parts given in Table 3, and 3 weight parts of a silane coupling agent were added to the mixture to agitate them to obtain the target coatings (P1) through (P9).

(2.1) Preparation of Resin Composition for Top Coat

Resin Synthesis Example 3

An esterification reaction was conducted in nitrogen-gas stream at 230° C. for 2 hours with a mixture of 232 weight parts (2.0 mole) of terephthalic acid, 83 weight parts (0.5 mole) of isophthalic acid, 160.6 weight parts (1.1 mole) of adipic acid, 136.4 weight parts (2.2 mole) of ethyleneglycol, 145.6 weight parts (1.4 mole) of neopentylglycol, and 0.1 weight parts of tin dioctyl oxide. After that, the reaction mixture was reduced in the pressure to 1 mmHg during 1 hour period. Further the mixture was subjected to the reaction at 260° C. for 30 minutes. Then, the mixture was dissolved in a mixture of cyclohexanone/Sorbesso 150, (weight ratio of 50/50), to obtain the polyester resin (E1) having the glass transition temperature of 18° C., the average molecular weight of 15,000, with 40% nonvolatile matter.

Resin Synthesis Example 4

An esterification reaction was conducted in nitrogen-gas stream at 230° C. for 2 hours with a mixture of 232 weight parts (2.0 mole) of terephthalic acid, 83 weight parts (0.5 mole) of isophthalic acid, 160.6 weight parts (1.1 mole) of adipic acid, 136.4 weight parts (2.2 mole) of ethyleneglycol, 145.6 weight parts (1.4 mole) of neopentylglycol, and 0.1 weight parts of tin dioctyl oxide. After that, the reaction mixture was reduced in the pressure to 1 mmHg during 1 hour period. Further the mixture was subjected to the reaction at 260° C. for 1.5 hours. Then, the mixture was dissolved in a mixture of cyclohexanone/Sorbesso 150, (weight ratio of 50/50), to obtain the polyester resin (E2) having the glass transition temperature of 10° C., the average molecular weight of 22,000, with 35% nonvolatile matter.

(2.2) Preparation of Paint for Top Coat

To a mixture of 425 weight parts of the polyester resin (E1) for top coat, 133 weight parts of an inorganic pigment, and 0.3 weight parts of "Disparon #2150" (trade name, manufactured by Kusumoto Chemicals, Ltd.), a pigment was dispersed in a glass beads high speed shaker for 2 hours. Further 54.5 weight parts of "Barnock D550" (trade name, manufactured by Dainippon Ink & Chemicals, Inc.), 0.6 weight parts of "Polyflow S" (trade name, manufactured by KYOEISHA OIL & FAT CHEMICALS, CO., LTD.), 5 weight parts of a delustering agent, and 0.5 weight parts of polyethylene wax were added to the mixture under agitation to obtain the target coating for top coat (T1). With a similar procedure, the polyester resin (E2) was applied to prepare the coating for top coat (T2) shown in Table 16.

In each of the above-given examples, a coated steel sheet was subjected to ordinary chromate treatment, and the coating for primer was applied using a bar coater, then the coating was baked at 220° C. of ultimate sheet temperature and for 38 seconds of baking time, further the coating for top coat was applied using a bar coater, and finally the top coat was baked at 230° C. of ultimate sheet temperature and 53 seconds of baking time.

Each of thus obtained coated steel sheets was evaluated in terms of workability, corrosion resistance at worked portion, and hardness of paint film layer using the testing methods described below. Tables 11 through 14 show the results along with the conformation of the coated steel sheets.

(1) Workability

Steel plates having different thicknesses to each other were prepared. One of these steel plates was placed in the rear side of a testing coated steel sheet. The steel sheet was then bent to 180° at the position of the steel plate in a manner to clamp the plate between the folded portions of the steel sheet. A 30×magnifier was used to observe the paint film layer at the bend portion to give the evaluation on the criterion specified below.

⊚: 180° bending while clamping a 0.5 mm thick steel plate generated no crack on paint film layer.

○: 180° bending while clamping a 0.7 mm thick steel plate generated no crack on paint film layer.

Δ: 180° bending while clamping a 1.0 mm thick steel plate generated no crack on paint film layer.

x: 180° bending while clamping a 1.0 mm thick steel plate generated crack on paint film layer.

(2) Paint Film Layer Hardness

The pencil hardness test was given to the paint film layer conforming to Article 8.4 of JIS K5400, using Mitsubishi Pencil "UNI" to observe the peeling condition of the paint film layer. The evaluation criterion was: "○" for very little peeling generation between the coated steel sheet (the substrate) and the paint film layer using 3H hardness pencil; "Δ" for very little peeling generation between the coated steel sheet (the substrate) and the paint film layer using 2H hardness pencil; and "x" for peeling generation between the coated steel sheet (the substrate) and the paint film layer using 2H hardness pencil.

(3) Corrosion Resistance at Worked Portion

Each of the coated steel sheets was cut to a size of 150×70 mm. The cut sheet was bent while inserting a steel rod having 0.75 mm of diameter to the bent position at the rear face thereof, in a 20° C. room. Then, the cut edges and the rear face of the bend portion of the cut sheet were sealed with tar epoxy coating to prepare the sample for testing the corrosion resistance at worked portion. The test was conducted under the condition specified by JIS K5621, or dry-wet cycle corrosion test, for applying total 400 cycles (described below). The blistering rate on the paint film layer was determined.

Cycle condition: A single cycle of the test consists of [5% salt water spray at 30° C. for 0.5 hour→wet state of 95%RH at 30° C. for 1.5 hours→dry state of 20%RH at 50° C. for 2 hours→dry state of 20%RH at 30° C. for 2 hours], while repeating the cycle to the specified number of cycles.

Evaluation method: The blistering rate is defined as the total length of blistered portion in the width direction of the paint film layer at a bend portion having a width of 50 mm, excluding the 10 mm distance from both edges of the sample. The blistering rate is expressed by percentage, (for example, generation of two positions of blister with 5 mm in width within the 50 mm range is calculated to 20% blistering rate.) The criterion of the evaluation is the following.

⊚: Blistering rate was less than 10%.

○: Blistering rate was 10% or more and less than 30%.

Δ: Blistering rate was 30% or more and less than 50%.

x: Blistering rate was 50% or more.

As shown in Tables 11 through 14, the coated steel sheets according to the present invention showed favorable characteristics for all of the workability, the corrosion resistance at worked portion, and the hardness of paint film layer. To the contrary, comparative examples are inferior in at least one characteristic to the examples according to the present invention.

TABLE 11

| | Coated steel sheet | | | | | | | | | |
|---|---|---|---|---|---|---|---|---|---|---|
| | | Thermal history (I) *1 | Thermal history (II) *2 | | | Primer layer | | | Top coat layer | |
| No. | Coating layer composition | Average cooling rate (° C./sec) | Heating temperature (° C.) *3 | Average cooling rate (° C./hr) *4 | Stage of heat treatment *5 | Kind *6 | k value | Film thickness (μm) | Kind *7 | Film thickness (μm) |
| 1 | 55% Al—1.5% Si | 10 | 280 | 52 | 1 | P1 | 1 | 4 | T1 | 13 |
| 2 | 55% Al—1.5% Si | 10 | 180 | 23 | 1 | P1 | 1 | 4 | T1 | 13 |
| 3 | 55% Al—1.5% Si | 4 | 145 | 18 | 1 | P1 | 1 | 4 | T1 | 13 |
| 4 | 55% Al—1.5% Si | 4 | 240 | 58 | 1 | P1 | 1 | 4 | T1 | 13 |
| 5 | 55% Al—1.5% Si | 8 | 185 | 15 | 2 | P1 | 1 | 4 | T1 | 13 |
| 6 | 55% Al—1.5% Si | 8 | 170 | 22 | 3 | P1 | 1 | 4 | T1 | 13 |
| 7 | 40% Al—1.0% Si | 10 | 180 | 23 | 1 | P1 | 1 | 4 | T1 | 13 |
| 8 | 70% Al—1.8% Si | 10 | 180 | 23 | 1 | P1 | 1 | 4 | T1 | 13 |

| | Performance | | | |
|---|---|---|---|---|
| No. | Workability | Corrosion resistance at worked portion | Pencil hardness | Classification |
| 1 | ○ | ○ | ○ | Example |
| 2 | ⊚ | ⊚ | ○ | Example |
| 3 | ⊚ | ⊚ | ○ | Example |
| 4 | ○ | ⊚ | ○ | Example |
| 5 | ⊚ | ⊚ | ○ | Example |
| 6 | ⊚ | ⊚ | ○ | Example |
| 7 | ⊚ | ○ | ○ | Example |
| 8 | ⊚ | ○ | ○ | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 15.
*7 Symbol designates the top coat layer component given in Table 16.

TABLE 12

Coated steel sheet

| | | Thermal history (I) *1 | Thermal history (II) *2 | | | Primer layer | | | Top coat layer | |
|---|---|---|---|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Kind *6 | k value | Film thickness (μm) | Kind *7 | Film thickness (μm) |
| 9 | 55% Al—1.5% Si | 10 | 180 | 23 | 1 | P2 | 0.8 | 4 | T1 | 13 |
| 10 | 55% Al—1.5% Si | 10 | 180 | 23 | 1 | P3 | 2 | 4 | T1 | 13 |
| 11 | 55% Al—1.5% Si | 10 | 180 | 23 | 1 | P4 | 1 | 4 | T1 | 13 |
| 12 | 55% Al—1.5% Si | 10 | 180 | 23 | 1 | P5 | 1 | 4 | T1 | 13 |
| 13 | 55% Al—1.5% Si | 10 | 180 | 23 | 1 | P1 | 1 | 4 | T2 | 13 |
| 14 | 55% Al—1.5% Si | 10 | 180 | 23 | 1 | P1 | 1 | 10 | T1 | 13 |
| 15 | 55% Al—1.5% Si | 10 | 180 | 23 | 1 | P1 | 1 | 4 | T1 | 20 |

| | | Performance | | |
|---|---|---|---|---|
| No. | Workability | Corrosion resistance at worked portion | Pencil hardness | Classification |
| 9 | ⊚ | ⊚ | ○ | Example |
| 10 | ○ | ⊚ | ○ | Example |
| 11 | ○ | ○ | ○ | Example |
| 12 | ⊚ | ○ | ○ | Example |
| 13 | ⊚ | ⊚ | ○ | Example |
| 14 | ⊚ | ⊚ | ○ | Example |
| 15 | ○ | ○ | ○ | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 15.
*7 Symbol designates the top coat layer component given in Table 16.

TABLE 13

Coated steel sheet

| | | Thermal history (I) *1 | Thermal history (II) *2 | | | Primer layer | | | Top coat layer | |
|---|---|---|---|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Kind *6 | k value | Film thickness (μm) | Kind *7 | Film thickness (μm) |
| 1 | 55% Al—1.5% Si | 15 | 180 | 19 | 1 | P1 | 1 | 4 | T1 | 13 |
| 2 | 55% Al—1.5% Si | 8 | 330 | 50 | 1 | P1 | 1 | 4 | T1 | 13 |
| 3 | 55% Al—1.5% Si | 8 | 105 | 20 | 1 | P1 | 1 | 4 | T1 | 13 |
| 4 | 55% Al—1.5% Si | 8 | 265 | 85 | 1 | P1 | 1 | 4 | T1 | 13 |
| 5 | 55% Al—1.5% Si | 8 | 165 | 45 | 1 | P1 | 1 | 4 | T1 | 13 |
| 6 | 55% Al—1.5% Si | 10 | 180 | 23 | 1 | P6 | 0.5 | 4 | T1 | 13 |
| 7 | 55% Al—1.5% Si | 10 | 180 | 23 | 1 | P7 | 3 | 4 | T1 | 13 |
| 8 | 55% Al—1.5% Si | 10 | 180 | 23 | 1 | P8 | — | 4 | T1 | 13 |

| | | Performance | | |
|---|---|---|---|---|
| No. | Workability | Corrosion resistance at worked portion | Pencil hardness | Classification |
| 1 | Δ | Δ | ○ | Comparative example |
| 2 | X | X | ○ | Comparative example |
| 3 | X | Δ | ○ | Comparative example |
| 4 | X | X | ○ | Comparative example |
| 5 | Δ | Δ | ○ | Comparative example |
| 6 | ⊚ | Δ | X | Comparative example |
| 7 | X | Δ | ○ | Comparative example |

TABLE 13-continued

| | | | | | |
|---|---|---|---|---|---|
| | 8 | ◉ | X | X | Comparative example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 15.
*7 Symbol designates the top coat layer component given in Table 16.

TABLE 14

| | | | | | | | | | | |
|---|---|---|---|---|---|---|---|---|---|---|
| | | Thermal history | Thermal history (II) *2 | | | Primer layer | | | Top coat layer | |
| No. | Coating layer composition | (I) *1 Average cooling rate (° C./sec) | Heating temperature (° C.) *3 | Average cooling rate (° C./hr) *4 | Stage of heat treatment *5 | Kind *6 | k value | Film thickness (μm) | Kind *7 | Film thickness (μm) |
| 9 | 55% Al—1.5% Si | 10 | 180 | 23 | 1 | P9 | — | 4 | T1 | 13 |
| 10 | 55% Al—1.5% Si | 10 | 180 | 23 | 1 | P1 | 1 | 1 | T1 | 13 |
| 11 | 55% Al—1.5% Si | 10 | 180 | 23 | 1 | P1 | 1 | 4 | T1 | 3 |
| 12 | 55% Al—1.5% Si | 10 | 180 | 23 | 1 | P1 | 1 | 4 | T1 | 40 |
| 13 | 55% Al—1.5% Si | | None | | | P1 | 1 | 4 | T1 | 13 |
| 14 | 5% Al | | None | | | P1 | 1 | 4 | T1 | 13 |

| | | Performance | | | |
|---|---|---|---|---|---|
| No. | Workability | Corrosion resistance at worked portion | Pencil hardness | Classification | |
| 9 | X | Δ | ○ | Comparative example | |
| 10 | ○ | X | X | Comparative example | |
| 11 | X | X | ○ | Comparative example | |
| 12 | X | ○ | X | Comparative example | |
| 13 | X | Δ | ○ | Comparative example | |
| 14 | ◉ | X | ○ | Comparative example | |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment and before primering, (3): After top coating.
*6 Symbol designates the primer layer component given in Table 15.
*7 Symbol designates the top coat layer component given in Table 16.

TABLE 15

[Primer layer components]

| | Principle resin | | | | | |
|---|---|---|---|---|---|---|
| | Polyester resin | | Modified resin | | Curing agent | |
| Symbol | Kind *1 | Number average molecular weight | Mixing rate | Kind | Mixing rate | Kind | Mixing rate |
| P1 | Polyester resin (A1) | 20000 | 251 | Epoxy resin *2 | 12 | Melamine resin *3 | 26 |
| P2 | Polyester resin (A1) | 20000 | 257 | Epoxy resin *2 | 10 | Melamine resin *3 | 26 |
| P3 | Polyester resin (A1) | 20000 | 214 | Epoxy resin *2 | 25 | Melamine resin *3 | 26 |
| P4 | Polyester resin (A2) | 16000 | 243 | Epoxy resin *2 | 15 | Melamine resin *3 | 26 |
| P5 | Polyester resin (A1) | 20000 | 251 | Epoxy resin *2 | 12 | Polyisocyanate compound *4 | 33 |
| P6 | Polyester resin (A1) | 20000 | 269 | Epoxy resin *2 | 6 | Melamine resin *3 | 26 |
| P7 | Polyester resin (A1) | 20000 | 180 | Epoxy resin *2 | 37 | Melamine resin *3 | 26 |

TABLE 15-continued

[Primer layer components]

| | Principle resin | | | | | |
|---|---|---|---|---|---|---|
| | Polyester resin | | | Modified resin | | Curing agent | |
| Symbol | Kind *1 | Number average molecular weight | Mixing rate | Kind | Mixing rate | Kind | Mixing rate |
| P8 | Polyester resin (A1) | 20000 | 286 | — | — | Melamine resin *3 | 26 |
| P9 | Polyester resin (A1) | 20000 | 251 | Epoxy resin *5 | 12 | Melamine resin *3 | 26 |

*1 Polyester resins (A1) and (A2) are given in the polyester resin synthesis examples 1 and 2.
*2 "Epiclon 4050" manufactured by Dainippon Ink & Chemicals, Inc., is reacted with the polyester resin under the presence of triethylamine at 140° C. for 2 hours.
*3 "Super Beckamin L117" (containing 60% nonvolatile matter), manufactured by Dainippon Ink & Chemicals, Inc.
*4 "Barnock D550" (containing 55% nonvolatile matter), manufactured by Dainippon Ink & Chemicals, Inc.
*5 "Epichlon 4050", manufactured by Dainippon Ink & Chemicals, Inc., is blended with the polyester resin at room temperature.
※ Each of the coatings P1 through P9 was mixed with 34 weight parts of strontium chromate, 2.5 weight parts of aluminum phosphate, 6 weight parts of titanium oxide, 0.1 weight parts of "Disparon #1830", manufactured by Kusumoto Chemicals, Ltd., and 3 weight parts of a silane coupling agent, to 100 weight parts of principal resin.
※ "mixing rate" signifies the weight parts including volatile matter. The mixing rate of curing agent signifies the weight parts thereof to 100 weight parts of principal resin.

TABLE 16

[Top coat layer components]

| | Principal resin | | | Curing agent | |
|---|---|---|---|---|---|
| Symbol | Kind | Number average molecular weight | Mixing rate | Kind | Mixing rate |
| T1 | Polyester (E1) *1 | 15000 | 425 | Polyisocyanate compound *2 | 54.5 |
| T2 | Polyester (E2) | 22000 | 485 | Polyisocyanate compound *2 | 54.5 |

*1 Polyester resins (E1) and (AE2) are described in the polyester resin synthesis examples 3 and 4.
*2 "Barnock D550" (containing 55% nonvolatile matter), manufactured by Dainippon Ink & Chemicals, Inc.
※ To the coatings (T1) and (T2), 133 weight parts of titanium oxide, 0.3 weight parts of "Disparon #2150", manufactured by Kusumoto Chemicals, Ltd., 0.6 weight parts of "Polyflow S", manufactured by KYOEISHA OIL & FAT CHEMICALS, CO., LTD., and 0.5 weight parts of polyethylene wax were added.
※ "Mixing rate" signifies the weight parts including volatile matter.

Embodiment 4

The surface-treated steel sheet according to the Embodiment 4 uses a substrate steel sheet plated by a hot-dip Al—Zn base coating layer containing 20 to 95 mass % Al. From the point of corrosion resistance and other characteristics, a preferred range of Al content in the coating layer is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available. That type of hot-dip Al—Zn base coated steel sheet is, however, difficult to attain high corrosion resistance at worked portion thereof solely by the coating composition, and the high worked portion corrosion resistance can be attained by applying thermal history, which will be described later, and also by combining an upper layer of passivated layer.

Although the coating weight on the hot-dip Al—Zn base coated steel sheet is not specifically limited, generally it is adequate to be in an approximate range of from 30 to 200 g/m² per a side of the steel sheet.

According to the surface-treated steel sheet of the Embodiment 4, the passivated layer formed on the coating layer is prepared by applying a chromating solution which contains at least one compound selected from the group consisting of chromic acid, a chromate compound, and a chromic acid compound obtained by reducing a part of chromic acid, along with a thermosetting organic resin, onto the coating layer, then by drying thus applied chromating solution at sheet temperatures of from 130° C. to 300° C. The passivated layer has to have the mass ratio of the organic resin (A) to the chromium (B) as metallic chromium, (A)/(B), of 1 or more and less than 200, preferably between 50 and 150, and to have the chromium content as metallic chromium of 0.1 mg/m² or more and less than 100 mg/m², preferably from 5 to 30 mg/m².

If the chromium amount in the passivated layer is less than 0.1 mg/m² as metallic chromium, the corrosion resistance at worked portion cannot sufficiently increase. If the chromium amount therein is 100 mg/m² or more as metallic chromium, the improving effect of corrosion resistance at worked portion saturates, and the reduction in chromium fixation rate owing to the increase in the chromium amount degrades the compatibility with environment.

According to the Embodiment 4, an organic resin is added to the passivated layer aiming at improvement of corrosion resistance at worked portion and other characteristics. The organic resin has to be a thermosetting organic resin. Continuous roll-forming work on the surface-treated steel sheet significantly increases the roll temperature. Thus, if the organic resin existing in the passivated layer is an ordinary thermoplastic resin or is a general emulsion resin, the increased temperature of the roll induces flaws on the layer, which results in degraded appearance after the work. The inventors of the present invention studied the problem, and found that the use of thermosetting resin as the resin mixed in the layer drastically improves the anti-flaw performance at elevated temperatures, and that continuous roll-forming work does not induce degradation in the post-working appearance by applying a thermosetting resin.

The thermosetting resin referred herein is a resin that induces, under the heating action on layer-forming, an addition or condensation reaction between functional side chains of organic high molecular weight molecules or between organic high molecular weight molecules and a curing agent, or a crosslinking action such as radical polymerization using double bond in main chain or side chain. Examples of applicable thermosetting resin are alkyd resin, polyester resin, polyurethane resin, acrylic resin, epoxy resin, polystyrene resin, or one or more of modified resin of them. As of these, polyester resin, polyurethane resin, and acrylic resin are particularly preferable from the point of workability. Above-given thermosetting resins have water-dispersing type and solvent-dissolving type, and either type is applicable.

If the mass ratio of the organic resin (A) to the chromium (B) as metallic chromium, in the passivated layer, (A)/(B), is less than 1, the effect of organic resin to improve the corrosion resistance at worked portion cannot sufficiently be obtained. If the mass ratio (A)/(B) is 200 or more, the effect of chromium to improve the corrosion resistance at worked portion cannot fully be attained.

On forming the passivated layer, if the drying temperature after applying the chromating solution is lower than 130° C. as the sheet temperature, the low temperature fails in forming adequate passivated layer. If the sheet temperature during drying exceeds 300° C., the organic resin likely induces thermal degradation, and excessive heat applying to the coating layer enhances the alloying reaction, which may degrade the workability.

The surface-treated steel sheet according to the Embodiment 4 may form an ordinary chromate layer on the coating layer, and further form the above-described specific passivated layer thereon. In that case, the passivated layer has dual-layer configuration, which is expected to further increase the corrosion resistance. In that dual-layer configuration, the composition of chromate layer formed as lower layer is not specifically limited, and a known composition applied to ordinary coated steel sheets may be used. The chromate layer may or may not contain organic resin. Generally, however, the chromate layer does not contain organic resin.

When a heat treatment is given to the surface-treated steel sheet according to the Embodiment 4 after the formation of passivated layer to give a specific thermal history to the coating layer, the characteristics of organic resin existing in the passivated layer may degrade. In that case, addition of an inorganic additive (fine particles) to the passivated layer is an effective means to prevent degradation of the characteristics. Applicable inorganic additive includes one or more of silica, phosphoric acid base compound, and silicic acid compound (such as Ca salt and Mg salt).

According to the surface-treated steel sheet of the Embodiment 4, the coating layer on the hot-dip Al—Zn base coated steel sheet is preferably a coating layer subjected to at least thermal history (a) and thermal history (b), described below. By forming the above-described specific passivated layer on the coating layer which was subjected to the heat histories (a) and (b), particularly high workability and corrosion resistance at worked portion are attained. (a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip plated plating metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after solidification of the hot-dip coated metal.

$$C=(T-100)/2 \tag{1}$$

In the thermal history of (b), more preferable temperature range of T(° C.) is from 130° C. to 200° C.

By applying the above-described heat histories (a) and (b) to the coating layer, the workability (crack resistance and other characteristics) of the coating layer is significantly improved notwithstanding that the coating layer is a hot-dip Al—Zn base plating.

The method for manufacturing the surface-treated steel sheet according to the Embodiment 4 is described in the following.

The manufacturing method according to the Embodiment 4 is a method for manufacturing the surface-treated steel sheet using a continuous hot-dip coating apparatus or the like, which steel sheet uses a hot-dip Al—Zn base coated steel sheet having a coating layer containing 20 to 95 mass % Al, as the substrate steel sheet. The method has the steps of applying thermal history of at least (a) and (b) described below, of successively forming a specific passivated layer onto the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip plated plating metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after solidification of the hot-dip coated metal.

$$C=(T-100)/2 \tag{1}$$

As of the thermal history (a) and the thermal history (b) applied to the coating layer, the thermal history (a) is given by controlling the cooling condition of the coating layer immediately after coated.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a gas-heating furnace. Applicable means for cooling includes a gas-blowing unit.

Application of the thermal history (b) is conducted by giving a specific heat treatment to the coated steel sheet after solidifying the hot-dip coated metal, or by controlling the cooling rate of the coating layer after solidifying the hot-dip coated metal by soaking or the like. According to the manufacturing method of the present invention, a specific passivated layer is formed on the coating layer of the coated steel sheet. The heat treatment to apply the thermal history (b) to the coating layer may be given in any one stage of ① before forming the passivated layer, ② during drying period of the passivated layer, and ③ after forming the passivated layer (after applying the treatment solution and succeeding drying to form the film). Alternatively, the heat treatment to apply the thermal history (b) may be given in more than one stage among the seven described above.

Consequently, the application of thermal history (b) to the coating layer may be given in at least one stage among the four (1) through (4) given below.

(1) Before forming the passivated layer.
(2) During drying period of the passivated layer.
(3) After forming the passivated layer.
(4) During cooling period after solidified the hot-dip plated plating metal.

As of the above-described stages for applying heat treatment, the stage ① has an advantage that individual conditions of the heat treatment process and the passivation treatment process can be optimized, independently, and the stages ② and ③ are suitable for carrying out all the treatments within the continuous hot-dip coating apparatus. The stage ② is particularly superior in economy to other stages because the heat treatment is given by utilizing the heat of the drying period in the passivation treatment.

The reason for limiting preferred plating composition and coating weight on the manufactured hot-dip Al—Zn base coated steel sheet, and for specifying the thermal history (a) and the thermal history (b), and the obtained functions and effects are described before.

The manufacturing method according to the Embodiment 4 has the following procedure. A chromating solution containing at least one compound selected from the group consisting of chromic acid, a chromate compound, and a chromic acid compound obtained by reducing a part of chromic acid, along with a thermosetting organic resin, is applied onto the coating layer of coated steel sheet. The applied chromating solution is dried at sheet temperatures of from 130° C. to 300° C. to form a passivated layer having the mass ratio of the organic resin (A) to the chromium (B) as metallic chromium, (A)/(B), of 1 or more and less than 200, preferably between 50 and 150, and having the chromium content as metallic chromium of 0.1 mg/m² or more and less than 100 mg/m², preferably from 5 to 30 mg/m². For the chromate treatment, the chromating solution is applied onto the coated steel sheet, and is dried normally without washing the applied solution with water.

The manufacturing method according to the Embodiment 4 may give an ordinary chromate treatment on the coating layer, then form a film by the above-described specific chromate treatment thereon. In that case, the formed passivated layer has a dual-layer structure. The chromate treatment for the lower layer may be given under a known treatment condition applied to ordinary coated steel sheets.

EXAMPLE 4-1

Cold-rolled steel sheet (0.5 mm in thickness) which was prepared by a known method was introduced to a continuous hot-dip coating apparatus to conduct hot-dip coating using a 55%Al-1.5%Si—Zn coating bath. The line speed was fixed to 160 m/min, and the coating weight on one side of the steel sheet was 75 g/m².

In the manufacturing process for the coated steel sheet, a thermal history of average cooling rate of 15° C./hr during the first 10 seconds after the steel sheet left the hot-dip coating bath was given, and a passivation treatment was given to the coating layer.

The applied organic resins as the additive to the passivated layer were the following.

(a) Thermosetting resin (polyester-urethane base emulsion resin as the principal resin, and isocyanate base curing agent as the curing agent).

(b) Thermosetting resin (acrylic emulsion resin having tertiary amino group and carboxylic group as the principal resin, and epoxy silane compound having alkoxysilyl group and epoxy group as the curing agent).

(c) Thermoplastic resin (MMA-MA base acrylic emulsion resin).

(d) Thermoplastic resin (polyester base polyurethane emulsion resin).

One of the above-listed organic resins was mixed with chromic acid at a specified mixing ratio to prepare the treatment solution. The solution was applied onto the coated steel sheet to a specified chromium coating weight, which was then dried at 160° C. of maximum ultimate sheet temperature. Thus prepared surface-treated steel sheet was tested under the procedures given below to evaluate the corrosion resistance at worked portion, the roll-forming performance, and the chromium fixation rate.

The results are given on Table 17 along with the passivation treatment condition.

(1) Corrosion Resistance at Worked Portion

The surface-treated steel sheet was bent to 5T state, and was placed in a salt water spray tester. The rust generation on the bend portion was observed after 500 hours of testing. The evaluation was given on the criterion shown below.

⊚: No abnormality was observed. (Area percentage of rust generation was less than 10%.)

○: White rust and black rust slightly appeared. (Area percentage of rust generation was 10% or more and less than 25%.)

Δ: White rust and black rust appeared. (Area percentage of rust generation was 25% or more and less than 80%.)

x: Significant white rust and black rust appeared. (Area percentage was 80% or more.)

(2) Roll-forming Performance

With a surface-treated steel sheet having a size of 30×300 mm, a plate-sliding test was conducted using a draw-bead tester under the condition of mold temperature of 80° C. and bead pressing load of 100 kg. The appearance after drawing was visually observed to give the estimation based on the criterion given below.

⊚: Blackening area was less than 10%, and no adhesion of peeled film to the mold occurred.

○: Blackening area was 10% or more and less than 25%, or slight adhesion of peeled film to the mold occurred.

Δ: Blackening area was 25% or more and less than 50%, or significant adhesion of peeled film to the mold occurred.

x: Blackening area was 50% or more, or significant "galling" occurred on the surface of steel sheet.

(3) Chromium Fixation Rate

The surface-treated steel sheet was immersed in boiling water. The chromium coating weight was determined before and after the immersion using the fluorescent X-ray spectrometry. The chromium residual percentage (%) was determined as the chromium fixation rate, and the evaluation was given on the basis of the criterion given below.

⊚: Chromium residual percentage was 95% or more.

○: Chromium residual percentage was 85% or more and less than 95%.

Δ: Chromium residual percentage was 75% or more and less than 85%.

x: Chromium residual percentage was less than 75%.

TABLE 17

| | Passivated layer | | | | Performance | | | |
|---|---|---|---|---|---|---|---|---|
| | Organic resin | | | Cr coating | | Corrosion | | |
| No. | Kind *1 | Amount of curing agent *2 | Organic resin/ Cr *3 | weight (mg/m²) | Roll-forming property | resistance at worked portion | Cr fixing rate | Classification |
| 1 | (a) | 10 | 100 | 20 | ⊚ | ○ | ⊚ | Example |
| 2 | (a) | 0 | 100 | 20 | X | Δ | ⊚ | Comparative example |
| 3 | (b) | 10 | 100 | 20 | ⊚ | ○ | ⊚ | Example |
| 4 | (b) | 0 | 100 | 20 | X | Δ | ⊚ | Comparative example |
| 5 | (a) | 10 | — | 0 | Δ | X | — | Comparative example |
| 6 | (a) | 10 | 50 | 80 | ○ | ○ | ○ | Example |
| 7 | (a) | 10 | 50 | 150 | Δ | ○ | X | Comparative example |
| 8 | — | — | — | 20 | X | X | X | Comparative example |
| 9 | (a) | 10 | 150 | 20 | ○ | ○ | ○ | Example |
| 10 | (a) | 10 | 300 | 20 | Δ | Δ | ○ | Comparative example |
| 11 | (c) | — | 100 | 20 | Δ | X | ○ | Comparative example |
| 12 | (d) | — | 100 | 20 | Δ | Δ | ○ | Comparative example |

*1 Resins (a) through (d) given in the descriptions.
*2 Weight parts of curing agent to 100 weight parts of main component resin.
*3 Mass ratio of the organic resin (A) to the chromium (B) as metallic chromium, (A)/(B).
X Symbol or numeral with underline is outside the range of the present invention.

EXAMPLE 4-2

Cold-rolled steel sheets (0.5 mm in thickness) which were prepared by a known method were introduced to a continuous hot-dip coating apparatus to conduct hot-dip plating using respective coating baths: 55%Al-1.5%Si—Zn coating bath (Nos. 1 through 11, Nos. 14 through 25 in Tables 2 through 5); 40%Al-1.0%Si—Zn coating bath (No. 12 in Tables 2 and 3); and 70%Al-1.8%Si—Zn coating bath (No. 13 in Tables 18 and 19). The line speed was fixed to 160 m/min, and the dispersion in coating weight on one side of the steel sheet among treated sheets was 75 g/m².

During the course of manufacturing these coated steel sheets, respective heat histories given in Tables 18 and 20 were applied, and a passivated layer was formed on the coating layer.

The organic resins for the additive to the passivated layer were the same as those used in Example 4-1.

An organic resin was mixed with chromic acid at a specified mixing ratio to prepare the treatment solution. The solution was applied onto the coated steel sheet to a specified chromium coating weight, which was then dried at 160° C. of maximum ultimate sheet temperature. Thus prepared surface-treated steel sheet was tested under the same procedure with that in Example 4-1 to evaluate the roll-forming performance, the chromium fixation rate. In addition, the workability and the corrosion resistance at worked portion were evaluated using the methods described below.

The results are given on Tables 2 through 5 along with the thermal history and the passivation treatment condition applied to the coating layer.

(1) Workability

The surface-treated steel sheet was subjected to 0T bending test. The crack generation at the front end of the 0T bend portion was observed to give the evaluation on the basis of the criterion given below.

5: Observation with 20×magnifier did not identify crack.
    4: Visual observation did not identify crack. However, observation with 20×magnifier identified crack.
    3: Visual observation identified crack.
    2: Visual observation identified widely opened crack.
    1: Crack accompanied with peeling occurred.

(2) Corrosion Resistance at Worked Portion

The surface-treated steel sheet was bent to 3T state, and was placed in a salt water spray tester. The rust generation on the bend portion was observed after 500 hours of testing. The evaluation was given on the criterion shown below.

5: No abnormality was observed.
    4: White rust and black rust slightly appeared.
    3: White rust and black rust appeared over the whole area.
    2: Significant white rust and black rust appeared over the whole area.
    1: Red rust appeared.

TABLE 18

| | | | Thermal history (II) *2 | | | |
|---|---|---|---|---|---|---|
| No. | Coating layer composition | Thermal history (I) *1 Average cooling rate (° C./sec) | Heating temperature (° C.) *3 | Average cooling rate (° C./hr) *4 | Stage of heat treatment *5 | Classification |
| 1 | 55% Al—1.5% Si | 15 | 180 | 19 | (2) | Comparative example |

TABLE 18-continued

| | | Thermal history (I) *1 | Thermal history (II) *2 | | | |
|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Classification |
| 2 | 55% Al—1.5% Si | 8 | <u>330</u> | 50 | (2) | Comparative example |
| 3 | 55% Al—1.5% Si | 8 | <u>105</u> | 20 | (2) | Comparative example |
| 4 | 55% Al—1.5% Si | 8 | 265 | <u>85</u> | (2) | Comparative example |
| 5 | 55% Al—1.5% Si | 8 | 165 | <u>45</u> | (2) | Comparative example |
| 6 | 55% Al—1.5% Si | 10 | 280 | 52 | (2) | Example |
| 7 | 55% Al—1.5% Si | 10 | 180 | 23 | (2) | Example |
| 8 | 55% Al—1.5% Si | 4 | 145 | 18 | (2) | Example |
| 9 | 55% Al—1.5% SI | 4 | 240 | 58 | (2) | Example |
| 10 | 55% Al—1.5% Si | 8 | 185 | 15 | (1) | Example |
| 11 | 55% Al—1.5% Si | 8 | 170 | 22 | (3) | Example |
| 12 | 40% Al—1.0% Si | 9 | 140 | 15 | (2) | Example |
| 13 | 70% Al—1.8% Si | 7 | 230 | 60 | (2) | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment, (3): During drying stage of passivation treatment.
※ Symbol or numeral with underline is outside the range of the present invention.

TABLE 19

| | Passivated layer | | | | | | | |
|---|---|---|---|---|---|---|---|---|
| | Organic resin | | Cr coating | | Corrosion | | | |
| No. | Kind *6 | Amount of curing agent *7 | Organic resin/ Cr *8 | weight (mg/m²) | Workability | resistance at worked portion | Roll-forming property | Cr fixing rate | Classification |
| 1 | (a) | 10 | 100 | 20 | 2 | 1 | ⊚ | ⊚ | Comparative example |
| 2 | (a) | 10 | 100 | 20 | 3 | 3 | ⊚ | ⊚ | Comparative example |
| 3 | (a) | 10 | 100 | 20 | 3 | 3 | ⊚ | ⊚ | Comparative example |
| 4 | (a) | 10 | 100 | 20 | 3 | 3 | ⊚ | ⊚ | Comparative example |
| 5 | (a) | 10 | 100 | 20 | 3 | 3 | ⊚ | ⊚ | Comparative example |
| 6 | (a) | 10 | 100 | 20 | 4 | 4 | ⊚ | ⊚ | Example |
| 7 | (a) | 10 | 100 | 20 | 5 | 4 | ⊚ | ⊚ | Example |
| 8 | (a) | 10 | 100 | 20 | 5 | 4 | ⊚ | ⊚ | Example |
| 9 | (a) | 10 | 100 | 20 | 4 | 4 | ⊚ | ⊚ | Example |
| 10 | (a) | 10 | 100 | 20 | 5 | 5 | ⊚ | ⊚ | Example |
| 11 | (a) | 10 | 100 | 20 | 4 | 4 | ⊚ | ⊚ | Example |
| 12 | (a) | 10 | 100 | 20 | 4 | 4 | ⊚ | ⊚ | Example |
| 13 | (a) | 10 | 100 | 20 | 4 | 4 | ⊚ | ⊚ | Example |

*6 Resins (a) through (d) are given in the descriptions.
*7 Weight parts of curing agent to 100 weight parts of principal resin.
*8 Mass ratio of the organic resin (A) to the chromium (B) as metallic chromium, (A)/(B).
※ Symbol or numeral with underline is outside the range of the present invention.

TABLE 20

| | | Thermal history (I) *1 | Thermal history (II) *2 | | | |
|---|---|---|---|---|---|---|
| No. | Coating layer composition | Average cooling rate (° C./sec) | Heating temperature (° C.) *3 | Average cooling rate (° C./hr) *4 | Stage of heat treatment *5 | Classification |
| 14 | 55% Al—1.5% Si | 10 | 180 | 23 | (2) | Example |
| 15 | 55% Al—1.5% Si | 10 | 180 | 23 | (2) | Comparative example |

TABLE 20-continued

| | | | Thermal history (II) *2 | | | |
| No. | Coating layer composition | Thermal history (I) *1 Average cooling rate (° C./sec) | Heating temperature (° C.) *3 | Average cooling rate (° C./hr) *4 | Stage of heat treatment *5 | Classification |
|---|---|---|---|---|---|---|
| 16 | 55% Al—1.5% Si | 10 | 180 | 23 | (2) | Example |
| 17 | 55% Al—1.5% Si | 10 | 180 | 23 | (2) | Comparative example |
| 18 | 55% Al—1.5% Si | 10 | 180 | 23 | (2) | Comparative example |
| 19 | 55% Al—1.5% Si | 10 | 180 | 23 | (2) | Example |
| 20 | 55% Al—1.5% Si | 10 | 180 | 23 | (2) | Comparative example |
| 21 | 55% Al—1.5% Si | 10 | 180 | 23 | (2) | Comparative example |
| 22 | 55% Al—1.5% Si | 10 | 180 | 23 | (2) | Example |
| 23 | 55% Al—1.5% Si | 10 | 180 | 23 | (2) | Comparative example |
| 24 | 55% Al—1.5% Si | 10 | 180 | 23 | (2) | Comparative example |
| 25 | 55% Al—1.5% Si | 10 | 180 | 23 | (2) | Comparative example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment, (3): During drying stage of passivation treatment.
X: Symbol or numeral with underline is outside the range of the present invention.

TABLE 21

| | Passivated layer | | | | Corrosion resistance | | | |
| | Organic resin | | Organic resin/ Cr*8 | Cr coating weight (mg/m²) | | at worked portion | Roll-forming property | Cr fixing rate | Classification |
| No. | Kind*6 | Amount of curing agent*7 | | | Workability | | | | |
|---|---|---|---|---|---|---|---|---|---|
| 14 | (a) | 10 | 100 | 20 | 5 | ○ | ⊙ | ⊙ | Example |
| 15 | (a) | 0 | 100 | 20 | 5 | x | x | ⊙ | Comparative example |
| 16 | (b) | 10 | 100 | 20 | 5 | ○ | ⊙ | ⊙ | Example |
| 17 | (b) | 0 | 100 | 20 | 5 | x | x | ⊙ | Comparative example |
| 18 | (a) | 10 | — | 0 | 5 | x | x | — | Comparative example |
| 19 | (a) | 10 | 50 | 80 | 5 | ○ | ○ | ○ | Example |
| 20 | (a) | 10 | 50 | 150 | 5 | ○ | Δ | x | Comparative example |
| 21 | — | — | — | 20 | 5 | x | x | x | Comparative example |
| 22 | (a) | 10 | 150 | 20 | 5 | ○ | ○ | ○ | Example |
| 23 | (a) | 10 | 300 | 20 | 5 | Δ | Δ | ○ | Comparative example |
| 24 | (c) | — | 100 | 20 | 5 | x | x | ○ | Comparative example |
| 25 | (d) | — | 100 | 20 | 5 | Δ | Δ | ○ | Comparative example |

*6 Resins (a) through (d) are given in the descriptions.
*7 Weight parts of curing agent to 100 weight parts of principal resin.
*8 Mass ratio of the organic resin (A) to the chromium (B) as metallic chromium, (A)/(B).
X Symbol or numeral with underline is outside the range of the present invention.

EXAMPLE 4-3

Cold-rolled steel sheets (0.5 mm in thickness) which were prepared by a known method were introduced to a continuous hot-dip coating apparatus to conduct hot-dip plating using a 55%Al-1.5%Si—Zn coating bath. The line speed was fixed to 160 m/min, and the coating weight on one side of the steel sheet was 75 g/m².

During the course of manufacturing these coated steel sheets, respective heat histories given in Table 22 were applied, and a passivated layer was formed on the coating layer. Condition for the passivation treatment was the following. A treatment solution was prepared by mixing the resin (b) (adding 10 weight parts of curing agent to 100 weight parts of the principal resin), which was used in Example 4-1, with chromic acid at a ratio of 1/100 (organic resin/chromium). Thus prepared treatment solution was applied onto the coated steel sheet at a coating weight of 20 mg/m², which was then dried at 160° C. of maximum ultimate sheet temperature.

Each of the prepared surface-treated steel sheets was evaluated in terms of workability (anti-crack performance) and corrosion resistance at worked portion, using the same procedures as those in Example 4-2. The results are given in Table 22 along with the thermal history applied to the coating layer.

The chromate layer may contain silica to enhance the adhesiveness with the upper organic resin layer, and also to prevent degradation of corrosion resistance of the passivated layer on applying heat treatment to provide a specific thermal history to the coating layer after the passivation treatment. As for the kind of silica being added, dry silica has significant effect in view of the improvement in adhesiveness with the upper resin layer. On the other hand, from the point of prevention of corrosion resistance degradation caused by heat treatment, wet silica is more effective than dry silica. Accordingly, the kind of silica may be selected

TABLE 22

| No. | Coating layer composition | Thermal history (I)*1 Average cooling speed (° C./sec) | Thermal history (II)*2 | | | Workability | Corrosion resistance at worked portion | Classification |
|---|---|---|---|---|---|---|---|---|
| | | | Heating temperature (° C.)*3 | Average cooling rate (° C./hr)*4 | Stage of heat treatment*5 | | | |
| 1 | 55%Al—1.5%Si | 10 | 250 | 55 | (2) | 4 | 4 | Example |
| 2 | 55%Al—1.5%Si | 10 | 170 | 27 | (2) | 5 | 4 | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before passivation treatment, (2): After passivation treatment, (3): During drying stage of passivation treatment.

Embodiment 5

The surface-treated steel sheet according to the Embodiment 5 uses a substrate steel sheet coated by a hot-dip Al—Zn base coating layer containing 20 to 95 mass % Al. From the point of corrosion resistance and other characteristics, a preferred range of Al content in the coating layer is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available. That type of hot-dip Al—Zn base coated steel sheet is, however, difficult to attain high corrosion resistance at worked portion thereof solely by the coating composition, and the high corrosion resistance at worked portion can be attained by applying thermal history, which will be described later, and also by combining passivated layer as upper layer.

Although the coating weight on the hot-dip Al—Zn base coated steel sheet is not specifically limited, generally it is adequate to be in an approximate range of from 30 to 200 g/m² per a side of the steel sheet.

With the surface-treated steel sheet according to the Embodiment 5, the passivated layer formed on the coating layer comprises a chromate layer having chromium coating weights of 0.1 mg/m² or more and less than 100 mg/m² as metallic chromium, preferably from 5 to 40 mg/m², and a layer formed on the chromate layer, or the upper layer. The upper layer is an organic resin layer having thicknesses of from 0.1 to 5 ιm, preferably from 0.5 to 3 ιm, being made of a thermosetting organic resin as the layer-forming resin.

The chromate layer has an effect to improve the corrosion resistance by bringing the coating layer surface to passive state. If the chromium coating weight of the chromate layer is less than 0.1 mg/m² as metallic chromium, the effect to improve the corrosion resistance becomes insufficient. If the chromium coating weight thereof is 100 mg/m² or more, the effect to improve the corrosion resistance for the coating weight cannot be expected, and coloring on the chromate layer degrades appearance of the coated steel sheet, which are not favorable.

depending on the use object. A preferable silica adding amount is in a range of from 1 to 50 mass % as solid matter in the film, and more preferably from 5 to 30 mass %.

The chromate layer may contain additives other than silica. For example, for improving corrosion resistance and preventing coloring, applicable additives include mineral acid, fluoride, phosphorus acid, phosphoric acid base compound, and metallic salt such as that of Ni, Co, Fe, Zn, Mg, and Ca.

The chromate treatment is conducted by applying a chromating solution onto the coated steel sheet, and then by drying the applied chromating solution at, normally, temperatures of from 80° C. to 250° C., thus obtaining the chromate layer.

The organic resin layer formed on the chromate layer is a layer having thicknesses of from 0.1 to 5 ιm, made of a thermosetting organic resin as the layer-forming resin.

It is necessary that the organic resin in the organic resin layer is a thermosetting resin. When continuous roll-forming working is given to the surface-treated steel sheet, the roll temperature significantly increases. Thus, if the organic resin existing in the passivated layer is an ordinary thermoplastic resin or is a general emulsion resin, the increased temperature of the roll induces f laws on the layer, which results in degraded appearance after the work. The inventors of the present invention studied the problem, and found that the use of thermosetting resin as the resin mixed into the layer drastically improves the anti-law performance at elevated temperatures, and that continuous roll-forming work does not induce degradation in the post-working appearance with the use of a thermosetting resin.

The thermosetting resin referred herein is a resin that induces, under the heating action on layer-forming, an addition or condensation reaction between functional side chains of organic high molecular weight molecules or between organic high molecular weight molecules and a curing agent, or a crosslinking action such as radical polymerization using double bond in main chain or side chain. Examples of applicable thermosetting resin are alkyd resin, polyester resin, polyurethane resin, acrylic resin, epoxy resin, polystyrene resin, or one or more of modified resin of them. As of these, polyester resin, polyurethane resin, and acrylic resin are particularly preferable from the point of workability. Above-given thermosetting resins have water-dispersing type and solvent-dissolving type, and either type is applicable.

These resins are cured by the crosslinking reaction which is induced by the heating after applying the resin solution. The curing temperature differs with the kind of resin and kind of curing agent. The present invention does not specifically limit the kind of curing agent, the amount of curing agent, the heating temperature after applying the resin solution, and the heating time after applying the resin solution. The resin solution may be completely cured by the heating after applying the resin solution, or may be cured to an adequate degree by the heating after applying the resin solution, (to a curing state that the film is not separated by the contact with sheet-feeding roll or the like), followed by completely curing during the succeeding heat treatment.

If the thickness of the organic resin layer is less than 0.1 µm, the roll-forming performance is not sufficient. If the layer thickness exceeds 5 µm, the adhesion of the resin to the forming-roll becomes significant.

For the surface-treated steel sheet according to the Embodiment 5, when heat treatment is given after forming the passivated layer for giving a specific thermal history, which is described later, to the coating layer, the characteristics of organic resin contained in the passivated layer may degrade. In that case, addition of an inorganic additive (fine particles) to the passivated layer (organic resin film) is an effective means. Applicable inorganic additive includes one or more of silica, phosphorus acid base compound, silicic acid compound such as Ca salt and Mg salt.

In the surface-treated steel sheet according to the Embodiment 5, the lower layer in the passivated layer is a chromate layer so that the organic resin layer does not contain chromium. Accordingly, the surface-treated steel sheet provides particularly high performance of resistance to chromium elution.

According to the surface-treated steel sheet of the Embodiment 5, the coating layer on the hot-dip Al—Zn base coated steel sheet is preferably a coating layer subjected to at least thermal history (a) and thermal history (b), described below. By forming the above-described specific passivated layer on the coating layer which was subjected to the heat histories (a) and (b), particularly high workability and corrosion resistance at worked portion are attained.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip plated plating metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after solidification of the hot-dip coated metal.

$$C = (T-100)/2 \quad (1)$$

In the thermal history of (b), more preferable temperature range of T(° C.) is from 130° C. to 200° C.

By applying the above-described heat histories (a) and (b) to the coating layer, the workability (crack resistance and other characteristics) of the coating layer is significantly improved notwithstanding that the coating layer is a hot-dip Al—Zn base plating.

The method for manufacturing the surface-treated steel sheet according to the Embodiment 5 is described in the following.

The manufacturing method according to the Embodiment 5 is a method for manufacturing the surface-treated steel sheet using a continuous hot-dip coating apparatus or the like, which steel sheet uses a hot-dip Al—Zn base coated steel sheet having a coating layer containing 20 to 95 mass % Al, as the substrate steel sheet, and forms a passivated layer on the substrate coated steel sheet. The method has the steps of applying thermal history of at least (a) and (b) described below and of forming a passivated layer on the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after solidification of the hot-dip coated metal, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C.and 300° C. to 100° C., after solidification of the hot-dip coated metal.

$$C = (T-100)/2 \quad (1)$$

As of the thermal history (a) and the thermal history (b) applied to the coating layer, the thermal history (a) is given by controlling the cooling condition of the coating layer immediately after plated.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a gas-heating furnace. Applicable means for cooling includes a gas-blowing unit.

Application of the thermal history (b) is conducted by giving a specific heat treatment to the coated steel sheet after solidification of the hot-dip coated metal, or by controlling the cooling rate of the coating layer after solidification of the hot-dip coated metal by soaking or the like. According to the manufacturing method of the present invention, a specific passivated layer is formed on the coating layer of the coated steel sheet. The heat treatment to apply the thermal history (b) to the coating layer may be given in any one stage of ① before forming the passivated layer, ② during drying period of the passivated layer, ③ after forming the passivated layer (after applying the treatment solution and succeeding drying period to form the film). Alternatively, the heat treatment to apply the thermal history (b) may be given in more than one stage among the seven steps described above.

Consequently, the application of thermal history (b) to the coating layer may be given in at least one stage among the four (1) through (4) given below.

(1) Before forming the passivated layer.

(2) During drying period of the passivated layer.

(3) After forming the passivated layer.

(4) During cooling period after solidified the hot-dip plated plating metal.

As of the above-described stages for applying heat treatment, the stage ① has an advantage that individual conditions of the heat treatment process and the passivation treatment process can be optimized, independently, and the stages ② and ③ are suitable for carrying out all the treatments within the continuous hot-dip coating apparatus. The stage ② is particularly superior in economy because the heat treatment is given by utilizing the heat of the drying period of the passivation treatment.

According to the manufacturing method of the Embodiment 5, the chromate treatment is given to the surface of coated steel sheet to form a chromate layer having chromium coating weights of 0.1 mg/m² or more and less than 100 mg/m² as metallic chromium, preferably from 5 to 40 mg/m², and then an organic resin layer having layer thicknesses of from 0.1 to 5 ιm, preferably from 0.5 to 3 ιm, being made of a thermosetting resin as the layer-forming resin is formed thereon.

As for the chromate treatment, a chromating solution which may contain additives such as silica, at need, is applied onto the coated steel sheet, and the applied solution is heated to dry at temperatures of from 80° C. to 300° C. generally without washing the applied solution with water.

To form the above-described organic resin layer, a resin solution containing a thermosetting organic resin as the layer-forming resin, and containing other additives at need, is applied, followed by heating thereof to cure the resin.

The reasons to limit the layer constitution of the passivated layer, and the sequential order of the process to form the passivated layer and the process to give the above-described thermal history (b) are the same as those described before.

EXAMPLE 5-1

Cold-rolled steel sheets (0.5 mm in thickness) which were prepared by a known method were introduced to a continuous hot-dip coating apparatus to conduct hot-dip coating using a 55%Al-1.5%Si—Zn coating bath. The line speed was fixed to 160 m/min, and the coating weight on one side of the steel sheet was 75 g/m².

In the manufacturing process for the coated steel sheet, a thermal history was given to the coated steel sheet applying 15° C./sec of average cooling rate during the first 10 seconds after the steel sheet left the hot-dip coating bath, and a passivation treatment was given to the coating layer. Regarding the chromate treatment, a treatment solution was prepared by mixing dry silica, phosphorus acid, and chromic acid at a ratio of [dry silica:phosphorus acid:chromium= 1:1:1], while adjusting the chromium reduction rate to 40%. Thus prepared treatment solution was applied onto the coated steel sheet, which was then dried at 80° C. of sheet temperature to obtain the chromate layer. The applied layer-forming resin for the organic resin layer formed on the chromate layer is the following.

(a) Thermosetting resin (polyester-polyol resin as the principal resin, and isocyanate base curing agent as the curing agent).

(b) Thermosetting resin (acrylic polyol resin as the principal resin, and melamine resin as the curing agent).

(c) Thermoplastic resin (MMA-MA base acrylic emulsion resin).

A solvent type resin solution containing one of the above-listed organic resins was applied onto the chromated surface using a roll coater, which solution was then dried at 160° C. of sheet temperature.

Thus prepared surface-treated steel sheet was tested under the procedures given below to evaluate the corrosion resistance at worked portion and the roll-forming performance.

The results are given on Table 23 along with the passivation treatment condition.

(1) Corrosion Resistance at Worked Portion

The surface-treated steel sheet was bent to 5T state, and was placed in a salt water spray tester. The rust generation on the bent section was observed after 500 hours of testing. The evaluation was given on the criterion shown below.

⊚: No abnormality was observed. (Area percentage of rust generation was less than 10%.)

○: White rust and black rust slightly appeared. (Area percentage of rust generation was 10% or more and less than 25%.)

Δ: White rust and black rust appeared. (Area percentage of rust generation was 25% or more and less than 80%.)

x: Significant white rust and black rust appeared. (Area percentage was 80% or more.)

(2) Roll-forming Performance

With a surface-treated steel sheet having a size of 30×300 mm, the sliding test was conducted using a draw-bead tester under the condition of mold temperature of 120° C. and 100 kg of pressing load of bead having 5 mmR at tip thereof. The appearance after drawing was visually observed to give the estimation based on the criterion given below.

⊚: Blackening area was less than 10%, and no adhesion of peeled film to the mold occurred.

○: Blackening area was 10% or more and less than 25%, or slight adhesion of peeled film to the mold occurred.

Δ: Blackening area was 25% or more and less than 50%, or significant adhesion of peeled film to the mold occurred.

x: Blackening area was 50% or more, or significant "galling" occurred on the surface of steel sheet.

TABLE 23

| | | Passivated layer | | | | | |
|---|---|---|---|---|---|---|---|
| | Cr coating weight in | | Organic resin film | | Corrosion | | |
| No. | chromate layer (mg/m²) | Kind*1 | Amount of curing agent*2 | Film thickness (μm) | resistance at worked portion | Roll-forming property | Classification |
| 1 | 20 | (a) | 10 | 2 | ○ | ⊚ | Example |
| 2 | 20 | (a) | 0 | 2 | Δ | x | Comparative example |

TABLE 23-continued

| | Cr coating weight in chromate layer (mg/m²) | Passivated layer | | | Corrosion | | |
|---|---|---|---|---|---|---|---|
| | | Organic resin film | | | | | |
| No. | | Kind*1 | Amount of curing agent*2 | Film thickness (μm) | resistance at worked portion | Roll-forming property | Classification |
| 3 | 20 | (b) | 10 | 2 | ○ | ⊚ | Example |
| 4 | 20 | (b) | <u>0</u> | 2 | Δ | x | Comparative example |
| 5 | <u>0</u> | (b) | 10 | 2 | x | Δ | Comparative example |
| 6 | 80 | (b) | 10 | 2 | ○ | ○ | Example |
| 7 | <u>150</u> | (b) | 10 | 2 | ○ | Δ | Comparative example |
| 8 | 20 | — | — | — | x | x | Comparative example |
| 9 | 20 | (b) | 10 | 4 | ⊚ | ○ | Example |
| 10 | 20 | (b) | 10 | <u>7</u> | ⊚ | Δ | Comparative example |
| 11 | 20 | <u>(c)</u> | 0 | 2 | x | x | Comparative example |

*1Resins (a) through (c) are given in the descriptions.
*2Weight parts of curing agent to 100 weight parts of principal resin.
※Symbol or numeral with underline is outside the range of the present invention.

EXAMPLE 5-2

Cold-rolled steel sheets (0.5 mm in thickness) which were prepared by a known method were introduced to a continuous hot-dip coating apparatus to conduct hot-dip coating using respective coating baths: 55%Al-1.5%Si—Zn coating bath (Nos. 1 through 11, Nos. 14 through 24 in Tables 24 through 27); 40%Al-1.0%Si—Zn coating bath (No. 12 in Tables 2 and 3); and 70%Al-1.8%Si—Zn coating bath (No. 13 in Tables 2 and 3). The line speed was fixed to 160 m/min, and the dispersion in coating weight on one side of the steel sheet among treated sheets was 75 g/m².

During the course of manufacturing these coated steel sheets, respective heat histories given in Tables 24 and 26 were applied thereto, and a passivated layer was formed on the coating layer. Regarding the chromate treatment, a treatment solution was prepared by mixing dry silica, phosphorus acid, and chromic acid at a ratio of [dry silica:phosphorus acid:chromium=1:1:1], while adjusting the chromium reduction rate to 40%. Thus prepared treatment solution was applied onto the coated steel sheet, which was then dried at 80° C. of sheet temperature to obtain the chromate layer. The applied layer-forming resin of the organic resin layer formed on the chromate layer was the same as that of Example 5-1. A solvent type resin solution containing one of the above-listed organic resins was applied onto the chromated surface using a roll coater, which solution was then dried at 160° C. of sheet temperature.

Thus prepared surface-treated steel sheet was tested under the procedures same as that in Example 5-1 to evaluate the workability (crack resistance) and the corrosion resistance at worked portion.

The results are given on Tables 24 through 27 along with the thermal history given to the coating layer and the passivation treatment condition.

(1) Workability

The surface-treated steel sheet was subjected to 0T bending test. The crack generation at the front end of the 0T bend portion was observed to give evaluation on the basis of the criterion given below.

5: Observation with 20×magnifier did not identify crack.
4: Visual observation did not identify crack. However, observation with 20×magnifier identified crack.
3: Visual observation identified crack.
2: Visual observation identified widely opened crack.
1: Crack accompanied with peeling occurred.

(2) Corrosion Resistance at Worked Portion

The surface-treated steel sheet was bent to 1T state, and was placed in a combined cycle tester. The rust generation on the bent section was observed after 500 hours of testing. The evaluation was given on the criterion shown below. A single cycle of the combined cycle test was [0.5 hour of 5%NaCl spray at 30° C.]→[1.5 hour of wet condition at 30° C.]→[2 hour of dry condition at 50° C.]→[2 hour of dry condition at 30° C.].

⊚: No abnormality was observed. (Area percentage of rust generation was less than 10%.)
○: White rust and black rust slightly appeared. (Area percentage of rust generation was 10% or more and less than 25%.)
Δ: White rust and black rust appeared. (Area percentage of rust generation was 25% or more and less than 80%.)
x: Significant white rust and black rust appeared. (Area percentage was 80% or more.)

TABLE 24

| | | | Thermal history (II)*2 | | | |
|---|---|---|---|---|---|---|
| No. | Coating layer composition | Thermal history (I)*1 Average cooling speed (° C./sec) | Heating temperature (° C.)*3 | Average cooling speed (° C./hr)*4 | Stage of heat treatment*5 | Classification |
| 1 | 55%Al—1.5%Si | <u>15</u> | 180 | 19 | (2) | Comparative example |

TABLE 24-continued

| | | Thermal history (I)[*1] | Thermal history (II)[*2] | | | |
|---|---|---|---|---|---|---|
| No. | Coating layer composition | Average cooling speed (° C./sec) | Heating temperature (° C.)[*3] | Average cooling speed (° C./hr)[*4] | Stage of heat treatment[*5] | Classification |
| 2 | 55%Al—1.5%Si | 8 | <u>330</u> | 50 | (2) | Comparative example |
| 3 | 55%Al—1.5%Si | 8 | <u>105</u> | 20 | (2) | Comparative example |
| 4 | 55%Al—1.5%Si | 8 | 265 | <u>85</u> | (2) | Comparative example |
| 5 | 55%Al—1.5%Si | 8 | 165 | <u>45</u> | (2) | Comparative example |
| 6 | 55%Al—1.5%Si | 10 | 280 | 52 | (2) | Example |
| 7 | 55%Al—1.5%Si | 10 | 180 | 23 | (2) | Example |
| 8 | 55%Al—1.5%Si | 4 | 145 | 18 | (2) | Example |
| 9 | 55%Al—1.5%Si | 4 | 240 | 58 | (2) | Example |
| 10 | 55%Al—1.5%Si | 8 | 185 | 15 | (1) | Example |
| 11 | 55%Al—1.5%Si | 8 | 170 | 22 | (3) | Example |
| 12 | 40%Al—1.0%Si | 9 | 140 | 15 | (2) | Example |
| 13 | 70%Al—1.8%Si | 7 | 230 | 60 | (2) | Example |

[*1]Average cooling rate of coating layer during the first 10 seconds after the steel sheet left from hot-dip coating bath.
[*2]Thermal history applied by the heat treatment conducted after the hot-dip plated coating layer solidified.
[*3]Heating temperature of coating layer during the heat treatment.
[*4]Average cooling rate of coating layer during the heat treatment in a temperature range of from the heating temperature to 100° C.
[*5](1): Before passivation treatment, (2): After passivation treatment, (3): During drying stage of passivation treatment.
※Symbol or numeral with underline is outside the range of the present invention.

TABLE 25

| | Passivated layer | | | | | | |
|---|---|---|---|---|---|---|---|
| | Cr coating weight | Organic resin film | | | Corrosion | | |
| No. | in chromate layer (mg/m²) | Kind[*6] | Amount of curing agent[*7] | Film thickness (μm) | Workability | resistance at worked portion | Roll-forming property | Classification |
| 1 | 20 | (b) | 10 | 2 | 2 | x | ◉ | Comparative example |
| 2 | 20 | (b) | 10 | 2 | 3 | x | ◉ | Comparative example |
| 3 | 20 | (b) | 10 | 2 | 3 | x | ◉ | Comparative example |
| 4 | 20 | (b) | 10 | 2 | 3 | x | ◉ | Comparative example |
| 5 | 20 | (b) | 10 | 2 | 3 | x | ◉ | Comparative example |
| 6 | 20 | (b) | 10 | 2 | 4 | o | ◉ | Example |
| 7 | 20 | (b) | 10 | 2 | 5 | o | ◉ | Example |
| 8 | 20 | (b) | 10 | 2 | 5 | x | ◉ | Example |
| 9 | 20 | (b) | 10 | 2 | 4 | o | ◉ | Example |
| 10 | 20 | (b) | 10 | 2 | 5 | o | ◉ | Example |
| 11 | 20 | (b) | 10 | 2 | 4 | o | ◉ | Example |
| 12 | 20 | (b) | 10 | 2 | 4 | o | ◉ | Example |
| 13 | 20 | (b) | 10 | 2 | 4 | o | ◉ | Example |

[*6]Resins (a) through (c) are given in the descriptions.
[*7]Weight parts of curing agent to 100 weight parts of principal resin.
※Symbol or numeral with underline is outside the range of the present invention.

TABLE 26

| | | Thermal history (I)[*1] | Thermal history (II)[*2] | | | |
|---|---|---|---|---|---|---|
| No. | Coating layer composition | Average cooling speed (° C./sec) | Heating temperature (° C.)[*3] | Average cooling speed (° C./hr)[*4] | Stage of heat treatment[*5] | Classification |
| 14 | 55%Al—1.5%Si | 10 | 180 | 23 | (2) | Example |
| 15 | 55%Al—1.5%Si | 10 | 180 | 23 | (2) | Comparative example |
| 16 | 55%Al—1.5%Si | 10 | 180 | 23 | (2) | Example |
| 17 | 55%Al—1.5%Si | 10 | 180 | 23 | (2) | Comparative example |

TABLE 26-continued

| | | Thermal history (I)[*1] | Thermal history (II)[*2] | | | |
|---|---|---|---|---|---|---|
| No. | Coating layer composition | Average cooling speed (° C./sec) | Heating temperature (° C.)[*3] | Average cooling speed (° C./hr)[*4] | Stage of heat treatment[*5] | Classification |
| 18 | 55%Al—1.5%Si | 10 | 180 | 23 | (2) | Comparative example |
| 19 | 55%Al—1.5%Si | 10 | 180 | 23 | (2) | Example |
| 20 | 55%Al—1.5%Si | 10 | 180 | 23 | (2) | Comparative example |
| 21 | 55%Al—1.5%Si | 10 | 180 | 23 | (2) | Comparative example |
| 22 | 55%Al—1.5%Si | 10 | 180 | 23 | (2) | Example |
| 23 | 55%Al—1.5%Si | 10 | 180 | 23 | (2) | Comparative example |
| 24 | 55%Al—1.5%Si | 10 | 180 | 23 | (2) | Comparative example |

[*1]Average cooling rate of coating layer during the first 10 seconds after the steel sheet left from hot-dip coating bath.
[*2]Thermal history applied by the heat treatment conducted after the hot-dip plated coating layer solidified.
[*3]Heating temperature of coating layer during the heat treatment.
[*4]Average cooling rate of coating layer during the heat treatment in a temperature range of from the heating temperature to 100° C.
[*5](1): Before passivation treatment, (2): After passivation treatment, (3): During drying stage of passivation treatment.
✕Symbol or numeral with underline is outside the range of the present invention.

TABLE 27

| | Passivated layer | | | | | | | |
|---|---|---|---|---|---|---|---|---|
| | Cr coating weight | Organic resin film | | | | Corrosion | | |
| No. | in chromate layer (mg/m²) | Kind[*6] | Amount of curing agent[*7] | Film thickness (μm) | Workability | resistance at worked portion | Roll-forming property | Classification |
| 14 | 20 | (a) | 10 | 2 | 5 | ○ | ◉ | Example |
| 15 | 20 | (a) | 0 | 2 | 5 | x | x | Comparative example |
| 16 | 20 | (b) | 10 | 2 | 5 | ○ | ◉ | Example |
| 17 | 20 | (b) | 0 | 2 | 5 | x | x | Comparative example |
| 18 | 0 | (b) | 10 | 2 | 5 | x | Δ | Comparative example |
| 19 | 80 | (b) | 10 | 2 | 5 | ○ | ◉ | Example |
| 20 | 150 | (b) | 10 | 2 | 5 | ○ | Δ | Comparative example |
| 21 | 20 | — | — | — | 5 | x | x | Comparative example |
| 22 | 20 | (b) | 10 | 4 | 5 | ◉ | ◉ | Example |
| 23 | 20 | (b) | 10 | 7 | 5 | ◉ | Δ | Comparative example |
| 24 | 20 | (c) | 0 | 2 | 5 | x | x | Comparative example |

[*6]Resins (a) through (c) are given in the descriptions.
[*7]Weight parts of curing agent to 100 weight parts of principal resin.
✕Symbol or numeral with underline is outside the range of the present invention.

EXAMPLE 5-3

Cold-rolled steel sheets (0.5 mm in thickness) which were prepared by a known method were introduced to a continuous hot-dip coating apparatus to conduct hot-dip coating using a 55%Al-1.5%Si—Zn coating bath. The line speed was fixed to 160 m/min, and the coating weight on one side of the steel sheet was 75 g/m².

During the course of manufacturing these coated steel sheets, respective heat histories given in Table 28 were applied thereto, and the passivation treatment was applied to the coating layer. The condition of passivation treatment is as follows. The chromate layer having the chromium coating weight of 20 mg/m² as metallic chromium was formed on the coated steel sheet by applying the chromate treatment same with that in Example 5-2. The solvent type resin solution containing 10 weight parts of diisocyanate resin as the curing agent to 100 weight parts of polyester polyol resin as the principal resin was applied onto the chromate-treated surface using a roll coater. The coating of the steel sheet was dried at 160° C. of sheet temperature to obtain the organic resin film having 2 μm of thickness. With thus prepared surface-treated steel sheet, the workability (crack resistance) and the corrosion resistance at worked portion were evaluated using the same methods as those in Example 5-2. The results are given in Table 28 along with the thermal history given to the coating layer.

TABLE 28

| | | | Thermal history (II)[2] | | | | Corrosion | |
| No. | Coating layer composition | Thermal history (I)[1] Average cooling speed (° C./sec) | Heating temperature (° C.)[3] | Average cooling rate (° C./hr)[4] | Stage of heat treatment[5] | Workability | resistance at worked portion | Classification |
| --- | --- | --- | --- | --- | --- | --- | --- | --- |
| 1 | 55%Al—1.5%Si | 10 | 250 | 55 | (2) | 4 | ○ | Example |
| 2 | 55%Al—1.5%Si | 10 | 170 | 27 | (2) | 5 | ○ | Example |

[1]Average cooling rate of coating layer during the first 10 seconds after the steel sheet left from hot-dip coating bath.
[2]Thermal history applied by the heat treatment conducted after the hot-dip plated coating layer solidified.
[3]Heating temperature of coating layer during the heat treatment.
[4]Average cooling rate of coating layer during the heat treatment in a temperature range of from the heating temperature to 100° C.
[5](1): Before passivation treatment, (2): After passivation treatment, (3): During drying stage of passivation treatment.

Embodiment 6

The surface-treated steel sheet according to the Embodiment 6 uses a substrate steel sheet coated by a hot-dip Al—Zn base coating layer containing 20 to 95 mass % Al. From the point of corrosion resistance and other characteristics, a preferred range of Al content in the coating layer is from 45 to 65 mass %. A particularly preferred composition of the coating layer is 45 to 65 mass % Al, 0.7 to 2.0 mass % Si, less than 10 mass % Fe, and balance of substantially Zn containing inevitable impurities. With that composition, particularly high corrosion resistance is available.

The corrosion resistance and the workability are further improved by adding 0.01 to 10 mass % of one or more of elements selected from the group consisting of Mg, V, and Mn, to the coating layer. If the content of the total of these elements is less than 0.01 mass %, sufficient effect of corrosion resistance and workability cannot be attained. If the content thereof exceeds 10 mass %, the effect of corrosion resistance saturates, and the workability degrades caused by hardening of the layer.

That type of Al—Zn base coated steel sheet is, however, difficult to attain high corrosion resistance at worked portion thereof solely by the coating composition, and the high worked portion corrosion resistance can be attained by applying thermal history, which will be described later, and also by combining an upper covering layer.

Although the coating weight on the hot-dip Al—Zn base coated steel sheet is not specifically limited, generally it is adequate to be in an approximate range of from 30 to 200 g/m² per a side of the steel sheet.

Furthermore, the coating layer on the hot-dip Al—Zn base coated steel sheet has to be a coating layer subjected to at least thermal history (a) and thermal history (b), described below.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip coated metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after solidification of the hot-dip coated metal.

$$C = (T-100)/2 \quad (1)$$

In the thermal history of (b), more preferable temperature range of T(° C.° C.) is from 130° C. to 200° C.

By applying the above-described heat histories (a) and (b) to the coating layer, the workability (crack resistance and other characteristics) of the coating layer is significantly improved notwithstanding that the coating layer is a hot-dip Al—Zn base coating. Presumable reason of the significant improvement in the workability of coating layer through the heat histories (a) and (b) is the following. First, the thermal history (a) is applied to the coating layer immediately after the coated steel sheet left the hot-dip coating bath. That is, the coating layer is subjected to the thermal history (a) of sufficiently low average cooling rate during a period of first 10 seconds after leaving the hot-dip coating bath, which brings the solidification of the hot-dip plated layer closer to an equilibrium state than ordinary cooling process does. Accordingly, the diffusion in half-melting state accelerates the phase separation between Al and Zn, thus softening the coating layer. Secondly, the coating layer after subjected to the thermal history (a) further undergoes the thermal history (b). The thermal history (b) is the one to give slow-cooling to the coating layer under a specified condition after heated the coating layer to temperatures of 130° C. to 300° C. (preferably 130° C. to 200° C.), and/or the one to give slow cooling to the coating layer under a specified condition from a temperature range of 130° C. to 300° C. (preferably 130° C. to 200° C.) after solidifying the coating layer. The thermal history (b) relaxes the strain accumulated in the coating layer during solidification period, and induces solid diffusion in the coating layer, thus the phase separation between Al and Zn in the coating layer, began in the thermal history (a), is further accelerated. As a result, the coating layer should become significantly soft, and the workability thereof should significantly be improved.

Therefore, the softening of coating layer and the significant improvement in workability thereof owe to a combined effect of above-described two kinds of thermal history, (a) and (b). Only one thermal history, (a) or (b), is difficult to form the soft coating layer and to obtain the improved coating layer workability.

The detail of the heat histories (a) and (b) is described in the following.

Regarding the thermal history (a), the average cooling rate of the coating layer is less than 11° C./sec during the first 10 seconds after the steel sheet left the hot-dip coating bath, which brings the solidification of the hot-dip coated layer closer to an equilibrium state than ordinary cooling process does, as described above. Accordingly, the diffusion in half-melting state accelerates the phase separation between Al and Zn, thus softening the coating layer. If the average cooling rate is 11° C./sec or more during the first 10 seconds after the steel sheet left from the hot-dip coating bath, the solidification speed becomes excessively high, so the solidification of the hot-dip plated layer proceeds in a non-equilibrium state, and, the period in half-melting state is short so that the phase separation between Al and Zn cannot fully proceed. As a result, the softening of coating layer expected by the combination with the thermal history (b) cannot sufficiently be attained at that high speed of cooling.

To give the thermal history (a) to the coating layer, it is necessary to provide the continuous hot-dip coating apparatus with a temperature control unit between the hot-dip coating bath level and the roll to which the steel sheet contacts first after leaving the bath, and to control the cooling rate of the coating layer by the temperature control unit. A preferable temperature control unit is the one having a means for heating or soaking and having, at need, a means for cooling. The cooling means aims to cool the coated steel sheet, which steel sheet is under the control of cooling rate of the coating layer by the means for heating or soaking, before contacting the steel sheet with the first roll (top roll, or the like) to prevent the generation of pickup on the roll surface. Applicable means for heating or soaking in the temperature control unit includes an induction heater and a gas-heating furnace. Applicable means for cooling includes a gas-blowing unit. The means for heating or soaking and the means for cooling of the temperature control unit are not specifically limited if only they can apply the thermal history (a) to the coating layer.

As for the thermal history (b), the coating layer after treated by the thermal history (a), (or the coating layer after solidified the hot-dip plated plating metal), is heated to a temperature T(° C.) between 130° C. and 300° C., preferably between 130° C. and 200° C., followed by cooling thereof at an average cooling rate of C(° C./hr), defined by eq. (1) given above, or less in a temperature range of from T(° C.) to 100° C., or, applying C(° C./hr), defined by eq. (1), or less of average cooling rate in a temperature range of from T(° C.) between 130° C. and 300° C. to 100° C. after the hot-dip coated metal solidified. As a result, the strain accumulated in the coating layer is relaxed, as described before, and solid diffusion is induced in the coating layer, thus further effectively accelerating the phase separation, began in the thermal history (a), between Al and Zn in the coating layer. Consequently, owing to the combination effect of the thermal history (b) and the thermal history (a), the coating layer becomes significantly soft, and the workability thereof significantly improves.

If the heating temperature T of the coating layer in the thermal history (b) is lower than 130° C., the above-described effect cannot be satisfactorily attained. If the heating temperature T exceeds 300° C., the growth of alloy phase is enhanced at interface between the substrate steel sheet and the coating layer, which degrades the workability. From that point of view, the upper limit of heating temperature T preferred to improve the workability is 200° C.

Also for the case of cooling the coating layer under a condition that the thermal history (b) is applied starting from a temperature T(° C.) between 130° C. and 300° C., which temperature range is the cooling period after the hot-dip coated metal solidified, the temperature T below 130° C. cannot attain above-described satisfactory effect.

To apply the thermal history (b) to the coating layer, the continuous hot-dip coating apparatus is provided with (inside or outside thereof) a heating or soaking unit for applying heat treatment or for holding heat to the coating layer, thus conducting the heat treatment or soaking. For example, a heating mechanism (such as induction heater, gas heating furnace, and hot stove) may be installed in the continuous hot-dip coating furnace to conduct continuous in-line heating, or off-line batchwise heating may be applied after coiled. Alternatively, continuous heating using a heating mechanism (such as induction heater, gas heating furnace, and hot stove) may be applied by an off-line continuous treatment apparatus, or an adequate heating or soaking may be applied after coiled the coated steel sheet which was continuously heated within the line or the above-described continuous treatment apparatus. Furthermore, a soaking unit that can soak and can slowly cool the coating layer may be applied during the cooling stage after solidified the hot-dip coated metal.

The type, shape, scale, or other characteristics of the heating or soaking unit is not specifically limited if only the unit can apply the thermal history (b) to the coating,layer.

By applying a specified non-chromate covering layer on the coating layer which was subjected to the thermal history (a) and the thermal history (b), the obtained surface-treated steel sheet provides extremely high workability and corrosion resistance at the worked portion.

The surface-treated steel sheet according to the Embodiment 6 has a specific covering layer on the above-described coating layer. The covering layer is a layer of single layer or multilayer, which contains organic resin and inorganic resin and which does not contain chromium.

The organic resin existing in the covering layer has an effect to improve both the workability and the corrosion resistance at worked portion. The kind of the organic resin is not specifically limited. Applicable kinds of the organic resin include acrylic-base resin, urethane-base resin, olefin-base resin, and epoxy base-resin.

The inorganic component existing in the covering layer has an effect to improve the corrosion resistance. Solely the above-described organic resin in the covering layer is not satisfactory to attain sufficient corrosion resistance, and the addition of the inorganic resin can provide the satisfactory corrosion resistance. Applicable inorganic component includes phosphoric acid, phosphate (such as zinc phosphate, aluminum phosphate, magnesium phosphate, and calcium phosphate), silica, silane coupling agent (such as that of aminosilane-base, isocyanate-base, mercapto-base, epoxy-base, vinyl-base, and methacryloxy-base), compound of Ca, Mn, Mg, Ni, Co, Fe, and Ca (such as calcium silicate and calcium carbonate), Mn-base compound (such as manganese nitrate), Mg-base compound (such as magnesium nitrate and magnesium acetate), Ni-base compound (such as nickel acetate and nickel nitrate), Co-base compound (such as cobalt acetate and cobalt nitrate), and Fe-base compound (such as iron nitrate). Alternatively, one or more of these compounds may be used. By dissolving or dispersing these inorganic components in the treatment solution for layer-forming, (for the metals, by dissolving or dispersing them in a form of metallic ion or of fine particles), they become the layer-forming components.

The covering layer may be a single layer or multilayer (plurality of layers). The above-described organic resin and inorganic resin may be introduced to a single layer or may be introduced to separate layer from each other. That is, when the covering layer is the single layer, the above-described organic resin and inorganic resin are introduced to the layer. If, however, the covering layer is multilayer, the inorganic component may be introduced to the lower layer, (or the lower layer is made of the inorganic component), and the organic component may be introduced to the upper layer, (or the upper layer is made of the organic component). Alternatively, at least one layer in the multilayer may contain both the organic resin and the inorganic resin.

The coating weight of the covering layer, (the total coating weight for the case of multilayered covering layer), is 0.1 g/m² or more and less than 5 g/m², preferably 1.0 g/m² or more and less than 5 g/m². If the coating weight is less than 0.1 g/m², sufficient corrosion resistance cannot be attained. If the coating weight is 5 g/m² or more, the film is likely separated during working.

To attain particularly high workability and corrosion resistance at worked portion, it is preferred that the mass ratio of solid matter of the organic resin to the inorganic resin in the covering layer, [organic resin:inorganic resin], is in a range of from 100:1 to 0:100, more preferably from 110:1 to 50:50. If the inorganic component is less than 1 part per 100 parts of organic component, sufficient corrosion resistance cannot be attained. If the inorganic component exceeds 100 parts per 100 parts of organic component, the film is likely separated during working.

The following is the description of a method for manufacturing the surface-treated steel sheet according to the Embodiment 6.

The manufacturing method according to the Embodiment 6 is a method for manufacturing the surface-treated steel sheet using a substrate steel sheet of a hot-dip Al—Zn base coated steel sheet, containing 20 to 95 mass % Al in the coating layer, prepared by a continuous hot-dip coating apparatus or the like, and forming a covering layer on the substrate coated steel sheet. The method has the steps of applying thermal history of at least (a) and (b) described below and of forming a specific covering layer on the coated steel sheet.

(a) A thermal history of less than 11° C./sec of average cooling rate during the first 10 seconds after the steel sheet left the hot-dip coating bath; and (b) A thermal history of heating the coating layer to a temperature T(° C.) between 130° C. and 300° C. after the hot-dip coated metal solidified, and cooling thereof at an average cooling rate of C(° C./hr), defined by eq. (1), or less in a temperature range of from T(° C.) to 100° C., and/or a thermal history of an average cooling rate C(° C./hr), defined by eq. (1), or less in a temperature range of from T(° C.) between 130° C. and 300° C. to 100° C. after the hot-dip coated metal solidified.

$$C=(T-100)/2 \quad (1)$$

As of the thermal history (a) and the thermal history (b) applied to the coating layer, the thermal history (a) is given by controlling the cooling condition of the coating layer immediately after coated.

To give the thermal history (a) to the coating layer, it is necessary to provide, as described before, the continuous hot-dip coating apparatus with a temperature control unit between the hot-dip coating bath level and the roll to which the steel sheet contacts first after leaving the bath, and to control the cooling rate by the temperature control unit. A preferable temperature control unit is the one having a means for heating or soaking and having, at need, a means for cooling. There is, however, no specific limit on the type, shape, scale, or other characteristics of the heating or soaking unit if only the unit can apply the thermal history (a) to the coating layer. Applicable means for heating or soaking in the temperature control unit includes an induction heater and a gas-heating furnace. Applicable means for cooling includes a gas-blowing unit.

Application of the thermal history (b) is conducted by giving a specific heat treatment to the coated steel sheet after solidifying the hot-dip coated metal, or by controlling the cooling rate of the coating layer after solidifying the hot-dip coated metal by soaking or the like. According to the manufacturing method of the present invention, a specific covering layer is formed on the coating layer of the coated steel sheet. The heat treatment to apply the thermal history (b) to the coating layer may be given in any one stage of ① before forming the covering layer, ② during drying period of the covering layer, and ③ after forming the covering layer (after applying the treatment solution and succeeding drying period to form the film). Alternatively, the heat treatment to apply the thermal history (b) may be given to more than one stage among the three described above.

Consequently, the application of thermal history (b) to the coating layer may be given in at least one stage among the four (1) through (4) given below.

(1) Before forming the covering layer.
(2) During drying period of the covering layer.
(3) After forming the covering layer.
(4) During cooling period after solidified the hot-dip coated metal.

As of the above-described stages for applying heat treatment, the stage ① has an advantage of being able to optimize separately the individual conditions of the heat treatment stage and the covering layer forming stage, and the stages of ② and ③ are suitable for carrying out all the treatments in the continuous hot-dip coating apparatus. The stage ② is particularly superior in economy because the heat treatment utilizes the heat of the drying period in the covering layer formation.

The heat treatment or soaking for applying the thermal history (b) to the coating layer is conducted using a heating or soaking unit located inside or outside the continuous hot-dip coating apparatus. For example, a heating mechanism (such as induction heater, gas heating furnace, and hot stove) may be installed in the continuous hot-dip coating apparatus to conduct continuous in-line heating, or off-line batchwise heating may be applied after coiled. Alternatively, continuous heating using a heating mechanism (such as induction heater, gas heating furnace, and hot-air furnace) may be applied by an off-line continuous treatment apparatus, or adequate heating or soaking may be applied after coiled the coated steel sheet which was continuously heated within the line or in the above-described continuous treatment apparatus. Furthermore, a soaking unit that can soak and can slowly cool the coating layer may be applied during the cooling period after the hot-dip coated metal solidified. There is, however, no specific limit on the type, shape, scale, or other characteristics of the heating or soaking unit if only the unit can apply the thermal history (b) to the coating layer.

The reason for limiting preferred coating composition and coating weight on the manufactured hot-dip Al—Zn base coated steel sheet, and for specifying the thermal history (a) and the thermal history (b), and the obtained functions and effects are described before.

In the process for forming a specific covering layer on the coated steel sheet, a covering layer of single layer or multilayer structure containing an organic resin and an inorganic resin therein with a coating weights of 0.1 mg/m² or more and less than 5 mg/m² is formed on the coated steel sheet. The sequential order of the process to form the covering layer and the process to give the above-described thermal history (b) are the same as those described before.

The kinds of organic resin component and of inorganic resin component are as described before. The covering layer may be formed by applying a treatment solution containing dissolved or dispersed organic and inorganic components, (for the metals, dissolving or dispersing them in a form of metallic ion or of fine particles), then by drying the applied treatment solution at temperatures of from 80° C. to 300° C. without washing with water.

As described before, the covering layer may be a single layer or a multilayer (plurality of layers). Accordingly, a single layer of covering layer containing both the organic resin component and the inorganic resin component may be formed on the coating layer. For the case of multilayer covering layer, a layer containing the inorganic resin component, (or a layer made of the inorganic component), may be formed on the coating layer, and a layer containing the organic resin, (or a layer made of the organic resin), may be formed thereon. Alternatively, the organic resin component and the inorganic resin component may be introduced to at least one layer of the plurality of layers.

On the surface of the surface-treated steel sheet according to the Embodiment 6, a single layer or multilayer paint film layer may be formed to prepare a coated steel sheet. Applicable paint film layer includes polyester resin base paint film layer, epoxy resin base paint film layer, acrylic resin base paint film layer, polyurethane resin base paint film layer, and fluororesin base paint film layer. Furthermore, a resin modifying one of those resins, in a part, by other resin to form, for example, an epoxy resin-modified polyester resin base paint film layer is applicable. To those resins, curing agent, curing catalyst, pigment, additive, and the like may further be added.

The method for forming the paint film layer on the surface-treated steel sheet is not specifically limited. An applicable method includes roll coater coating, curtain flow coating, spray coating, or the like. After applying the coating onto the surface-treated steel sheet, the paint film layer is formed generally by heating to dry thereof using hot-air heating, infrared heating, induction heating, or the like.

EXAMPLE 6-1

Cold-rolled steel sheets (0.5 mm in thickness) which were prepared by a known method were introduced to a continuous hot-dip coating apparatus to conduct hot-dip coating using various kinds of hot-dip Al—Zn coating baths having equivalent compositions to respective coating layers given in Tables 29 through 34. The line speed was fixed to 160 m/min, and the coating weight on one side of the steel sheet was adjusted to fall in the range of from 75 to 90 g/m$^2$.

In the manufacturing process for the coated steel sheet, the heat histories (I) and (II) given in Tables 29 through 34 were applied, and the covering layer was formed on the coating layer. For forming the covering layer, the treatment solution prepared by dissolving or dispersing the organic resin component and the inorganic resin component therein was applied onto the coated steel sheet, which solution was then heated to dry at 150° C. For some of the Examples, (No.11 and No. 12), a treatment solution prepared by dissolving metallic ion therein was applied onto the coated steel sheet, which solution was then heated to dry at 120° C., further a treatment solution prepared by dissolving or dispersing organic resin component and inorganic resin component therein was applied thereon, followed by heating to dry thereof at 150° C.

Thus prepared surface-treated steel sheet was evaluated in terms of workability and corrosion resistance at worked portion. The results are given in Tables 29 through 34.

(1) Workability

The surface-treated steel sheet was subjected to 0T bending test. The crack generation at the front end of the 0T bend portion was observed, and the evaluation was given on the basis of the criterion given below.

5: Observation with 20×magnifier did not identify crack.

4: Visual observation did not identify crack. However, observation with 20×magnifier identified crack.

3: Visual observation identified crack.

2: Visual observation identified widely opened crack.

1: Crack accompanied with peeling occurred.

(2) Corrosion Resistance at Worked Portion

The surface-treated steel sheet was bent to 3T state, and was placed in a wet tester under the condition of 50° C., 98%RH. The rust generation on the bend portion was observed after 1,000 hours of testing. The evaluation was given on the criterion shown below.

5: No abnormality was observed.

4: White rust and black rust slightly appeared.

3: White rust and black rust appeared over the whole area.

2: Significant white rust and black rust appeared over the whole area.

1: Red rust appeared.

TABLE 29

| No. | Coating layer composition | Thermal history (I)[*1] Average cooling speed (° C./sec) | Thermal history (II)[*2] | | Stage of heat treatment[*5] | Classification |
|---|---|---|---|---|---|---|
| | | | Heating temperature (° C.)[*3] | Average cooling speed (° C./hr)[*4] | | |
| 1 | 55%Al—1.5%Si | 10 | 180 | 23 | (2) | Comparative example |
| 2 | 55%Al—1.5%Si | 10 | 180 | 23 | (2) | Comparative example |
| 3 | 55%Al—1.5%Si | 10 | 180 | 23 | (2) | Comparative example |
| 4 | 55%Al—1.5%Si | 10 | 180 | 23 | (2) | Comparative example |
| 5 | 55%Al—1.5%Si | 10 | 180 | 23 | (2) | Example |
| 6 | 55%Al—1.5%Si | 10 | 180 | 23 | (2) | Example |
| 7 | 55%Al—1.5%Si | 10 | 180 | 23 | (2) | Example |
| 8 | 55%Al—1.5%Si | 10 | 180 | 23 | (2) | Example |
| 9 | 55%Al—1.5%Si | 10 | 180 | 23 | (2) | Example |
| 10 | 55%Al—1.5%Si | 10 | 180 | 23 | (2) | Example |
| 11 | 55%Al—1.5%Si | 10 | 180 | 23 | (2) | Example |

TABLE 29-continued

| | | Thermal history (I)[*1] | Thermal history (II)[*2] | | | |
|---|---|---|---|---|---|---|
| No. | Coating layer composition | Average cooling speed (° C./sec) | Heating temperature (° C.)[*3] | Average cooling speed (° C./hr)[*4] | Stage of heat treatment[*5] | Classification |
| 12 | 55%Al—1.5%Si | 10 | 180 | 23 | (2) | Example |
| 13 | 55%Al—1.5%Si | 10 | 180 | 23 | (2) | Example |
| 14 | 55%Al—1.5%Si | 10 | 180 | 23 | (2) | Example |

[*1]Average cooling rate of coating layer during the first 10 seconds after the steel sheet left from hot-dip coating bath.
[*2]Thermal history applied by the heat treatment conducted after the hot-dip plated coating layer solidified.
[*3]Heating temperature of coating layer during the heat treatment.
[*4]Average cooling rate of coating layer during the heat treatment in a temperature range of from the heating temperature to 100° C.
[*5](1): Before forming covering layer, (2): After forming covering layer, (3): During drying stage of covering layer formation.

TABLE 30

| | | | Covering layer | | | | Corrosion | |
|---|---|---|---|---|---|---|---|---|
| | | | Upper layer or single layer | | | Coating | resistance | |
| No. | Film constitution | Lower layer | Organic resin (A) | Inorganic component (B) | (A)/(B)[*6] | weight (mg/m$^2$)[*7] | at worked portion | Classification |
| 1 | Single layer | — | — | — | — | — | 1 | Comparative example |
| 2 | Single layer | — | — | Phosphoric acid | — | 100 | 1 | Comparative example |
| 3 | Single layer | — | — | Silica | — | 200 | 1 | Comparative example |
| 4 | Single layer | — | Polyurethane resin | — | — | 2000 | 2 | Comparative example |
| 5 | Single layer | — | Polyurethane resin | Phosphoric acid | 100/20 | 2000 | 4 | Example |
| 6 | Single layer | — | Polyurethane resin | Silica | 100/20 | 2000 | 4 | Example |
| 7 | Single layer | — | Polyurethane resin | Phosphoric acid, silane coupling agent | 100/30 (20 + 10) | 2000 | 5 | Example |
| 8 | Single layer | — | Polyurethane resin | Phosphoric acid, calcium phosphate | 100/30 (20 + 10) | 2000 | 5 | Example |
| 9 | Single layer | — | Polyurethane resin | Phosphoric acid, manganese phosphate | 100/30 (20 + 10) | 2000 | 5 | Example |
| 10 | Single layer | — | Polyurethane resin | Phosphoric acid, magnesium phosphate | 100/30 (20 + 10) | 2000 | 5 | Example |
| 11 | Two-layer | Ni | Polyurethane resin | Phosphoric acid, silane coupling agent | 100/30 (20 + 10) | 50 + 2000 | 5 | Example |
| 12 | Two-layer | Co + Fe | Polyurethane resin | Phosphoric acid, silane coupling agent | 100/30 (20 + 10) | 50 + 2000 | 5 | Example |
| 13 | Single layer | — | Acrylic resin | Phosphoric acid, silane coupling agent | 100/30 (20 + 10) | 2000 | 5 | Example |
| 14 | Single layer | — | Epoxy resin | Phosphoric acid, silane coupling agent | 100/30 (20 + 10) | 2000 | 5 | Example |

[*6]Solid matter mass ratio of the organic resin to the inorganic component. Numerals in parentheses designate the parts of respective inorganic components given in the left column.
[*7]No. 11 and No. 12 signify [Coating weight of lower layer + Coating weight of upper layer].

TABLE 31

| | | Thermal history (I) *1 | Thermal history (II) *2 | | | |
|---|---|---|---|---|---|---|
| No. | Coating layer composition | Average cooling speed (° C./sec) | Heating temperature (° C.) *3 | Average cooling speed (° C./hr) *4 | Stage of heat treatment *5 | Classification |
| 15 | 55% Al-1.5% Si | 15 | 180 | 19 | (2) | Comparative example |
| 16 | 55% Al-1.5% Si | 8 | 330 | 50 | (2) | Comparative example |
| 17 | 55% Al-1.5% Si | 8 | 105 | 20 | (2) | Comparative example |
| 18 | 55% Al-1.5% Si | 8 | 265 | 85 | (2) | Comparative example |
| 19 | 55% Al-1.5% Si | 8 | 165 | 45 | (2) | Comparative example |

TABLE 31-continued

| | | Thermal history (I) *1 | Thermal history (II) *2 | | | |
|---|---|---|---|---|---|---|
| No. | Coating layer composition | Average cooling speed (° C./sec) | Heating temperature (° C.) *3 | Average cooling speed (° C./hr) *4 | Stage of heat treatment *5 | Classification |
| 20 | 55% Al-1.5% Si | 10 | 280 | 52 | (2) | Example |
| 21 | 55% Al-1.5% Si | 10 | 180 | 23 | (2) | Example |
| 22 | 55% Al-1.5% Si | 4 | 145 | 18 | (2) | Example |
| 23 | 55% Al-1.5% Si | 4 | 240 | 58 | (2) | Example |
| 24 | 55% Al-1.5% Si | 8 | 185 | 15 | (1) | Example |
| 25 | 55% Al-1.5% Si | 8 | 170 | 22 | (3) | Example |
| 26 | 40% Al-1.0% Si | 9 | 140 | 15 | (2) | Example |
| 27 | 70% Al-1.8% Si | 7 | 230 | 60 | (2) | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before forming covering layer, (2): After forming covering layer, (3): During drying stage of covering layer formation.

TABLE 32

| | | Covering layer | | | | Corrosion | |
|---|---|---|---|---|---|---|---|
| | Film | Lower | Upper layer or single layer | | | Coating weight | resistance at |
| No. | constitution | layer | Organic resin (A) | Inorganic component (B) | (A)/(B) *6 | (mg/m$^2$) *7 | worked portion | Classification |
| 15 | Single layer | — | Polyurethane resin | Phosphoric acid, silane coupling agent | 100/30 (20 + 10) | 2000 | 1 | Comparative example |
| 16 | Single layer | — | Polyurethane resin | Phosphoric acid, silane coupling agent | 100/30 (20 + 10) | 2000 | 3 | Comparative example |
| 17 | Single layer | — | Polyurethane resin | Phosphoric acid, silane coupling agent | 100/30 (20 + 10) | 2000 | 3 | Comparative example |
| 18 | Single layer | — | Polyurethane resin | Phosphoric acid, silane coupling agent | 100/30 (20 + 10) | 2000 | 3 | Comparative example |
| 19 | Single layer | — | Polyurethane resin | Phosphoric acid, silane coupling agent | 100/30 (20 + 10) | 2000 | 3 | Comparative example |
| 20 | Single layer | — | Polyurethane resin | Phosphoric acid, silane coupling agent | 100/30 (20 + 10) | 2000 | 4 | Example |
| 21 | Single layer | — | Polyurethane resin | Phosphoric acid, silane coupling agent | 100/30 (20 + 10) | 2000 | 5 | Example |
| 22 | Single layer | — | Polyurethane resin | Phosphoric acid, silane coupling agent | 100/30 (20 + 10) | 2000 | 4 | Example |
| 23 | Single layer | — | Polyurethane resin | Phosphoric acid, silane coupling agent | 100/30 (20 + 10) | 2000 | 5 | Example |
| 24 | Single layer | — | Polyurethane resin | Phosphoric acid, silane coupling agent | 100/30 (20 + 10) | 2000 | 4 | Example |
| 25 | Single layer | — | Polyurethane resin | Phosphoric acid, silane coupling agent | 100/30 (20 + 10) | 2000 | 4 | Example |
| 26 | Single layer | — | Polyurethane resin | Phosphoric acid, silane coupling agent | 100/30 (20 + 10) | 2000 | 4 | Example |
| 27 | Single layer | — | Polyurethane resin | Phosphoric acid, silane coupling agent | 100/30 (20 + 10) | 2000 | 4 | Example |

*6 Solid matter mass ratio of the organic resin to the inorganic component. Numerals in parentheses designate the parts of respective inorganic components given in the left column.

TABLE 33

| | | Thermal history (I) *1 | Thermal history (II) *2 | | | |
|---|---|---|---|---|---|---|
| No. | Coating layer composition | Average cooling speed (° C./sec) | Heating temperature (° C.) *3 | Average cooling speed (° C./hr) *4 | Stage of heat treatment *5 | Classification |
| 28 | 55% Al-1.5% Si | 10 | 180 | 20 | (2) | Example |
| 29 | 55%Al-1.5% Si-3% Mg | 10 | 180 | 20 | (2) | Example |
| 30 | 55% Al-1.5% Si-2% V | 10 | 180 | 20 | (2) | Example |
| 31 | 55% Al-1.5% Si-2% Mn | 10 | 180 | 20 | (2) | Example |

TABLE 33-continued

| | | Thermal history (I) *1 | Thermal history (II) *2 | | | |
|---|---|---|---|---|---|---|
| No. | Coating layer composition | Average cooling speed (° C./sec) | Heating temperature (° C.) *3 | Average cooling speed (° C./hr) *4 | Stage of heat treatment *5 | Classification |
| 32 | 55% Al-1.5% Si-3% Mg-2% V | 10 | 180 | 20 | (2) | Example |
| 33 | 55% Al-1.5% Si-3% Mg-2% Mn | 10 | 180 | 20 | (2) | Example |
| 34 | 55% Al-1.5% Si-3% Mg-2% V-2% Mn | 10 | 180 | 20 | (2) | Example |

*1 Average cooling rate of coating layer during the first 10 seconds after the steel sheet left from hot-dip coating bath.
*2 Thermal history applied by the heat treatment conducted after the hot-dip plated coating layer solidified.
*3 Heating temperature of coating layer during the heat treatment.
*4 Average cooling rate of coating layer during the heat treatment in a temperature range of from the heating temperature to 100° C.
*5 (1): Before forming covering layer, (2): After forming covering layer, (3): During drying stage of covering layer formation.

TABLE 34

| | | Covering layer | | | | Corrosion | |
|---|---|---|---|---|---|---|---|
| | Film | Lower | Upper layer or single layer | | | Coating weight | resistance at |
| No. | constitution | layer | Organic resin (A) | Inorganic component (B) | (A)/(B) *6 | (mg/m²) *7 | worked portion | Classification |
| 28 | Single layer | — | Polyurethane resin | Phosphoric acid, silane coupling agent | 100/30 (20 + 10) | 2000 | 4 | Example |
| 29 | Single layer | — | Polyurethane resin | Phosphoric acid, silane coupling agent | 100/30 (20 + 10) | 2000 | 5 | Example |
| 30 | Single layer | — | Polyurethane resin | Phosphoric acid, silane coupling agent | 100/30 (20 + 10) | 2000 | 5 | Example |
| 31 | Single layer | — | Polyurethane resin | Phosphoric acid, silane coupling agent | 100/30 (20 + 10) | 2000 | 5 | Example |
| 32 | Single layer | — | Polyurethane resin | Phosphoric acid, silane coupling agent | 100/30 (20 + 10) | 2000 | 5 | Example |
| 33 | Single layer | — | Polyurethane resin | Phosphoric acid, silane coupling agent | 100/30 (20 + 10) | 2000 | 5 | Example |
| 34 | Single layer | — | Polyurethane resin | Phosphoric acid, silane coupling agent | 100/30 (20 + 10) | 2000 | 5 | Example |

*6 Solid matter mass ratio of the organic resin to the inorganic component. Numerals in parentheses designate the parts of respective inorganic components given in the left column.

What is claimed is:

1. In a method for manufacturing a coated steel sheet, comprising the steps of forming an Al—Zn base coating layer containing 20 to 95 mass % Al on a steel sheet by immersing the steel sheet in a hot-dip coating bath, and forming a passivated layer on the coating layer, the method including the step of applying thermal history to the coating layer;

said step of applying thermal history comprising the steps of:

applying a first thermal history of less than 11° C./sec of average cooling rate to the coating layer during the first 10 seconds after the steel sheet left the hot-dip coating bath; and applying a second thermal history of 0.5×(T−100)(° C./hr) or less of average cooling rate to the coating layer in a temperature range of from T(° C.) between 130° C. and 300° C. to 100° C.

2. The method according to claim 1, wherein the step of applying the second thermal history comprises applying a thermal history of 0.5×(T−100)(° C./hr) or less of average cooling rate to the coating layer in a temperature range of from T(° C.) between 130° C. and 300° C. to 100° C. after solidification of a hot-dip coated metal.

3. The method according to claim 1, wherein the step of applying the second thermal history comprises:

heating the coating layer to a temperature T(° C.) between 130° C. and 300° C. after solidification of a hot-dip coated metal; and applying a thermal history of 0.5×(T−100)(° C./hr) or less of average cooling rate to the coating layer in a temperature range of from T(° C.) to 100° C.

4. The method according to claim 1, wherein the step of applying the second thermal history comprises applying a thermal history of 0.5×(T−100)(° C./hr) or less of average cooling rate to the coating layer in a temperature range of from T(° C.) between 130° C. and 200° C. to 100° C.

5. The method according to claim 1, wherein the step of forming the passivated layer comprises forming a passivated layer containing chromium of 0.1 mg/m² or more and less than 100 mg/m² in terms of metallic chromium by chromate treatment.

6. The method according to claim 5, wherein the step of forming the passivated layer comprises:

applying a chromating solution onto the coating layer, said chromating solution containing a water organic resin, chromic aid and/or a chromic acid compound which is prepared by reducing a part of chromic aid, said ; and drying the applied solution at a sheet temperature of from 80° C. to 300° C. to form the passivated layer, a mass ratio of the organic resin (A) to the chromium (B) in terms of metallic chromium in the passivated layer, (A)/(B), being 1 or more and less than 200.

7. The method according to claim 5, wherein the step of forming the passivated layer comprises:

applying chromate treatment to the coating layer;

applying a treatment solution containing a water resin onto the chromated surface; and drying the treatment solution at a sheet temperature of from 80° C. to 300° C. to form the passivated layer containing organic resin.

8. The method according to claim 7, wherein the passivated layer contains the organic resin (A) and the chromium (B) in terms of metallic chromium at a mass ratio (A)/(B) of 1 or more and less than 200.

9. The method according to claim 6, wherein the organic resin in the passivated layer is a thermosetting organic resin.

10. The method according to claim 7, wherein the organic resin in the passivated layer is a thermosetting organic resin.

11. The method according to claim 1, wherein the passivated layer has at least one layer which contains an organic resin and at least one compound selected from the group consisting of phosphoric acid, phosphate, silica, silane coupling agent, Ca, Ca-base compound, Mn, Mn-base compound, Mg, Mg-base compound, Ni, Ni-base compound, Co, Co-base compound, Fe, and Fe-base compound, and which does not contain chromium;

the passivated layer has a coating weight of 0.1 g/m² or more and less than 5 g/m².

12. The method according to claim 1, wherein the step of applying the second thermal history is carried out in at least one stage selected from the group consisting of (1) through (4):

(1) before the passivation;

(2) during drying period of the passivation;

(3) after the passivation; and (4) during cooling period after solidification of a hot-dip coated metal.

13. The method according to claim 1, further comprising the step of applying at least one paint film layer onto the passivated layer.

14. The method according to claim 13, wherein the step of applying at least one paint film layer onto the passivated layer comprises the steps of:

applying a primer onto the passivated layer and baking the primer onto the passivated layer to form a primer layer having thicknesses of 2 um or more; and applying a top coat onto the primer layer and baking the top coat onto the primer layer to form a top coat layer having thicknesses of from 5 to 30 um;

the primer containing main component resins of a modified polyester resin (C) and a curing agent (D), said modified polyester resin (C) being prepared by a reaction between a polyester resin (A) having a number average molecular weight of from 14,000 to 26,000 and having a glass transition temperature of from 0° C. to 30° C., and an epoxy resin (B), and the modified polyester resin (C) having k-values, given in the following equation, of from 0.7 to 2.5, $$k=[Wb \times (Ma+2 \times Mb)]/[(Wa+Wb) \times 2 \times Mb]$$

where,

Wa is a solid matter weight ratio of the polyester resin (A) to [the polyester resin (A)+the epoxy resin (B)], Wb is a solid matter weight ratio of the epoxy resin (B) to [the polyester resin (A)+the epoxy resin (B)], Ma is a number average molecular weight of the polyester resin (A), and Mb is a number average molecular weight of the epoxy resin (B);

the top coat containing main component resins of a polyester resin (E) and a curing agent, said polyester resin (E) having a number average molecular weight of from 5,000 to 20,000.

15. The method according to claim 14, wherein the curing agent (D) in the primer is at least one compound selected from the group consisting of amino resin and isocyanate compound.

16. The method according to claim 14, wherein the step of applying the second thermal history is carried out in at least one stage selected from the group consisting of (1) through (8):

(1) before the passivation;

(2) during drying period of the passivation;

(3) after the passivation and before the painting of the primer;

(4) during drying period of the primer;

(5) after the painting of primer and before the painting of the top coat;

(6) during drying period of the top coat;

(7) after the painting of the top coat; and (8) during cooling period after solidification of a hot-dip coated metal.

17. The method according to claim 1, wherein the step of forming the coating layer comprises forming an Al—Zn base coating layer containing 20 to 95 mass % Al and 0.01 to 10 mass % of at least one element selected from the group consisting of Mg, V, and Mn.

18. A coated steel sheet having an Al—Zn base coating layer containing 20 to 95 mass % Al and a passivated layer formed on the coating layer, the coating layer being subjected to a first thermal history of less than 11° C./sec of an average cooling rate during the first 10 seconds after the steel sheet left a hot-dip coating bath, and to a second thermal history of 0.5×(T−100)(° C./hr) or less of average cooling rate in a temperature range of from T(° C.) between 130° C. and 300° C. to 100° C.

19. The coated steel sheet according to claim 18, wherein the second thermal history is a thermal history of applying 0.5×(T−100)(° C./hr) or less of average cooling rate to the coating layer in a temperature range of from T(° C.) between 130° C. and 300° C. to 100° C. after solidification of a hot-dip coated metal.

20. The coated steel sheet according to claim 18, wherein the second thermal history is a thermal history of heating the coating layer to a temperature T(° C.) between 130° C. and 300° C. after solidification of a hot-dip coated metal, and then cooling the coating layer at an average cooling rate of 0.5×(T−100)(° C./hr) or less in a temperature range of from T(° C.) to 100° C.

21. The coated steel sheet according to claim 18, wherein the second thermal history is a thermal history of applying 0.5×(T−100)(° C./hr) or less of an average cooling rate to the coating layer in a temperature range of from T(° C.) between 130° C. and 200° C. to 100°0 C.

22. The coated steel sheet according to claim 18, wherein the passivated layer is formed by chromate treatment to contain chromium of 0.1 mg/m² or more and less than 100 mg/m² in terms of metallic chromium.

23. The coated steel sheet according to claim 22, wherein the passivated layer contains an organic resin, said passivated layer being formed by applying a chromating solution onto the coating layer, said chromating solution containing a water organic resin, chromic aid and/or a chromic acid compound which is prepared by reducing a part of chromic aid, and by drying the applied solution at sheet temperatures of from 80° C. to 300° C.;

the passivated layer has a mass ratio of the organic resin (A) to the chromium (B) in terms of metallic chromium in the passivated layer, (A)/(B), is 1 or more and less than 200.

24. The coated steel sheet according to claim 22, wherein the passivated layer comprises:

a chromate layer formed on the coating layer; and a layer formed by applying a treatment solution containing a water organic resin onto the chromate layer and by drying the treatment solution at a sheet temperature of from 80° C. to 300° C.

25. The coated steel sheet according to claim 24, wherein the passivated layer contains the organic resin (A) and the chromium (B) in terms of metallic chromium at mass ratios (A)/(B) of 1 or more and less than 200.

26. The coated steel sheet according to claim 23, wherein the organic resin in the passivated layer is a thermosetting organic resin.

27. The coated steel sheet according to claim 24, wherein the organic resin in the passivated layer is a thermosetting organic resin.

28. The coated steel sheet according to claim 18, wherein the passivated layer has at least one layer which contains an organic resin and at least one compound selected from the group consisting of phosphoric acid, phosphate, silica, silane coupling agent, Ca, Ca-base compound, Mn, Mn-base compound, Mg, Mg-base compound, Ni, Ni-base compound, Co, Co-base compound, Fe, and Fe-base compound, and which does not contain chromium, and the passivated layer has a coating weight of 0.1 g/m² or more and less than 5 g/m².

29. The coated steel sheet according to claim 18, further comprising at least one paint film layer on the passivated layer.

30. The coated steel sheet according to claim 29, wherein the paint film layer comprises:

a primer layer having thicknesses of 2 μm or more, formed by applying a primer onto the passivated layer; and a top coat layer having thicknesses of from 5 to 30 μm, formed by applying a top coat onto the primer layer;

the primer containing main component resins of a modified polyester resin (C) and a curing agent (D), which modified polyester resin (C) is prepared by a reaction between a polyester resin (A) having a number average molecular weight of from 14,000 to 26,000 and having a glass transition temperature of from 0° C. to 30° C., and an epoxy resin (B), and the modified polyester resin (C) has k-values, given in the following equation, of from 0.7 to 2.5, $$k=[Wb\times(Ma+2\times Mb)]/[(Wa+Wb)\times 2\times Mb]$$

where, Wa is a solid matter weight ratio of the polyester resin (A) to [the polyester resin (A)+the epoxy resin (B)], Wb is the solid matter weight ratio of the epoxy resin (B) to [the polyester resin (A)+the epoxy resin (B)], Ma is a number average molecular weight of the polyester resin (A), and Mb is a number average molecular weight of the epoxy resin (B); the top coat having main component resins of a polyester resin (E) and a curing agent, which polyester resin (E) has a number-average molecular weight of from 5,000 to 20,000.

31. The coated steel sheet according to claim 30, wherein the curing agent (D) in the primer is at least one compound selected from the group consisting of amino resin and isocyanate compound.

32. The coated steel sheet according to claim 18, wherein the coating layer is an Al—Zn base coating layer containing 20 to 95 mass % Al and 0.01 to 10 mass % of at least one element selected from the group consisting of Mg, V, and Mn.

* * * * *